United States Patent [19]
Kikuchi et al.

[11] Patent Number: 5,998,911
[45] Date of Patent: Dec. 7, 1999

[54] VIBRATOR, VIBRATORY GYROSCOPE, AND VIBRATION ADJUSTING METHOD

[75] Inventors: Takayuki Kikuchi, Nagoya; Shosaku Gouji, Ama-Gun; Yukihisa Osugi, Nagoya; Takao Soma, Nishikamo-Gun, all of Japan

[73] Assignee: NGK Insulators, Ltd., Japan

[21] Appl. No.: 08/971,686

[22] Filed: Nov. 17, 1997

[30] Foreign Application Priority Data

| Nov. 26, 1996 | [JP] | Japan | 8-315015 |
| Nov. 28, 1996 | [JP] | Japan | 8-317781 |
| Nov. 28, 1996 | [JP] | Japan | 8-317782 |
| Nov. 28, 1996 | [JP] | Japan | 8-317784 |
| Dec. 6, 1996 | [JP] | Japan | 8-326941 |
| Jun. 23, 1997 | [JP] | Japan | 9-180244 |
| Jun. 30, 1997 | [JP] | Japan | 9-173793 |
| Aug. 20, 1997 | [JP] | Japan | 9-233426 |
| Sep. 30, 1997 | [JP] | Japan | 9-265478 |
| Oct. 6, 1997 | [JP] | Japan | 9-287624 |

[51] Int. Cl.$^6$ ............................................. H01L 41/08
[52] U.S. Cl. ................... 310/367; 310/321; 310/316; 310/370; 310/366; 73/505
[58] Field of Search ................... 310/316, 321, 310/370, 366–368, 357–359, 330–332; 73/505

[56] References Cited

U.S. PATENT DOCUMENTS

| 3,520,195 | 7/1970 | Tehon | 310/321 X |
| 3,531,742 | 9/1970 | Saito et al. | 310/367 X |
| 3,697,766 | 10/1972 | Ganter et al. | 310/370 X |
| 3,714,475 | 1/1973 | Baker, Jr. | 310/321 |
| 3,839,915 | 10/1974 | Schlitt et al. | 73/505 |
| 4,524,619 | 6/1985 | Staudte | 310/370 X |
| 4,654,663 | 3/1987 | Alsenz et al. | 310/370 |
| 4,836,023 | 6/1989 | Oikawa | 310/321 X |
| 5,166,571 | 11/1992 | Konno et al. | 310/321 X |
| 5,226,321 | 7/1993 | Varnham et al. | 73/505 |
| 5,426,970 | 6/1995 | Florida et al. | 310/370 X |
| 5,476,008 | 12/1995 | Pinson | 310/367 X |
| 5,522,249 | 6/1996 | Macy | 310/370 X |
| 5,708,320 | 1/1998 | Ohnishi et al. | 310/321 |
| 5,757,107 | 5/1998 | Wakatuki et al. | 310/370 |
| 5,824,900 | 10/1998 | Konno et al. | 310/370 X |
| 5,847,487 | 12/1998 | Maeno | 310/321 |
| 5,854,427 | 12/1998 | Terada et al. | 310/370 X |

FOREIGN PATENT DOCUMENTS

| 0231667 | 9/1989 | Japan | 310/367 |
| 0132912 | 5/1990 | Japan | 310/367 |
| 2-129514 | 5/1990 | Japan | 310/321 |
| 0186818 | 7/1990 | Japan | 310/367 |
| 0294108 | 12/1990 | Japan | 310/367 |
| 2004434 | 3/1979 | United Kingdom | 310/321 |

Primary Examiner—Mark O. Budd
Attorney, Agent, or Firm—Wall Marjama Bilinski & Burr

[57] ABSTRACT

A vibrator of a vibratory gyroscope comprises a main arm having a base part and at least one bending-vibration piece extending from the base part in a direction crossing the longitudinal direction of the base part and a fixing part for fixing one end of the base part, and the base part and the bending-vibration piece are formed so as to extend substantially in a specified plane. Preferably, at the opposite side to one end of the base part, a projection projecting from the bending-vibration piece is provided, or at least a pair of resonant arms resonating with vibration of the base part, said pair of resonant arms projecting from the fixing part are provided. Thanks to this, it has been possible to detect a turning angular rate in a sufficiently high accuracy without providing a projection which has a certain weight and extends from the vibrator toward the axis of turning even in case of arranging the vibrator so that the vibration arm of the vibrator extends perpendicularly to the axis of turning.

156 Claims, 61 Drawing Sheets

FIG_1
PRIOR ART
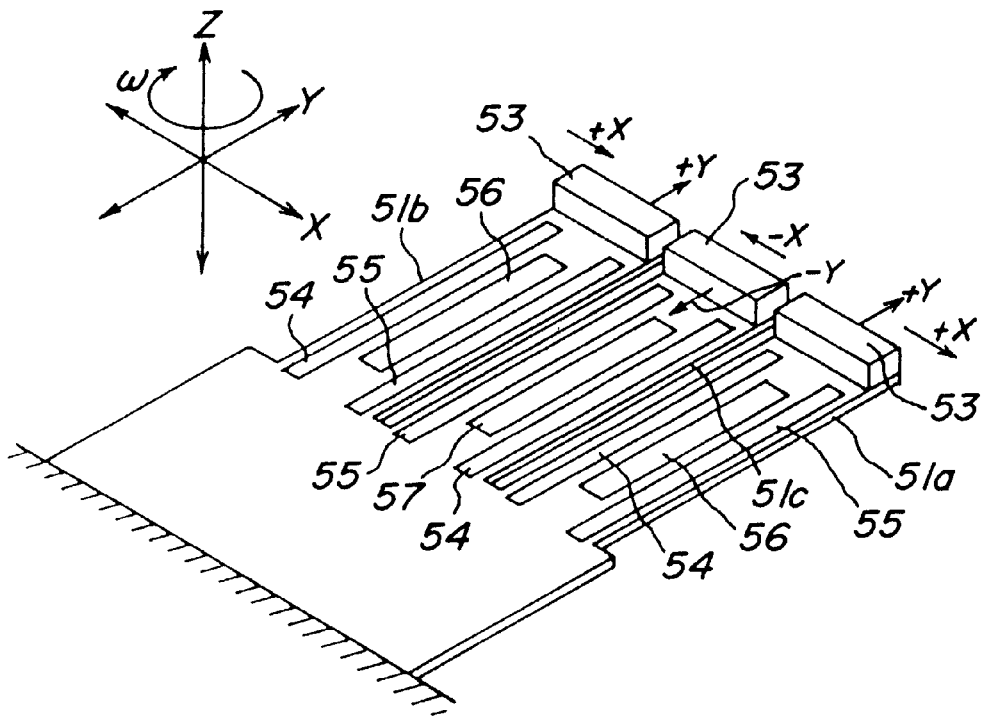
FIG_2
PRIOR ART
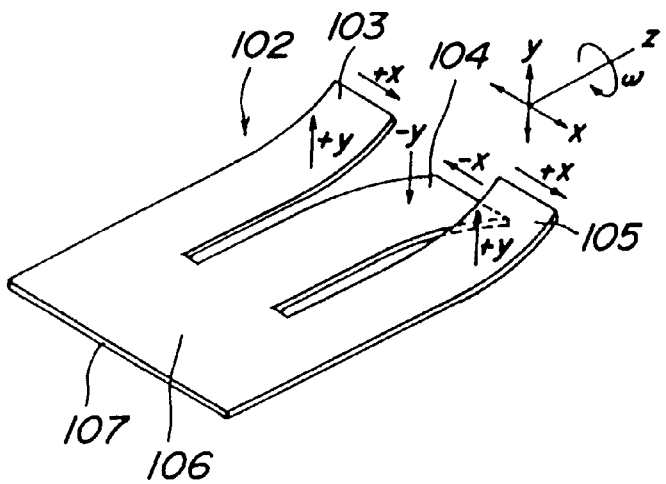

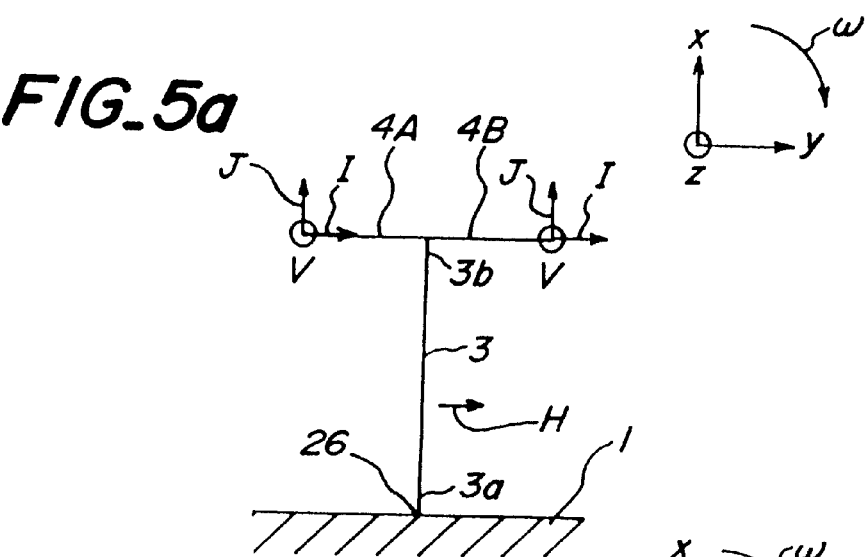
FIG._5a
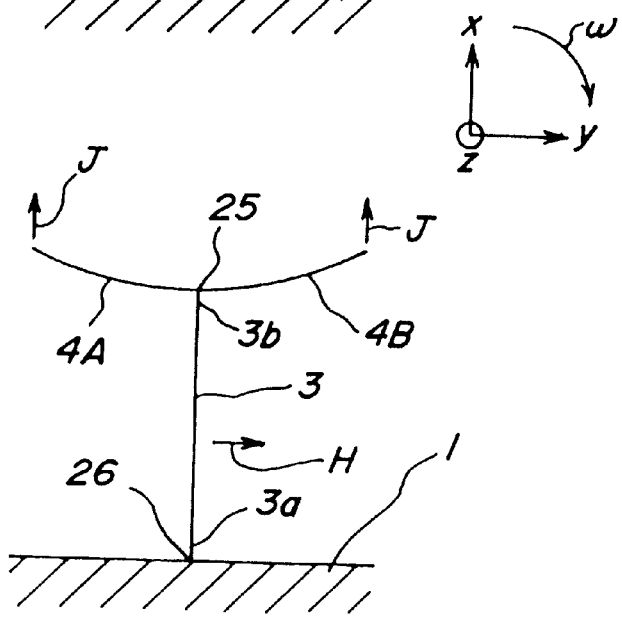
FIG._5b
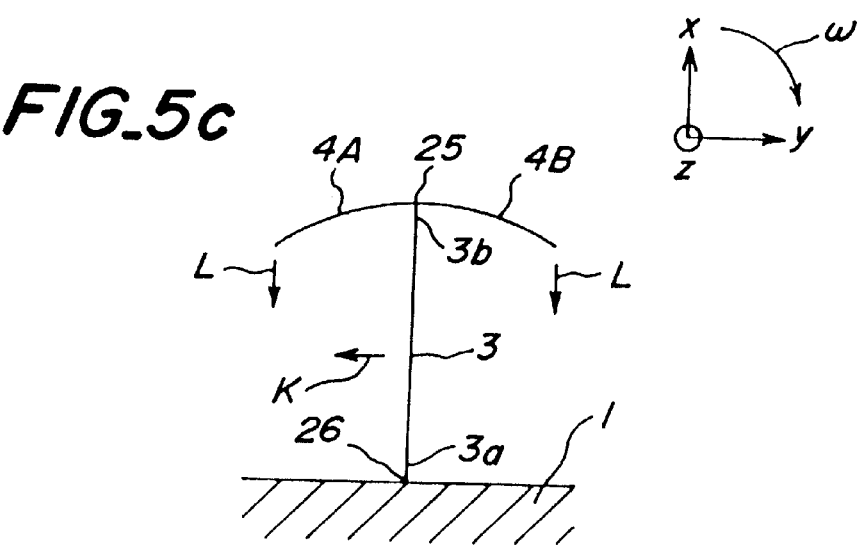
FIG._5c

FIG_7

FIG_8

FIG._11

FIG_13a
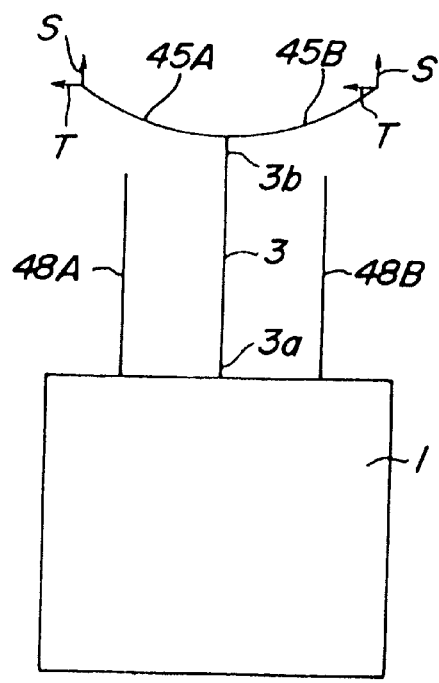
FIG_13b
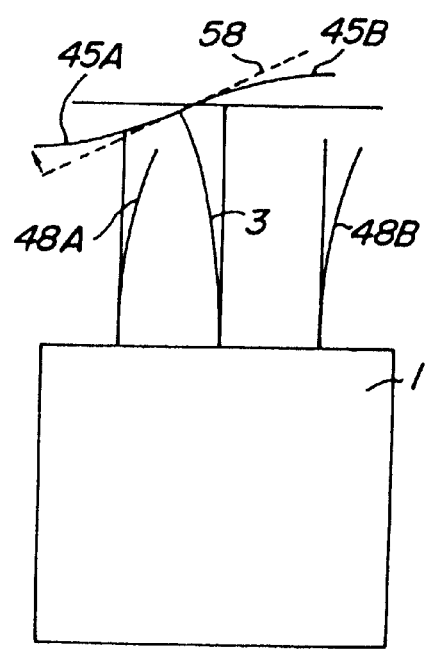
FIG_13c
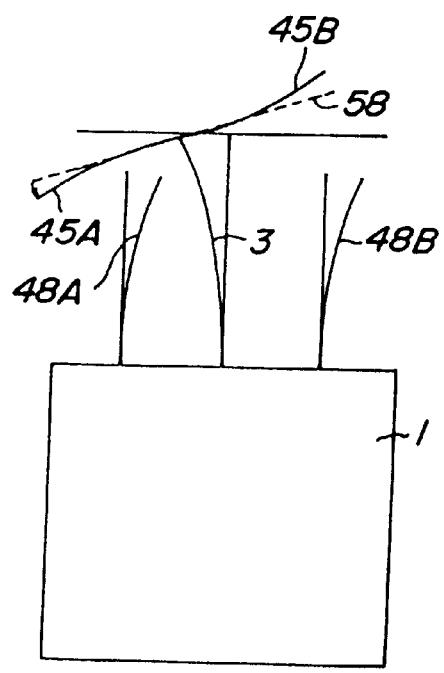

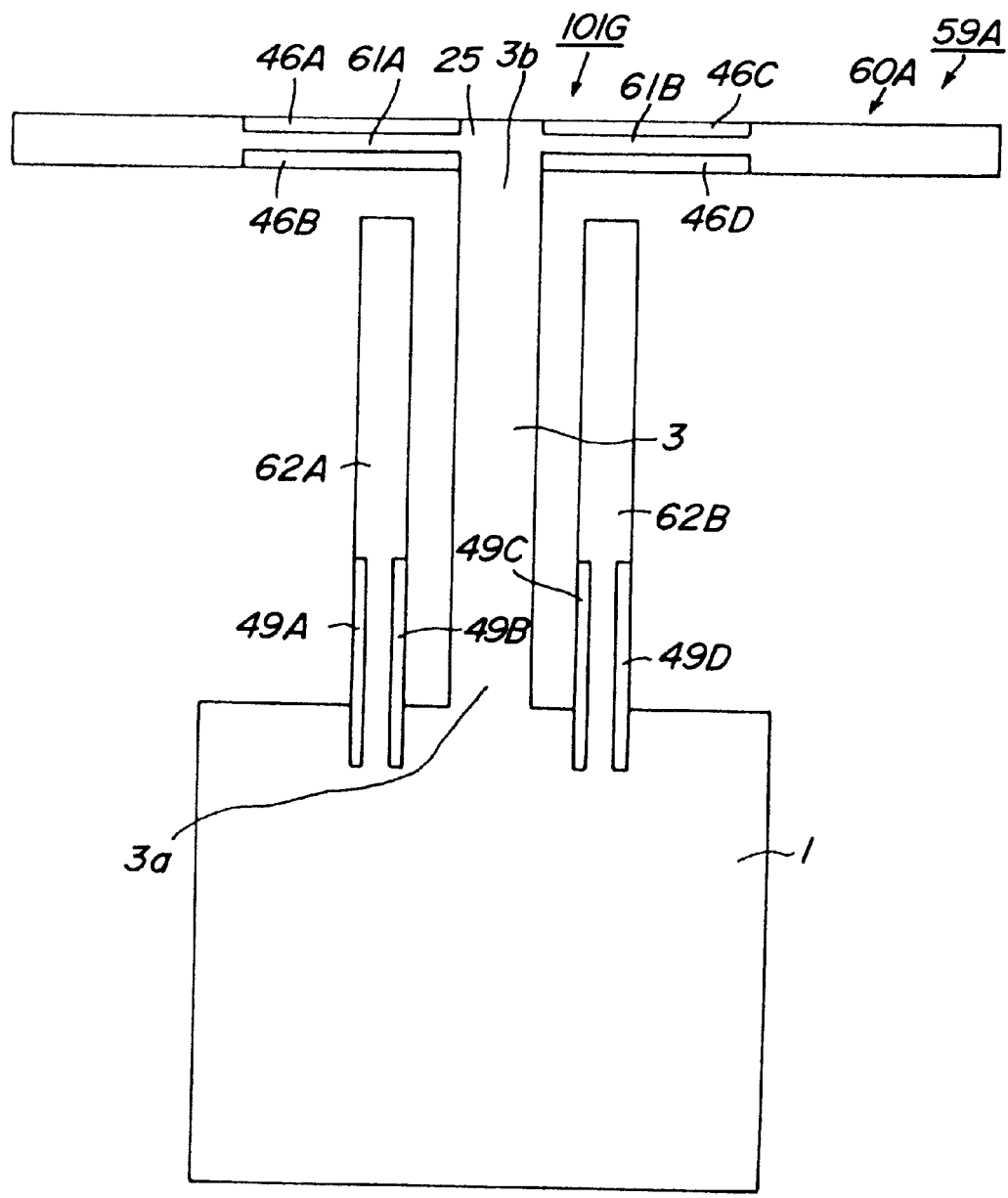
FIG_14

FIG_15
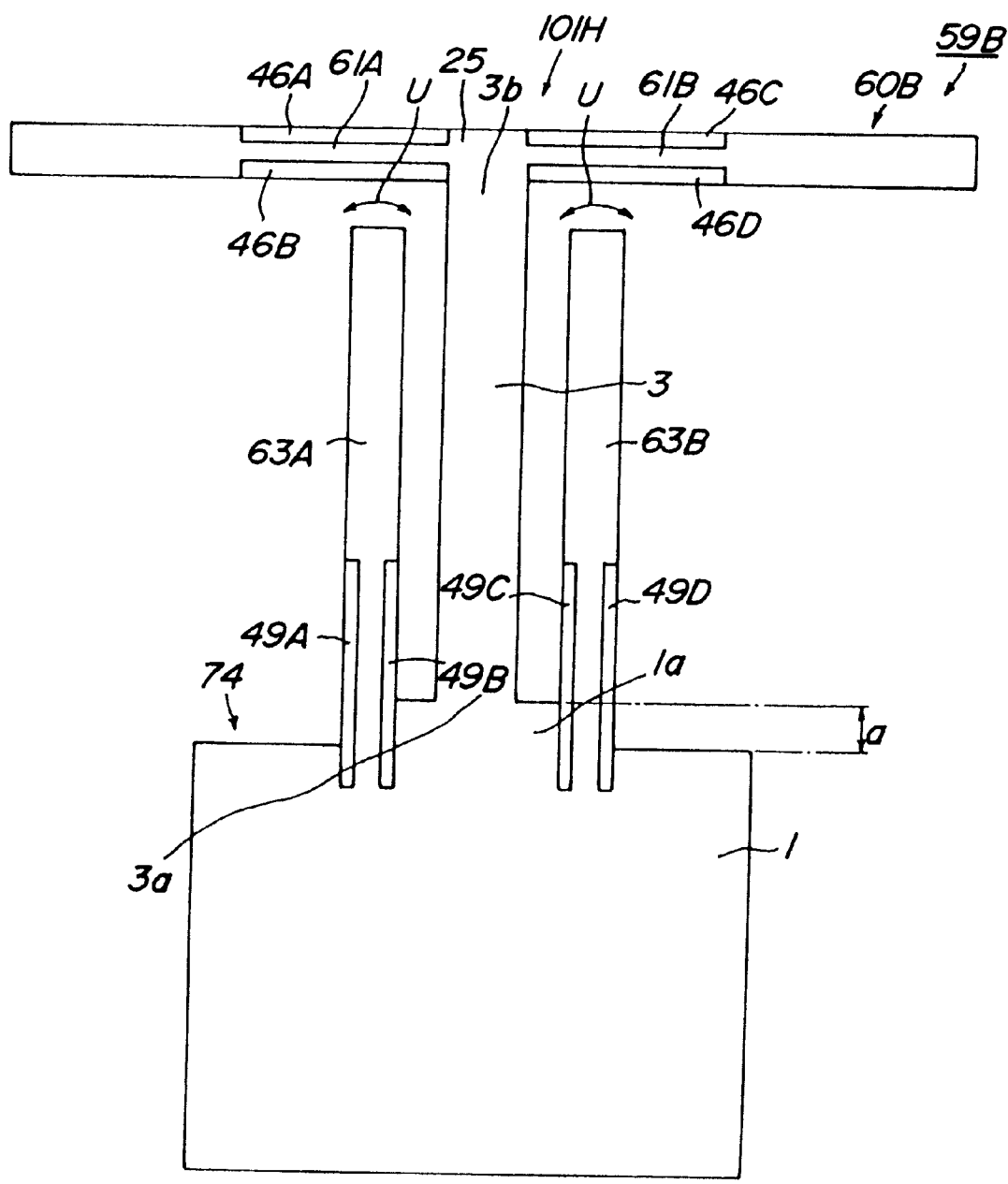

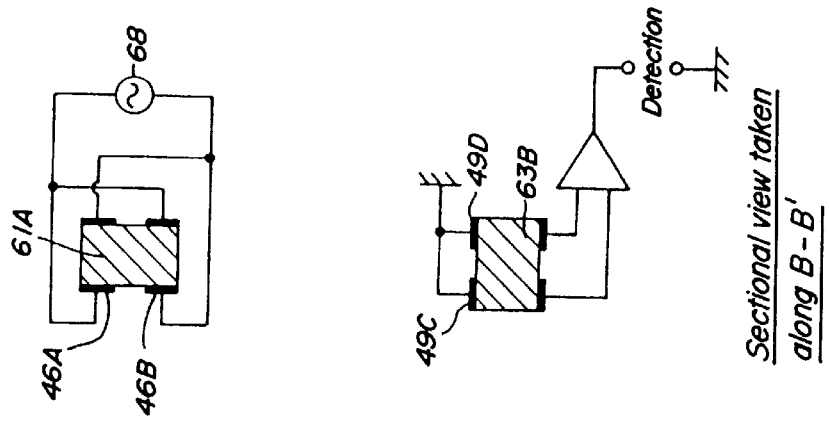
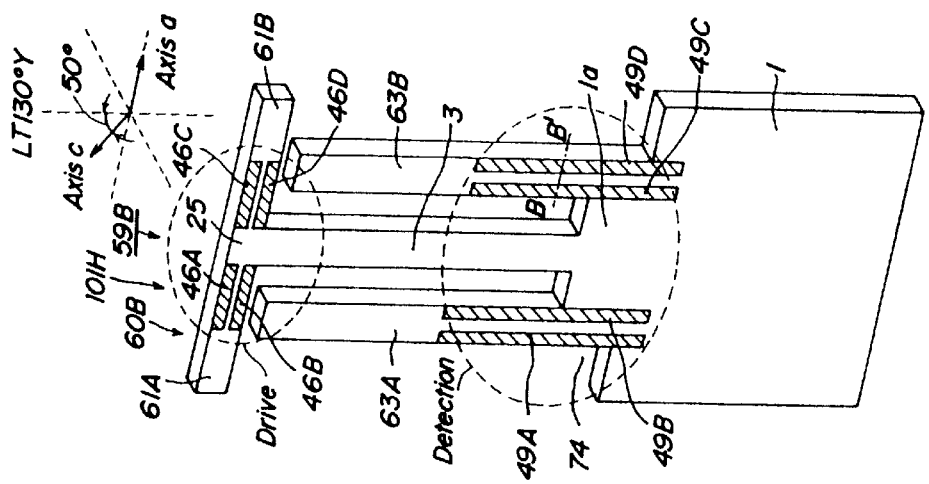
FIG. 16
Sectional view taken along B-B'

FIG. 18
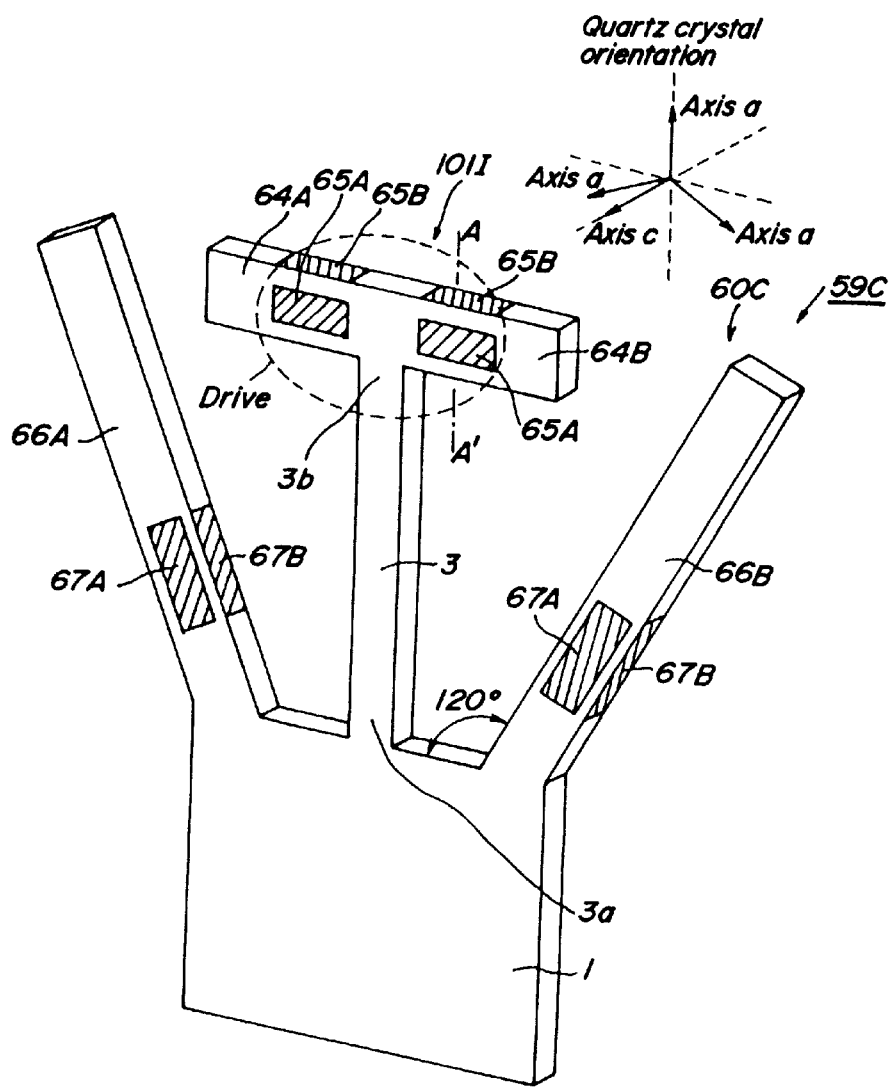
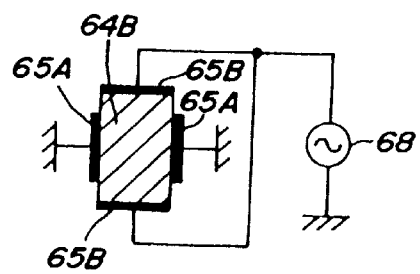
Sectional view taken along A-A'

FIG._24
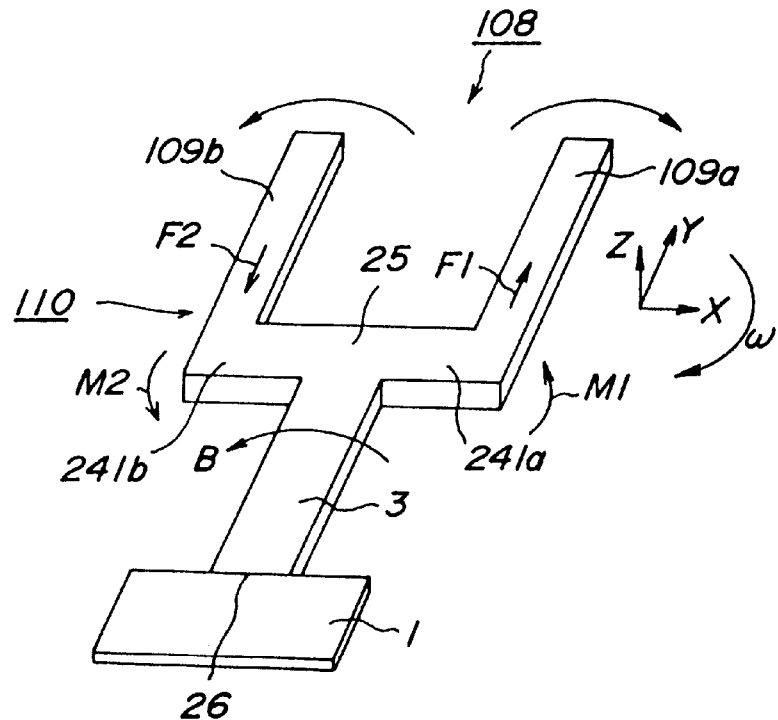
FIG._25
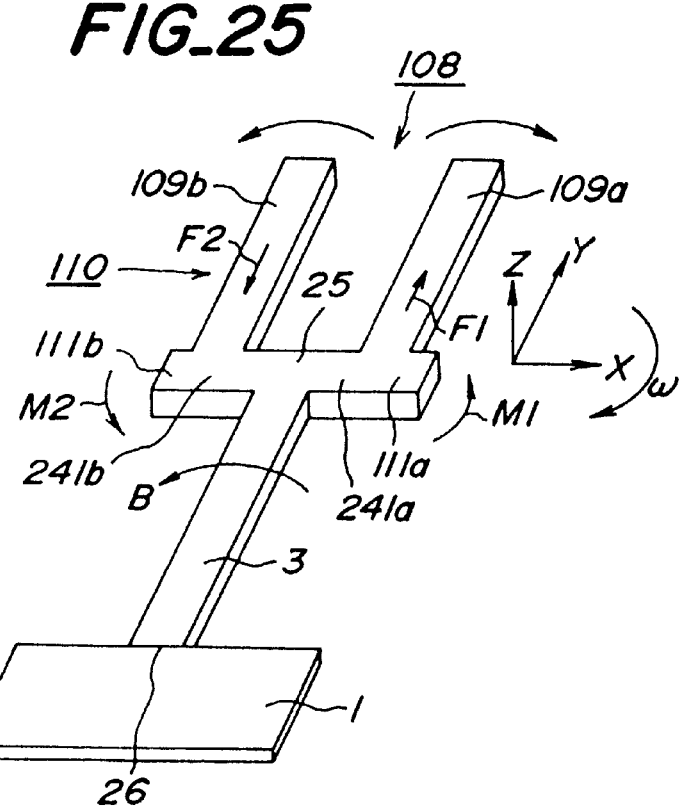

FIG_26
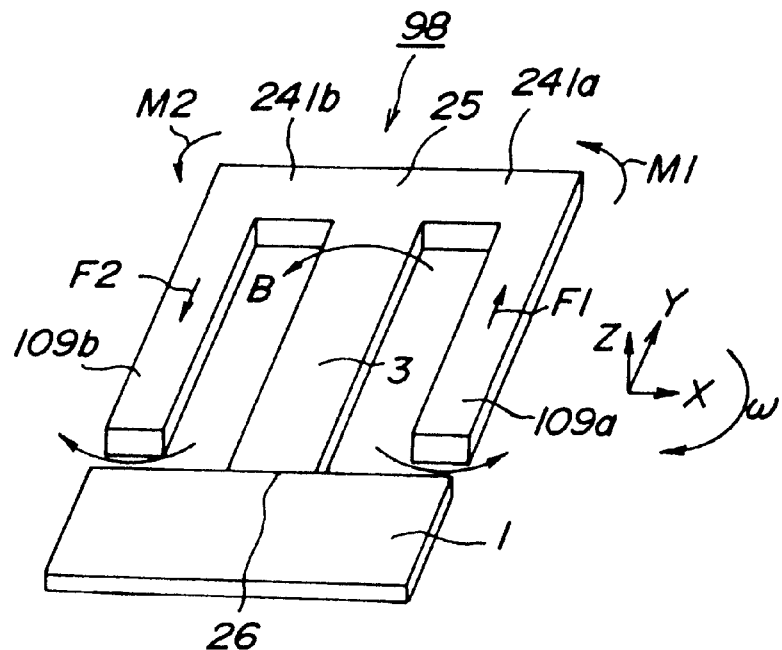
FIG_27
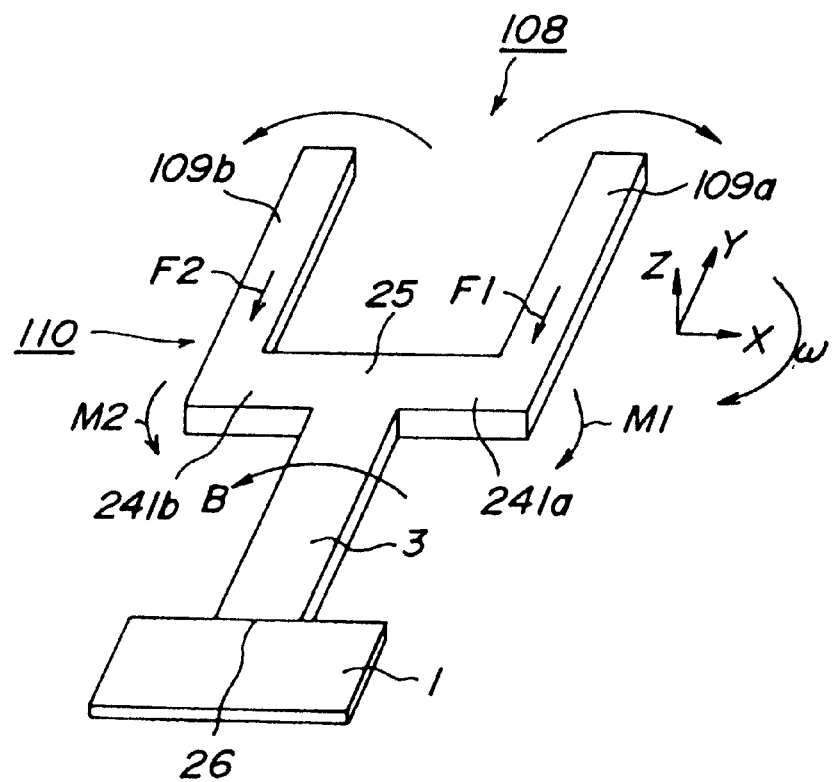

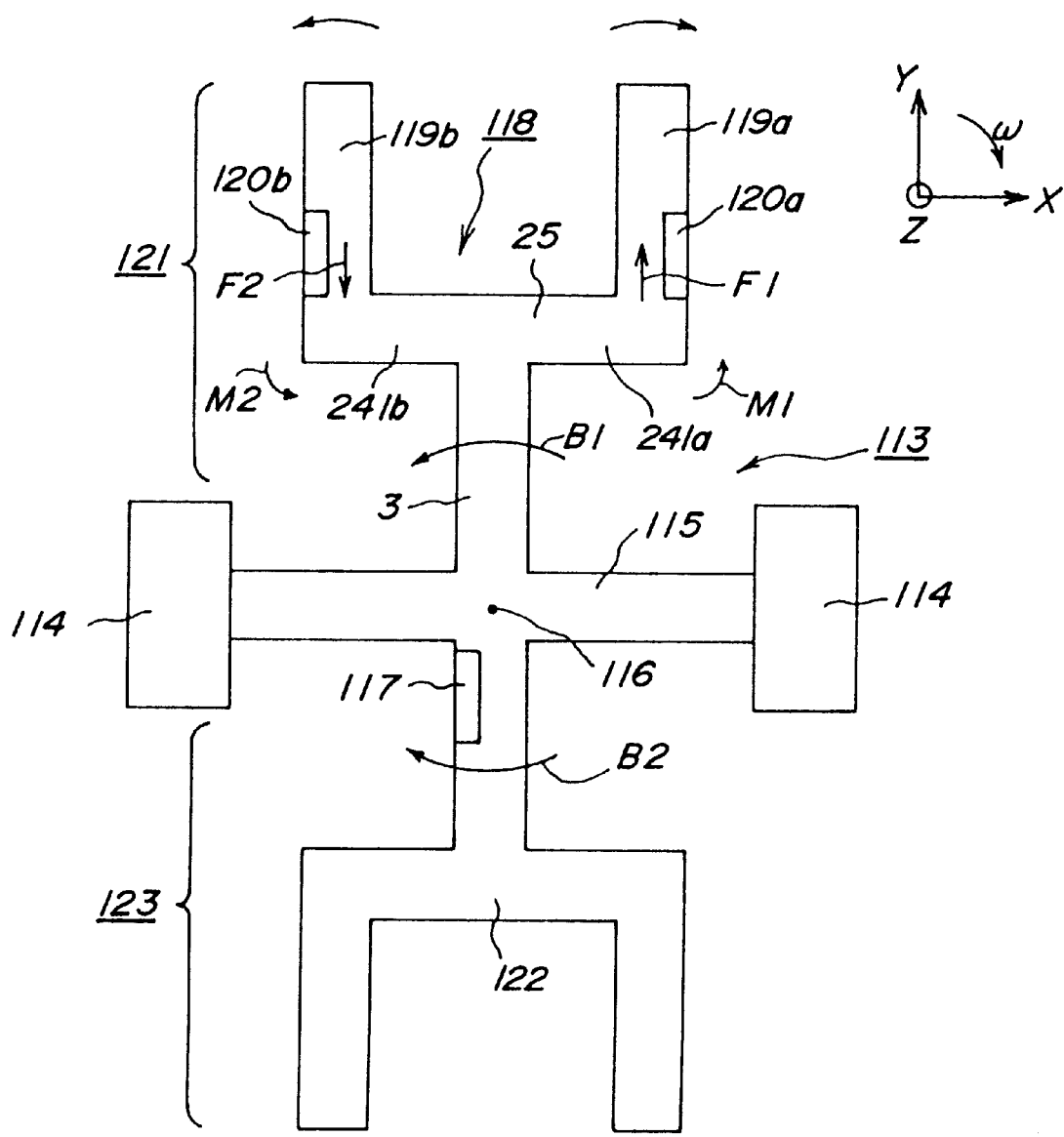
FIG_28

FIG_29a
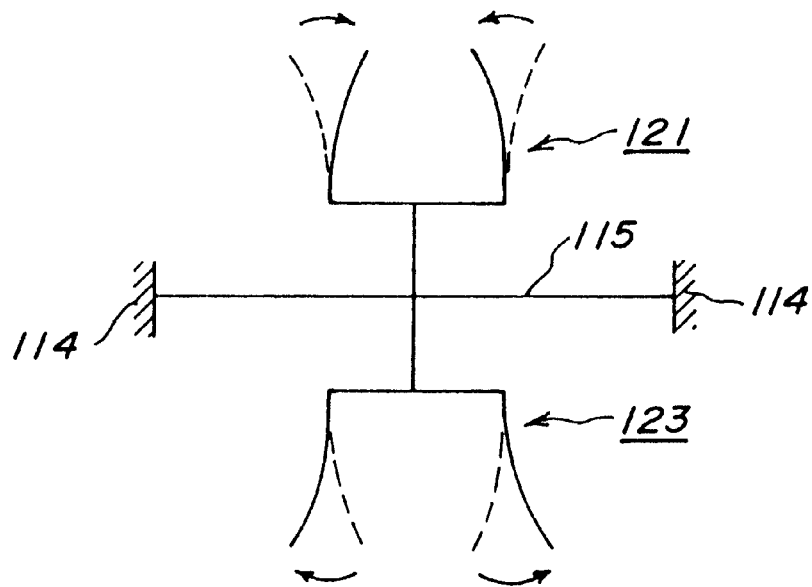
FIG_29b
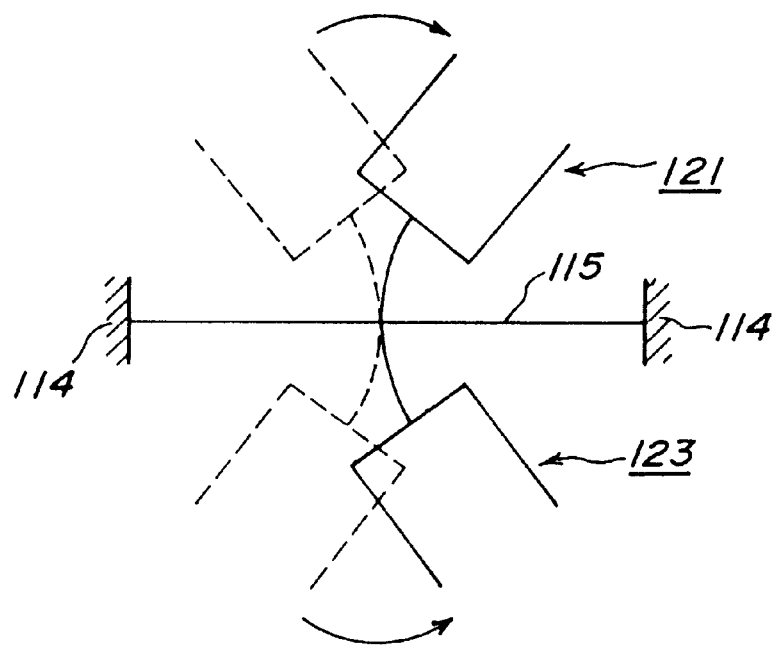

FIG_30
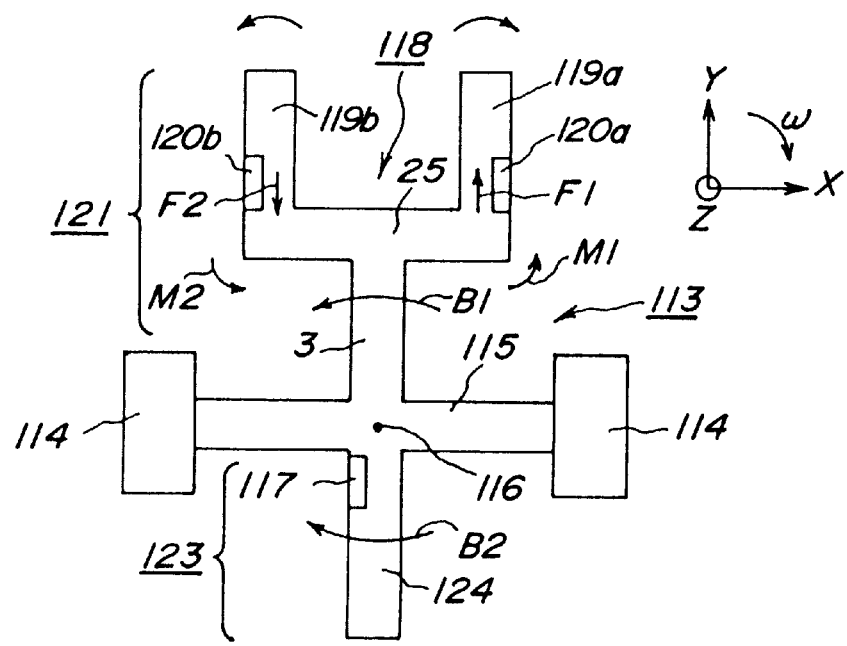
FIG_31
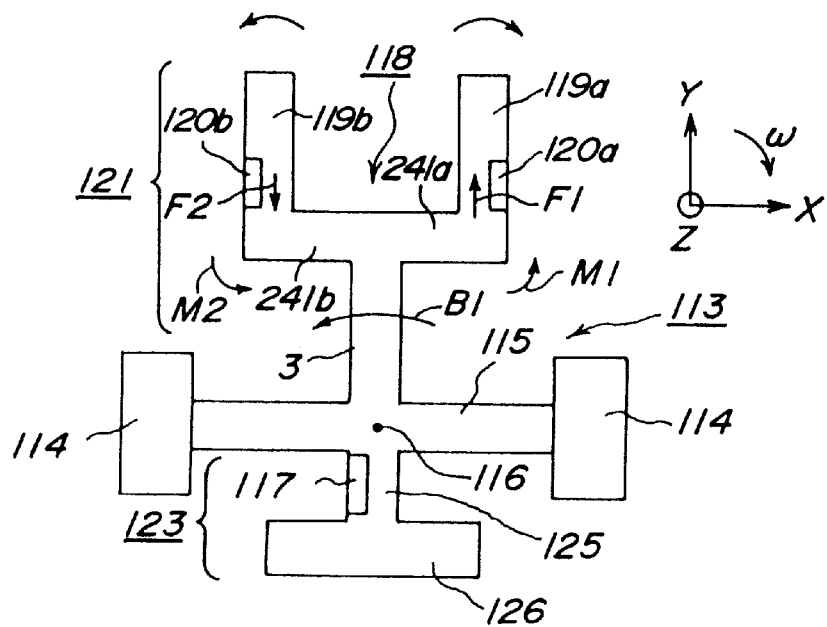

FIG_32
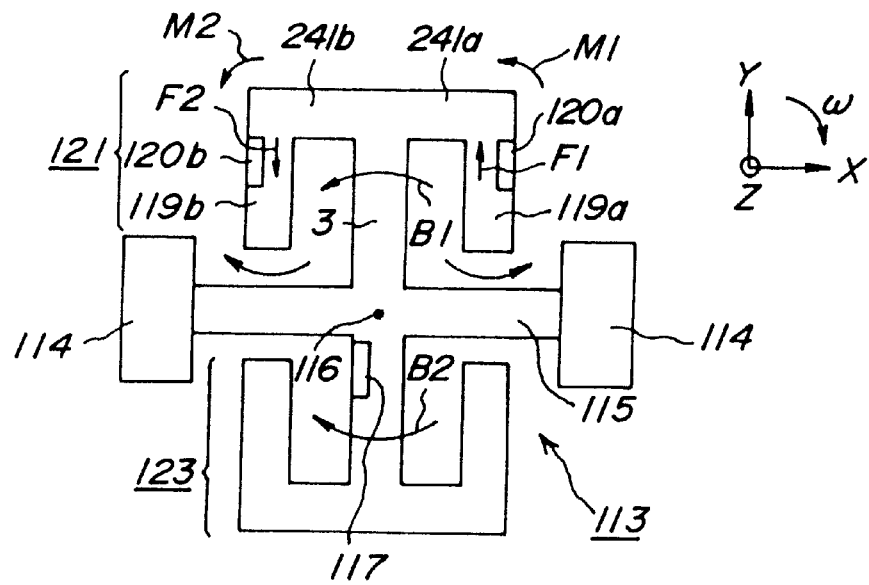
FIG_33
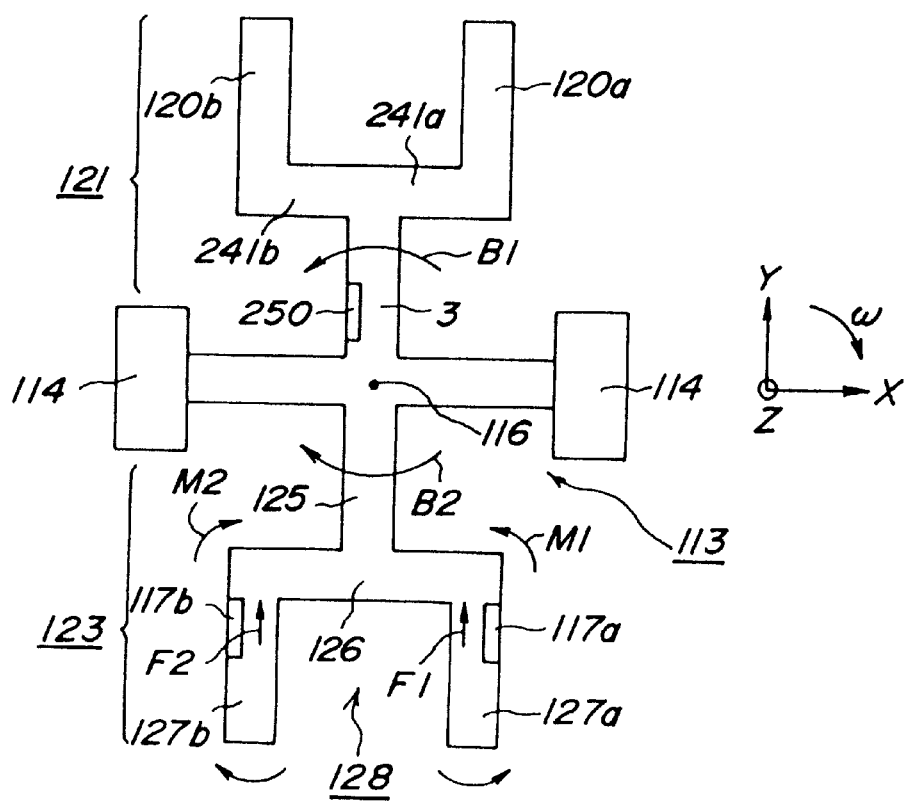

FIG_34
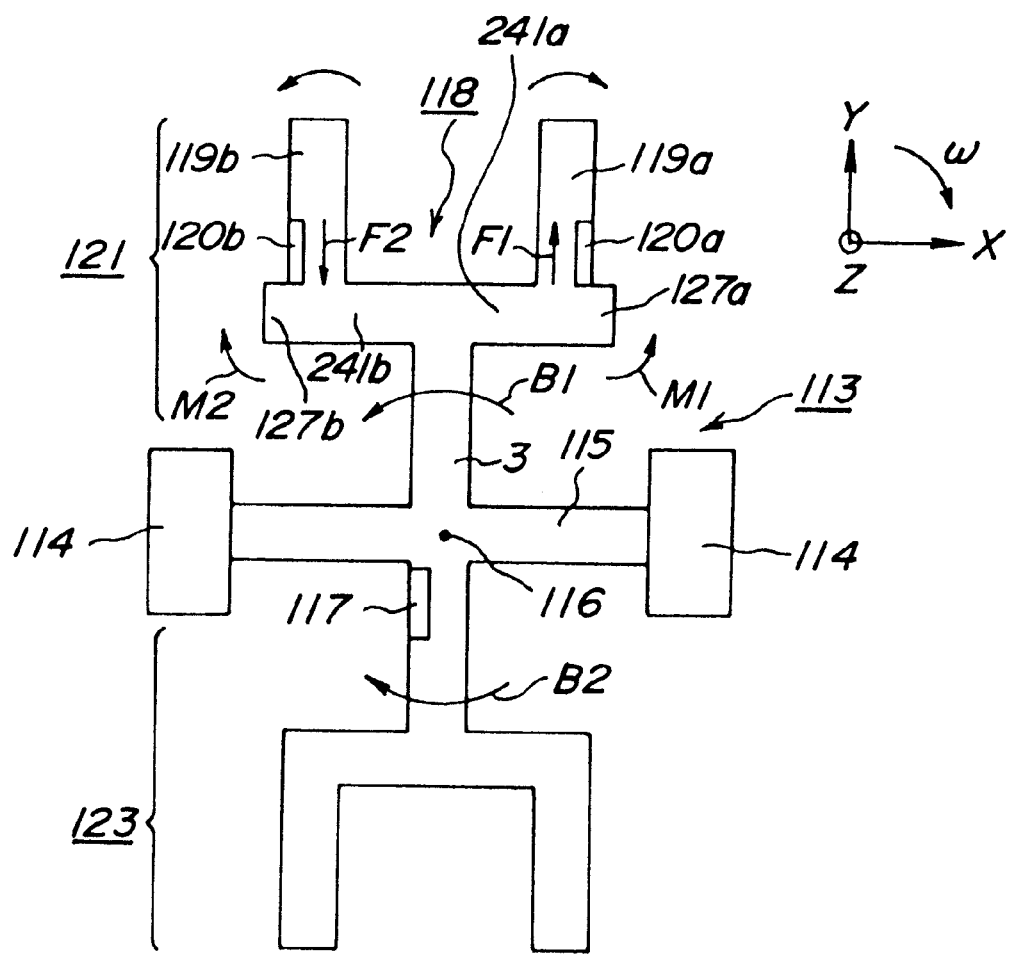

FIG_37

FIG_40
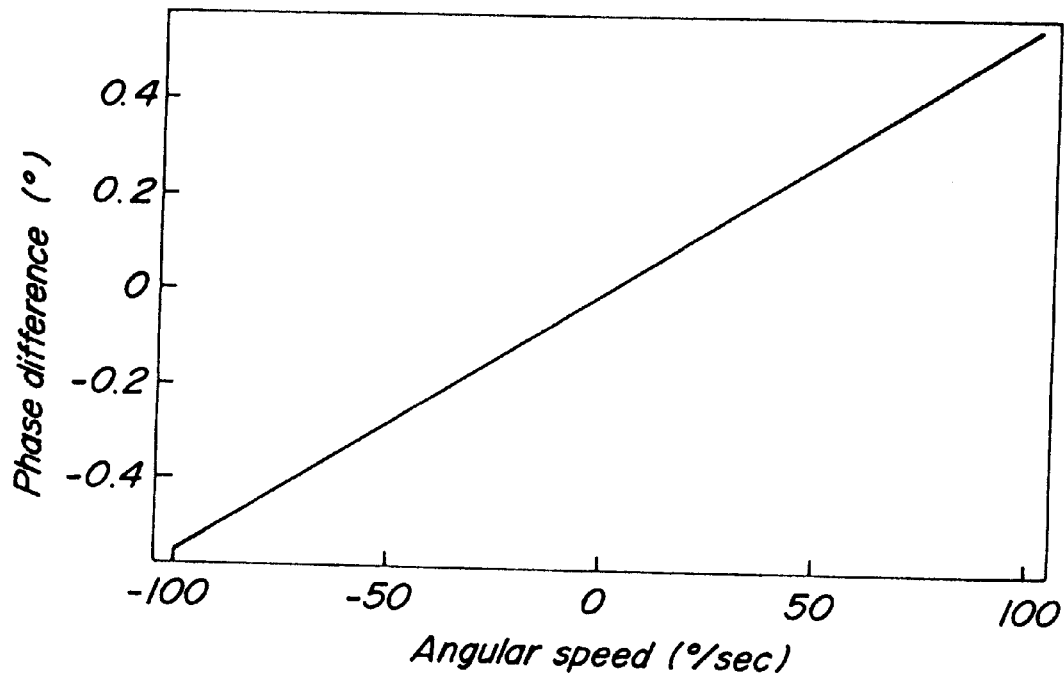
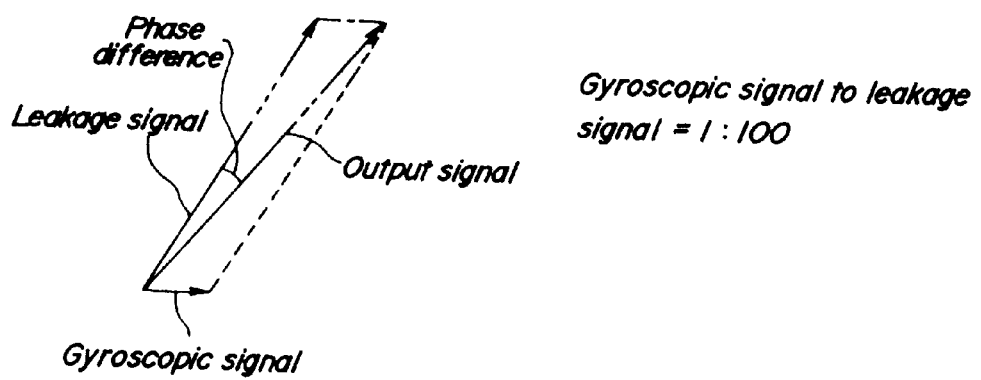
Gyroscopic signal to leakage signal = 1 : 100

FIG_41
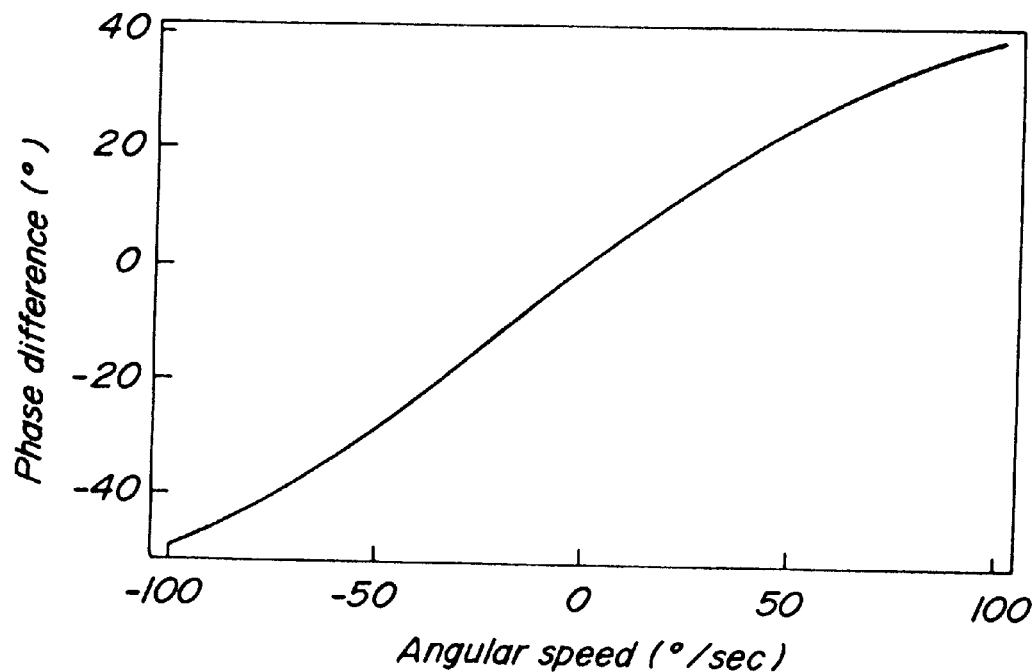
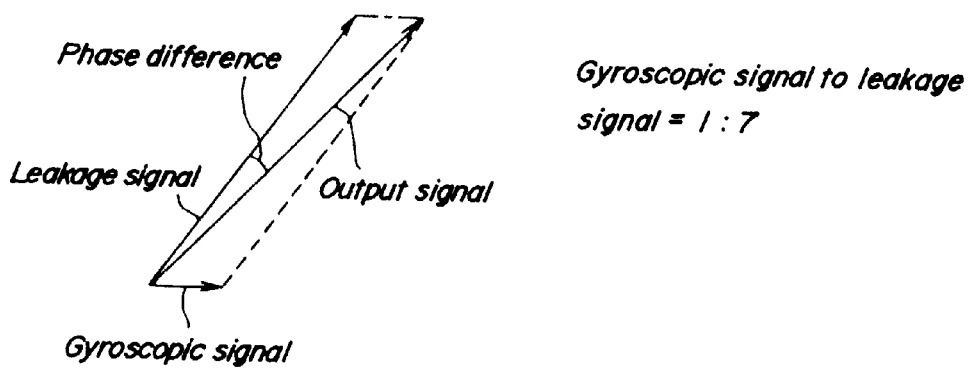
Gyroscopic signal to leakage signal = 1 : 7

FIG. 42
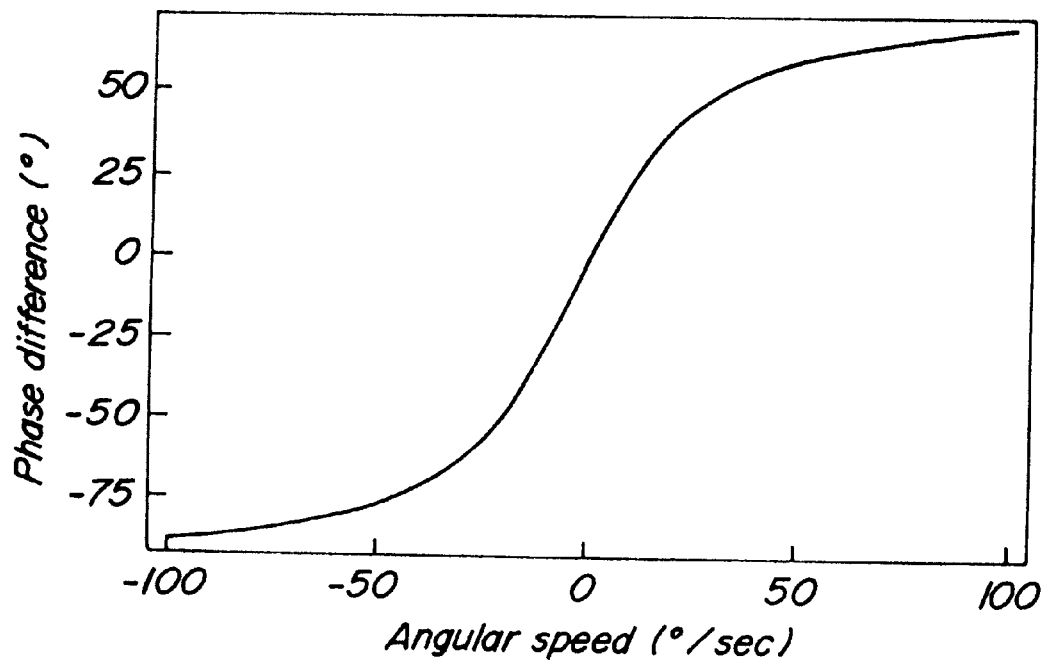
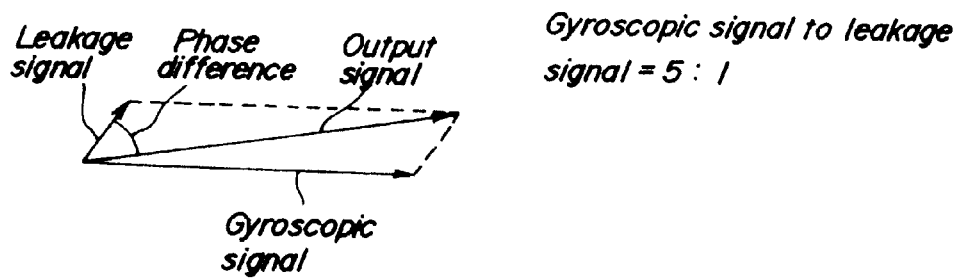
Gyroscopic signal to leakage signal = 5 : 1

FIG_43
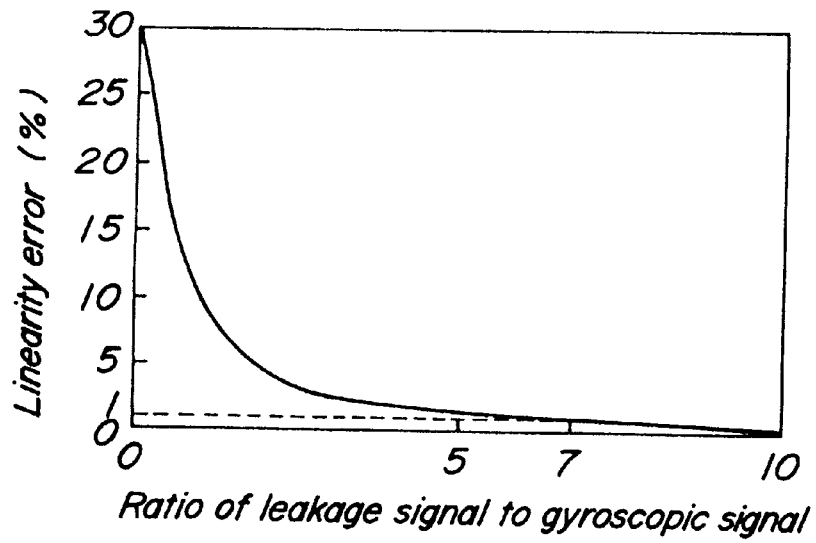
FIG_44
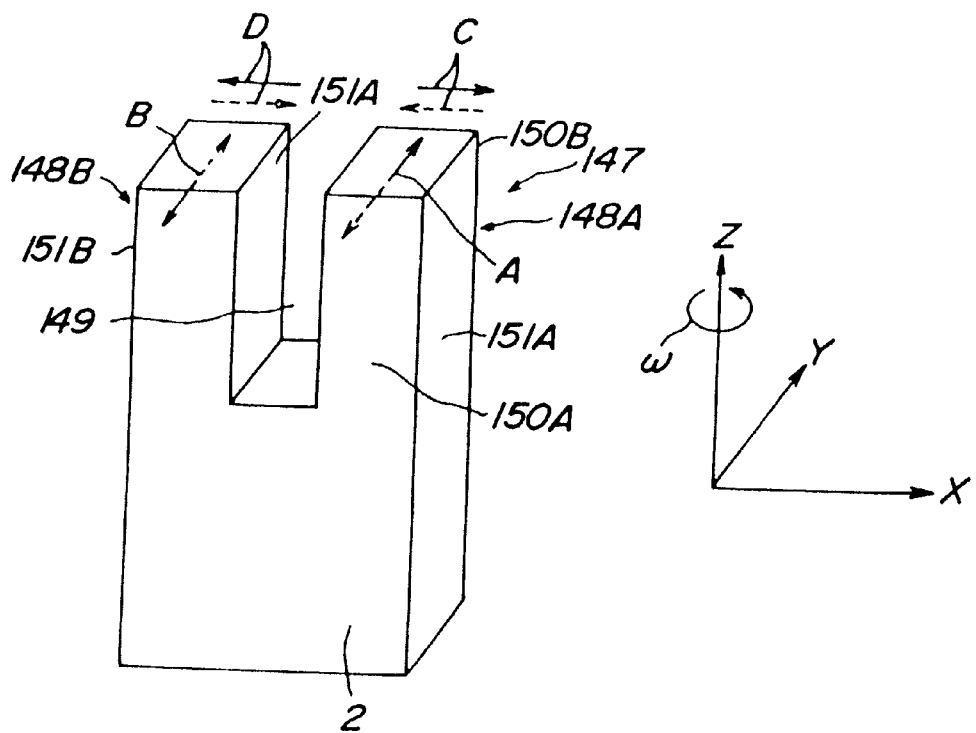

FIG_45a
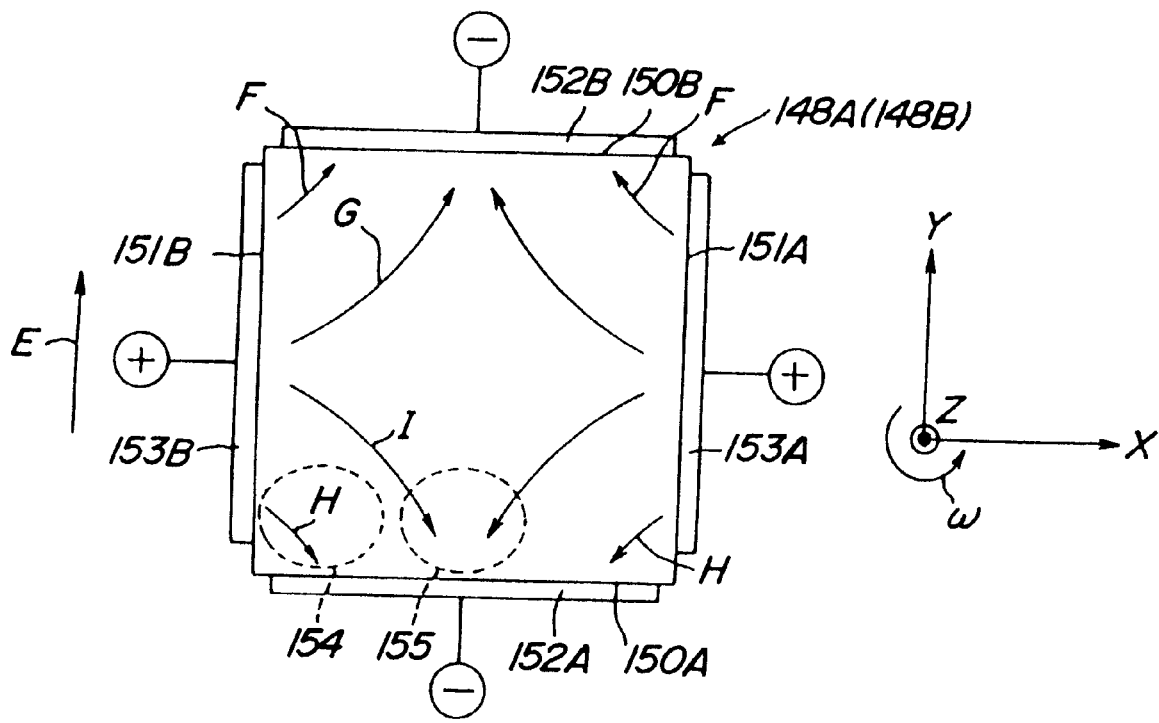
FIG_45b
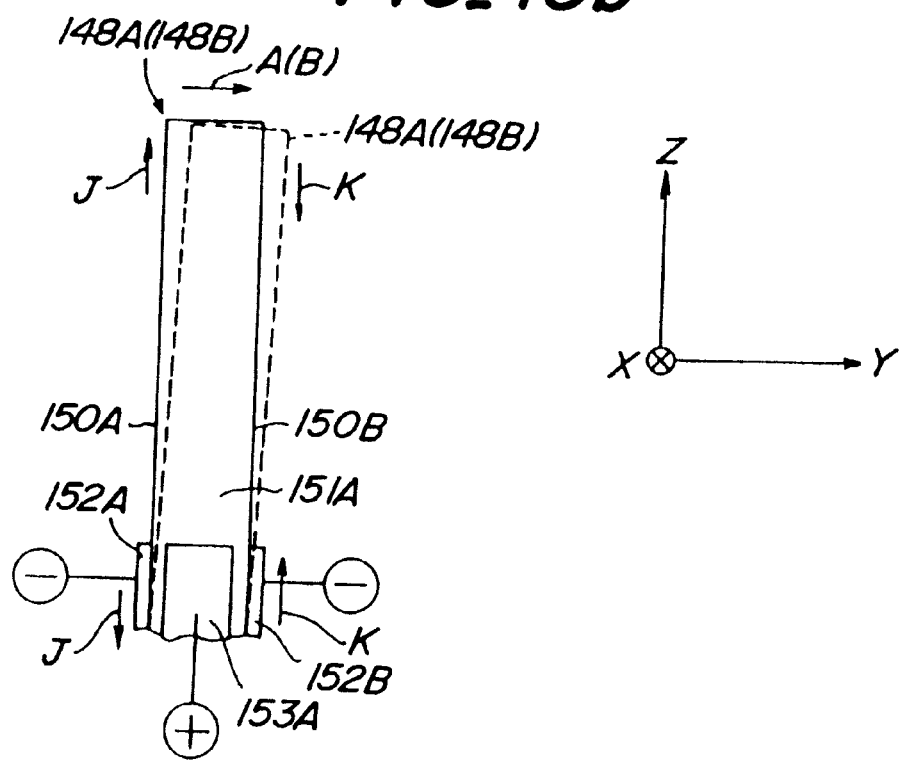

FIG_48
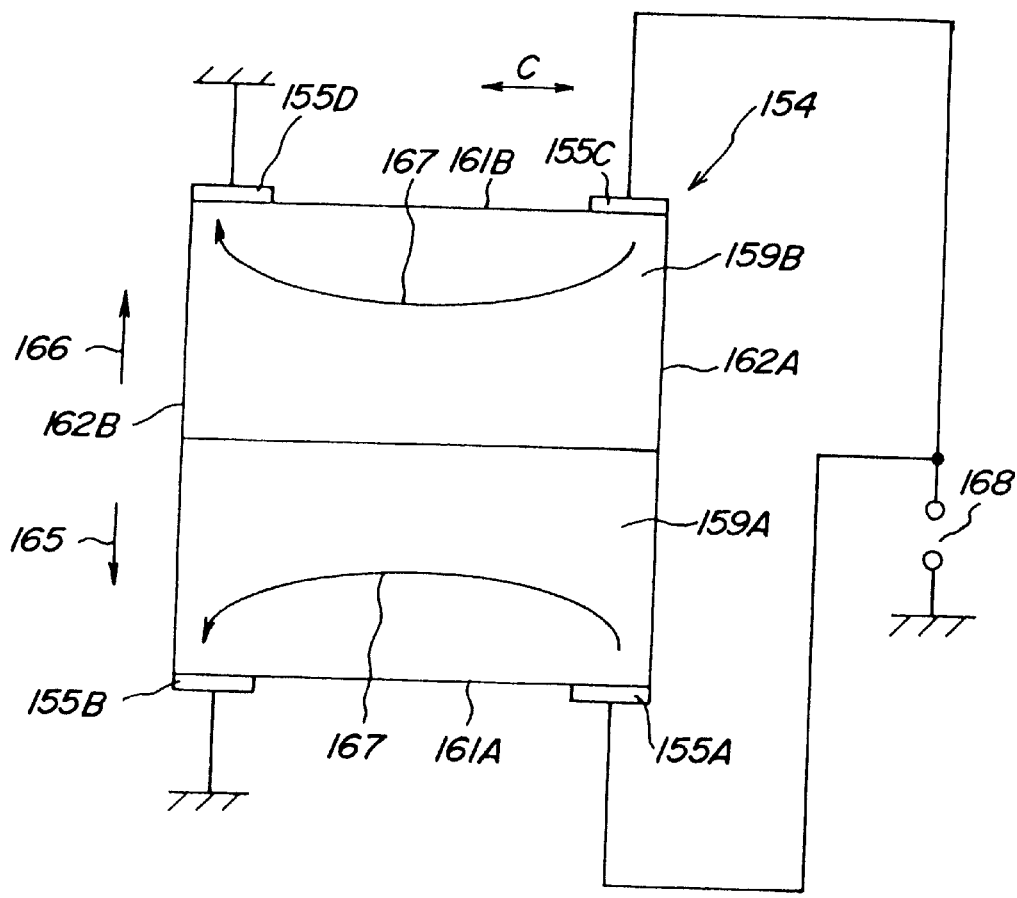
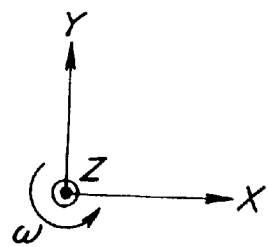

FIG_49a
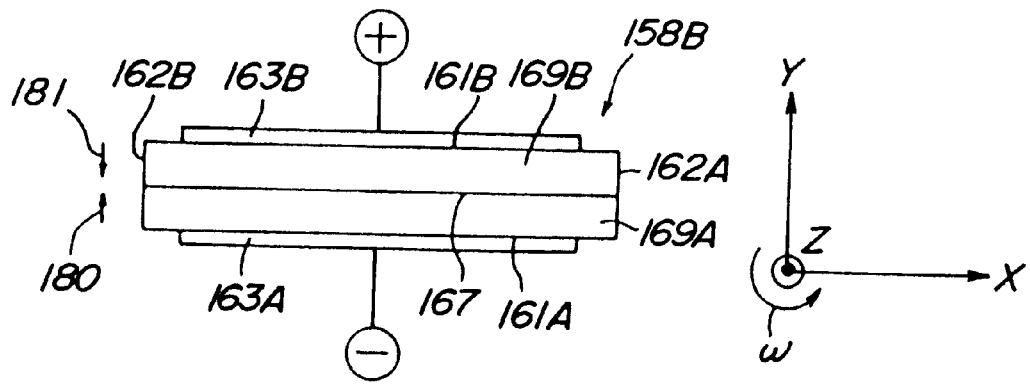
FIG_49b
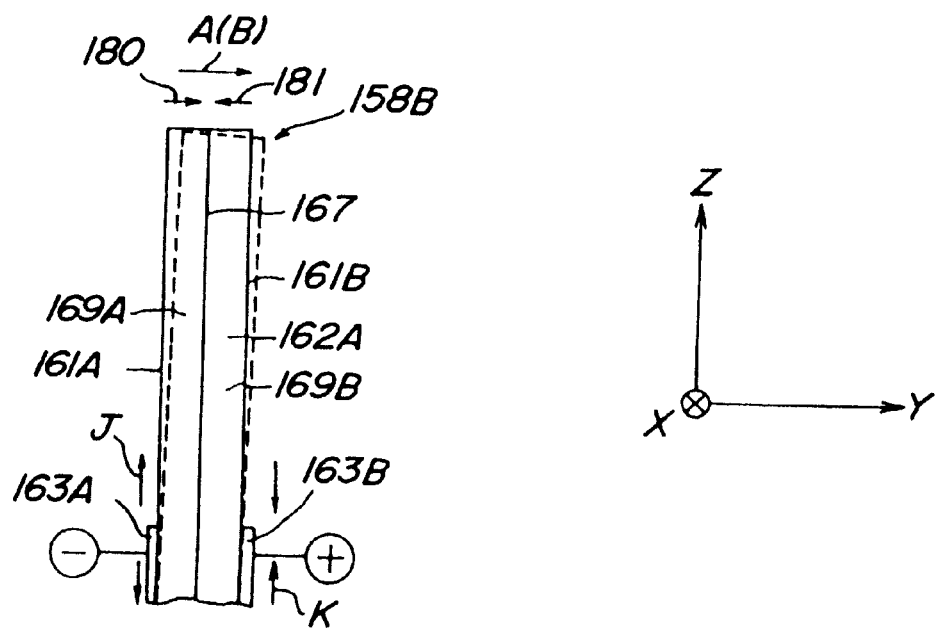

FIG_50a
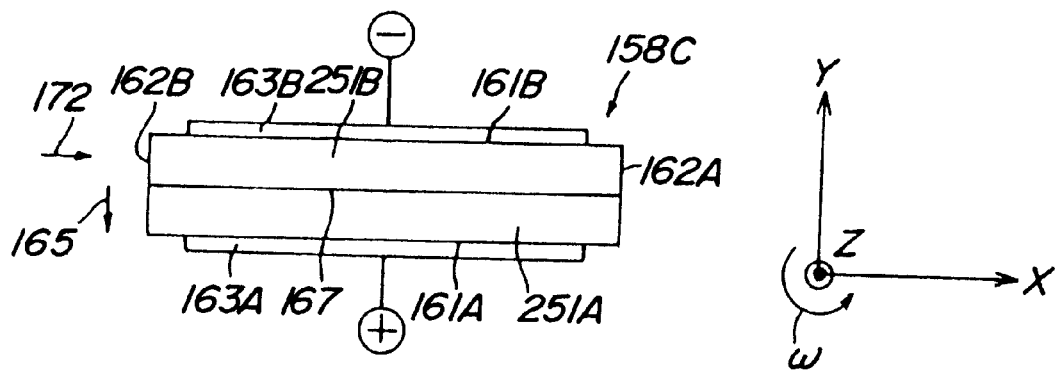
FIG_50b
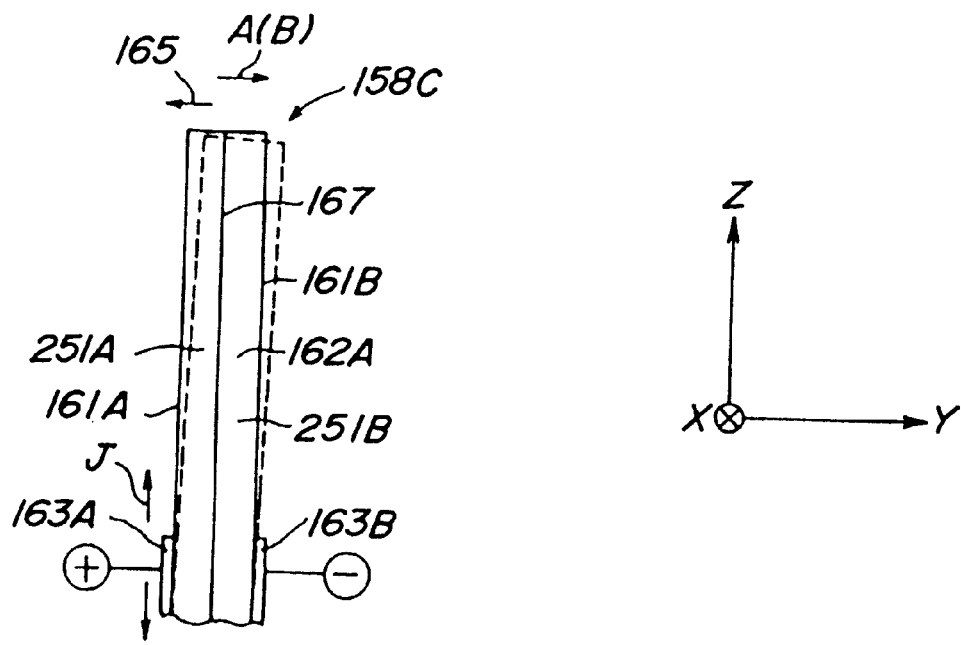

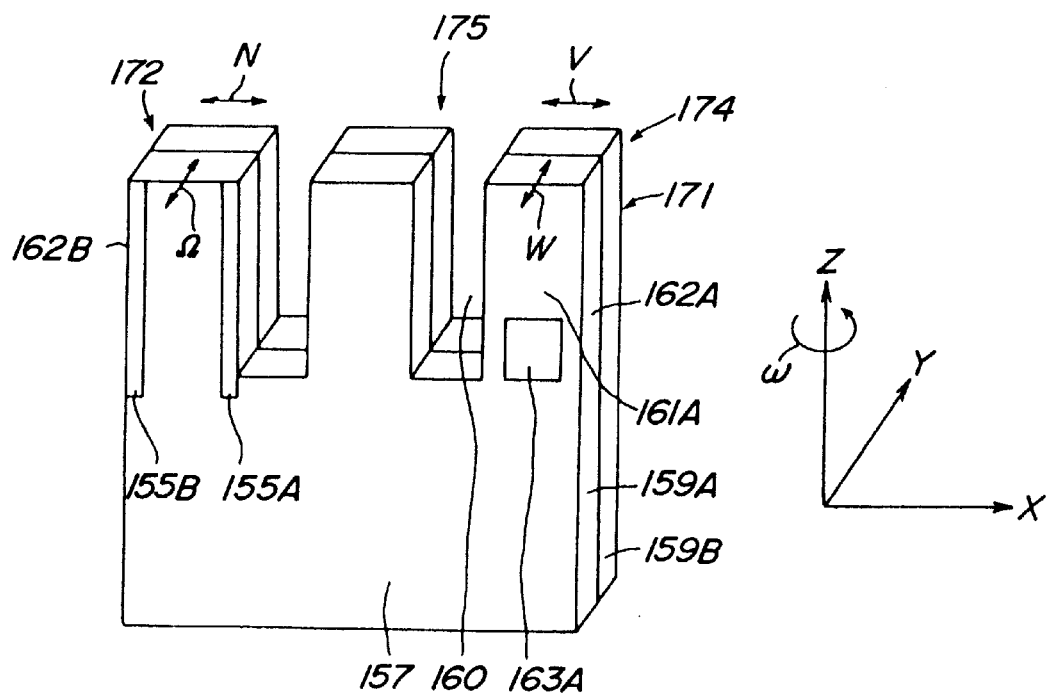
FIG_53

FIG_54a
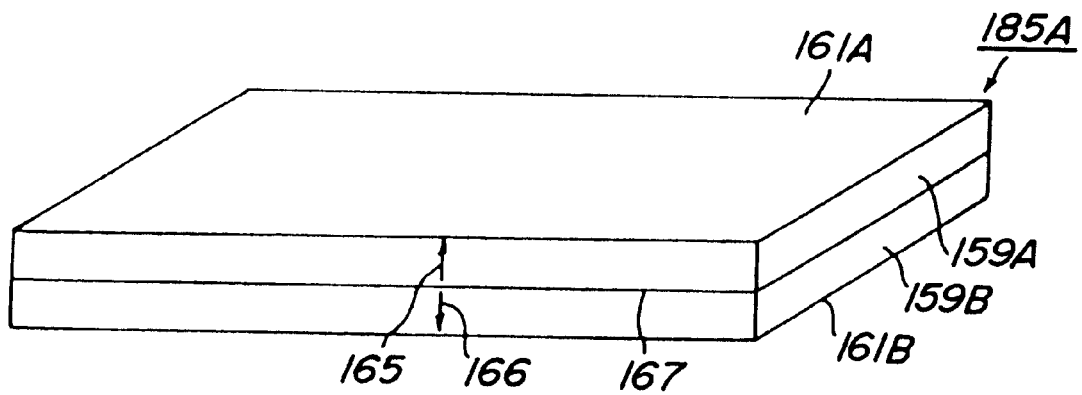
FIG_54b
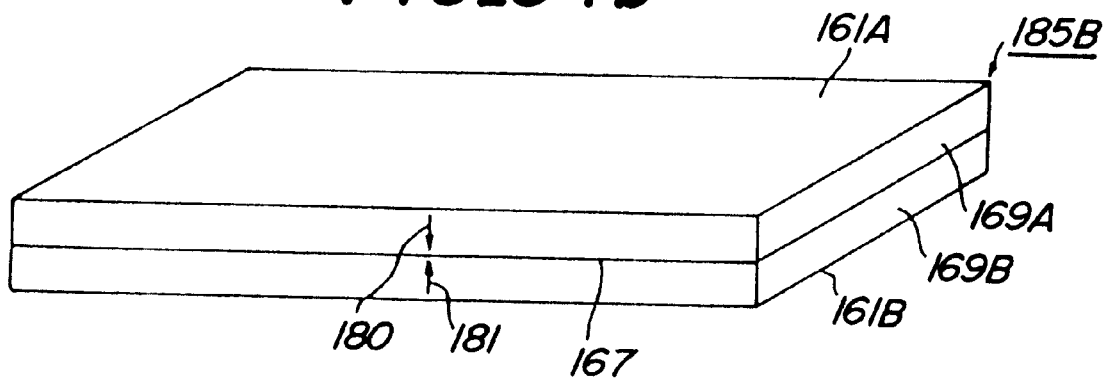
FIG_54c
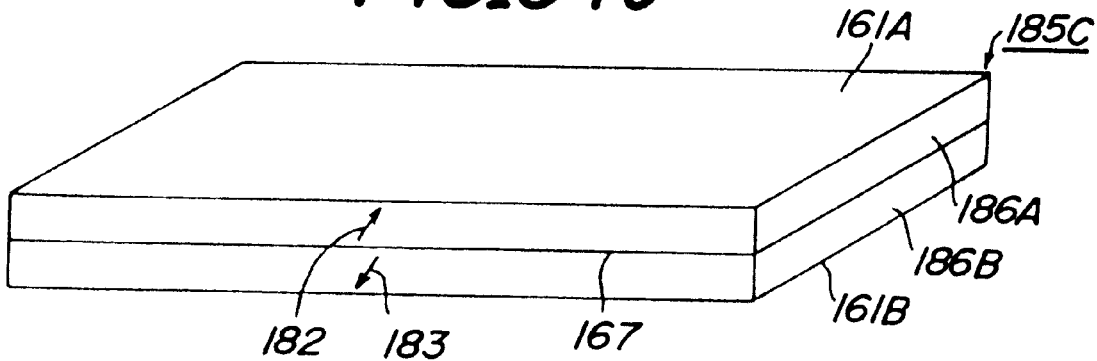

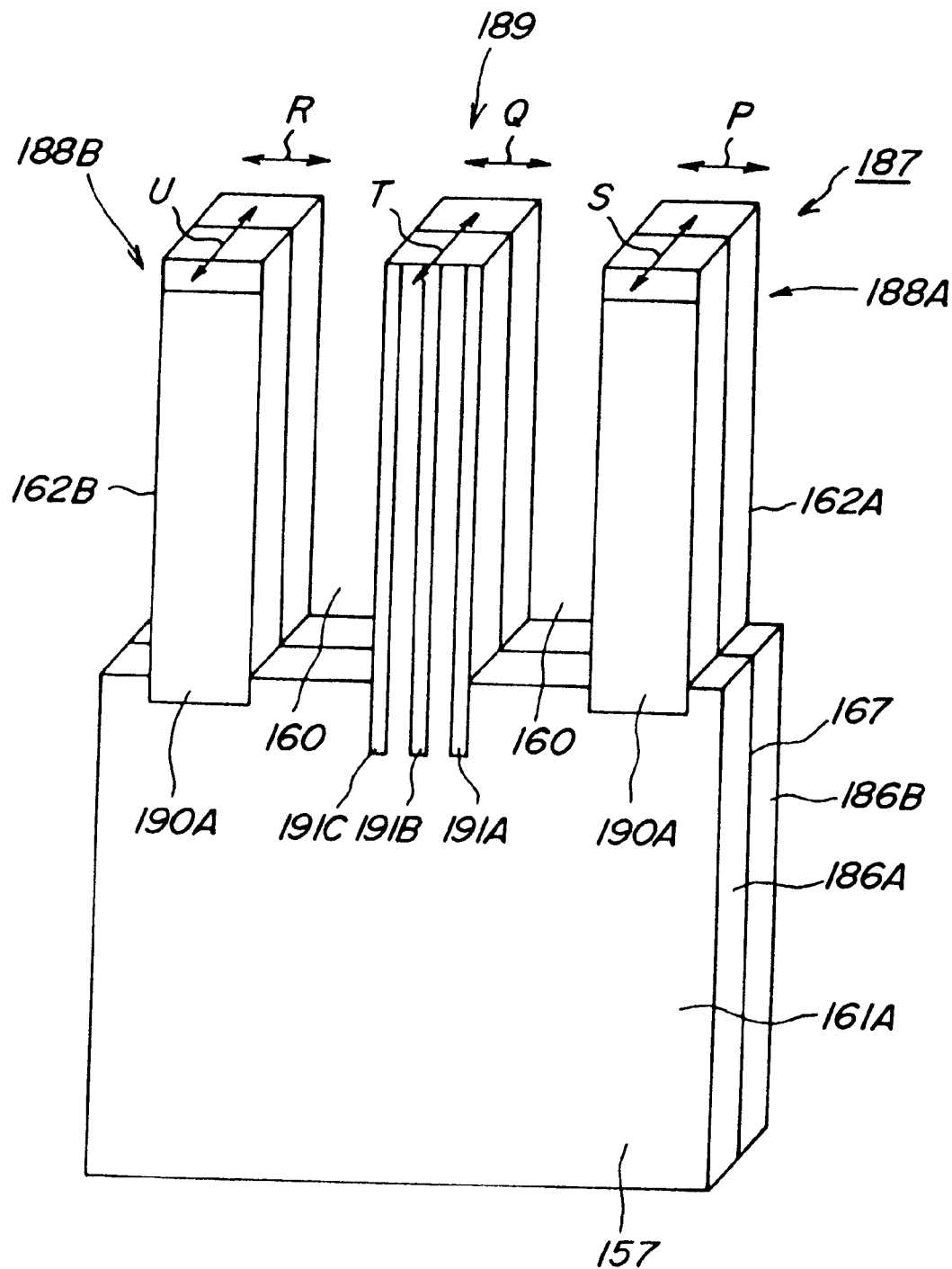
FIG_55

FIG_56
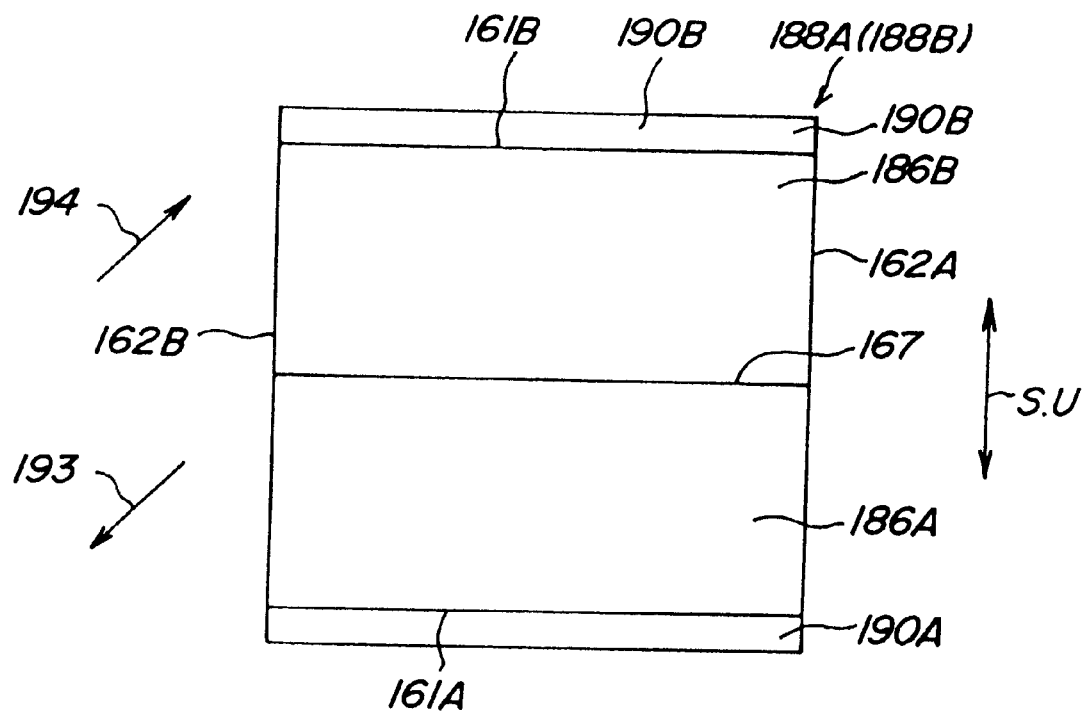

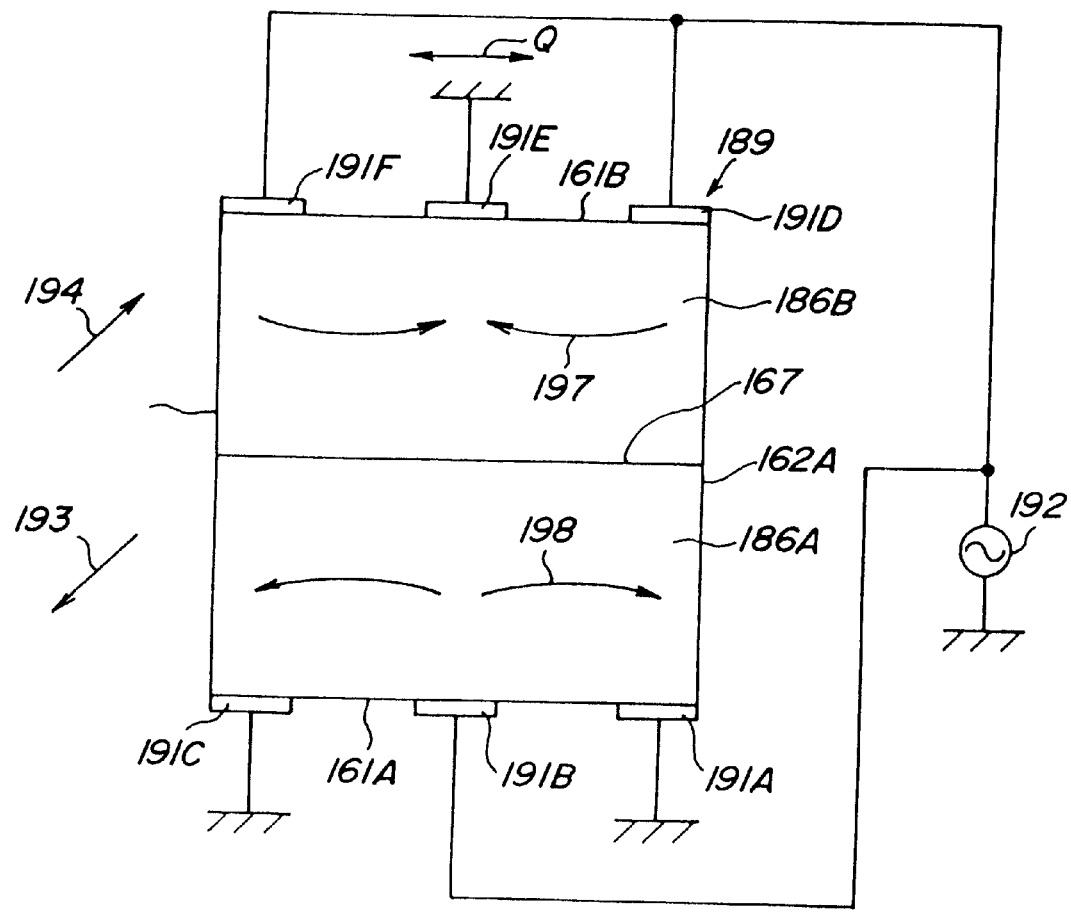
FIG_57

FIG_58
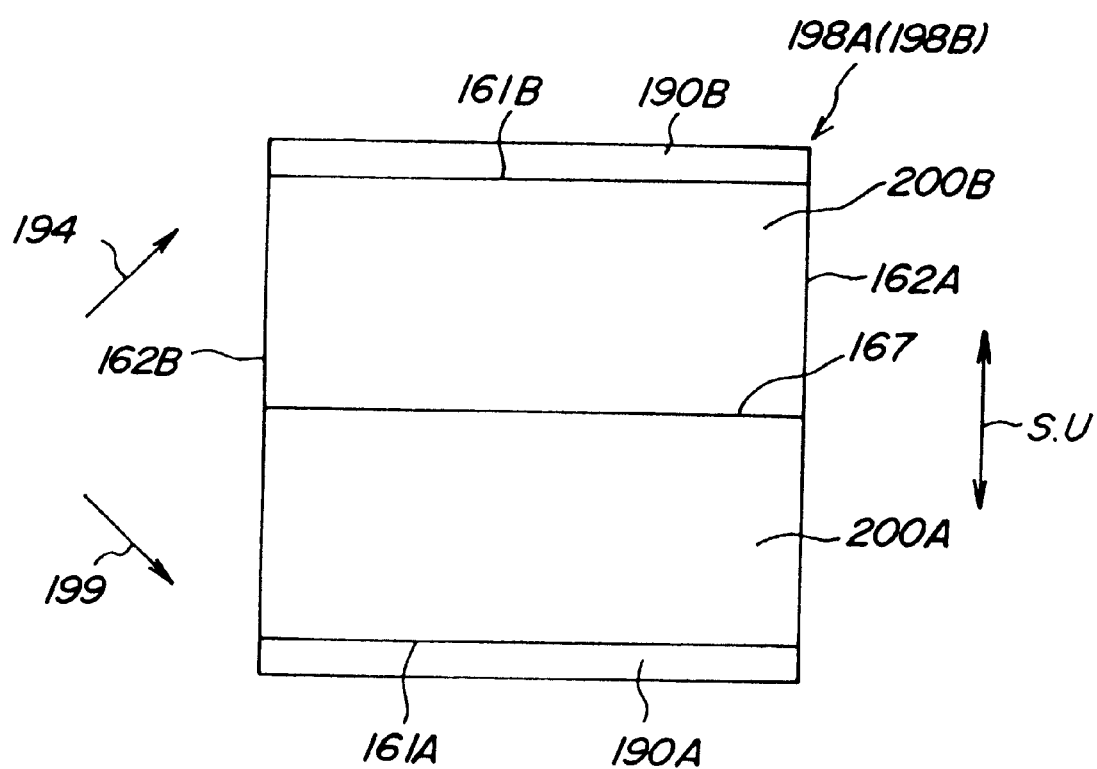

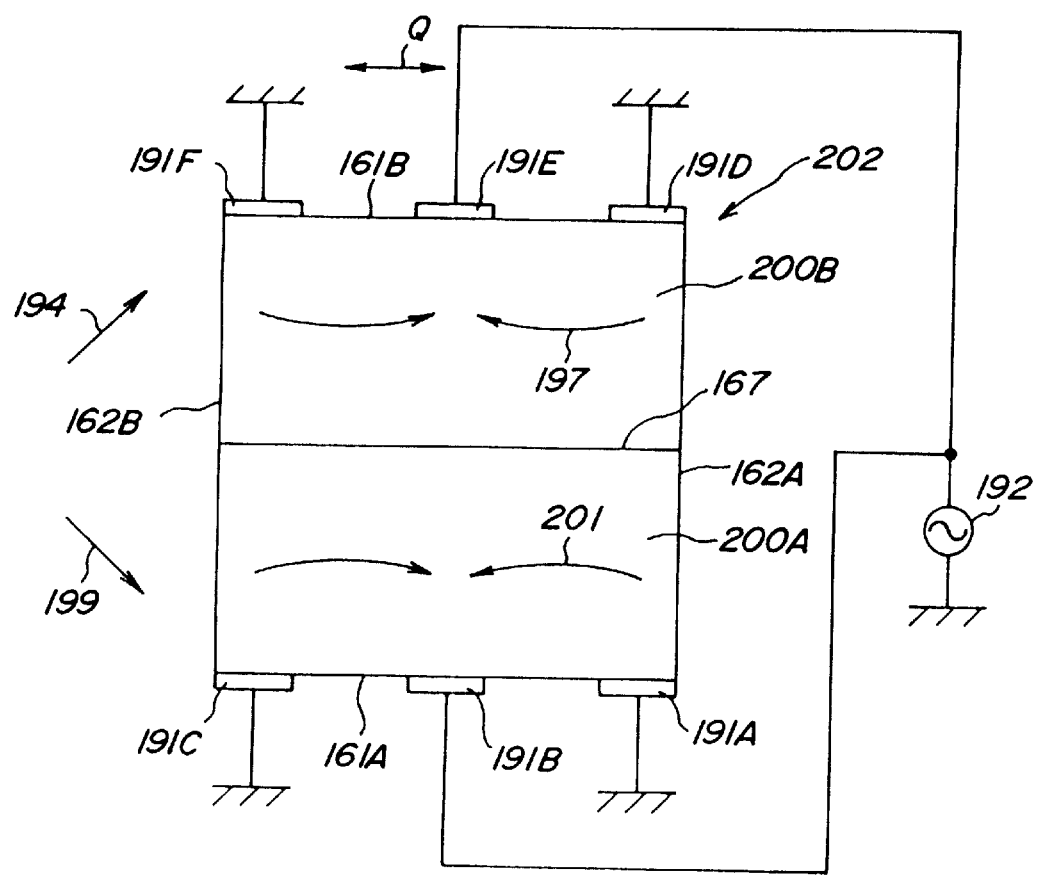
FIG_59

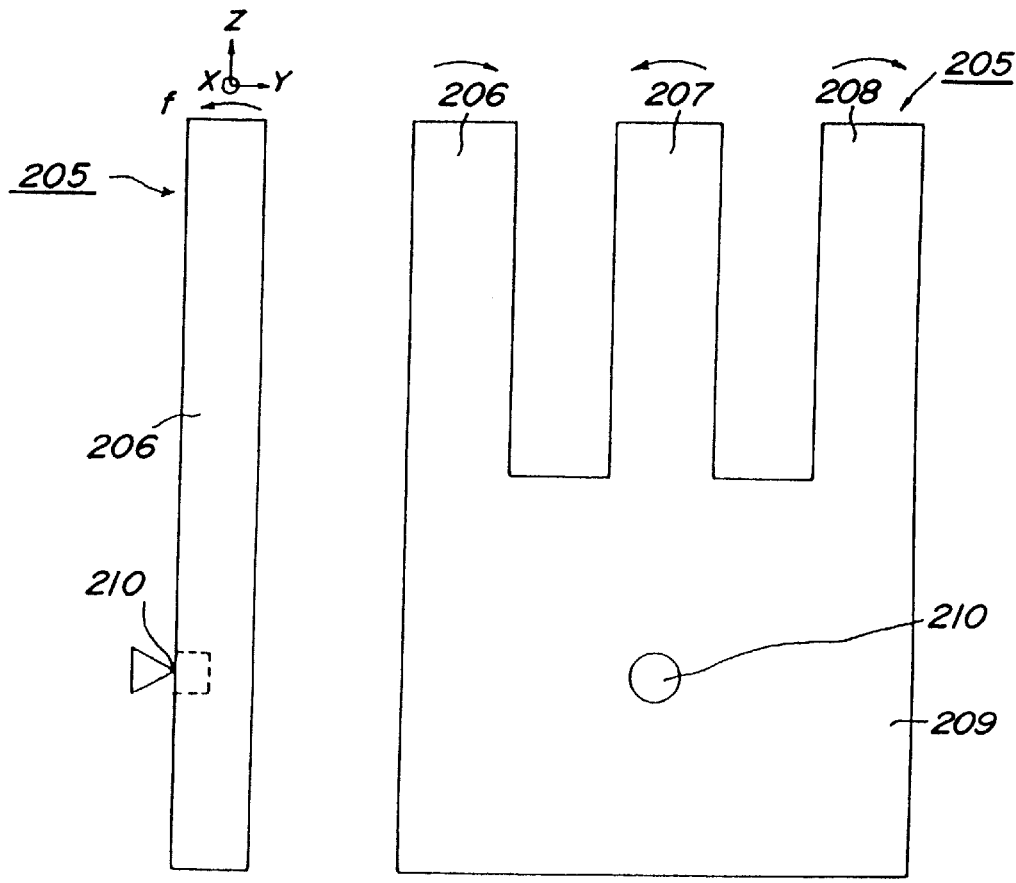
FIG_60a  FIG_60b
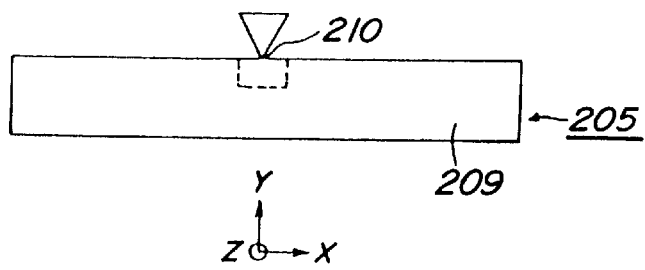
FIG_60c

FIG_61a
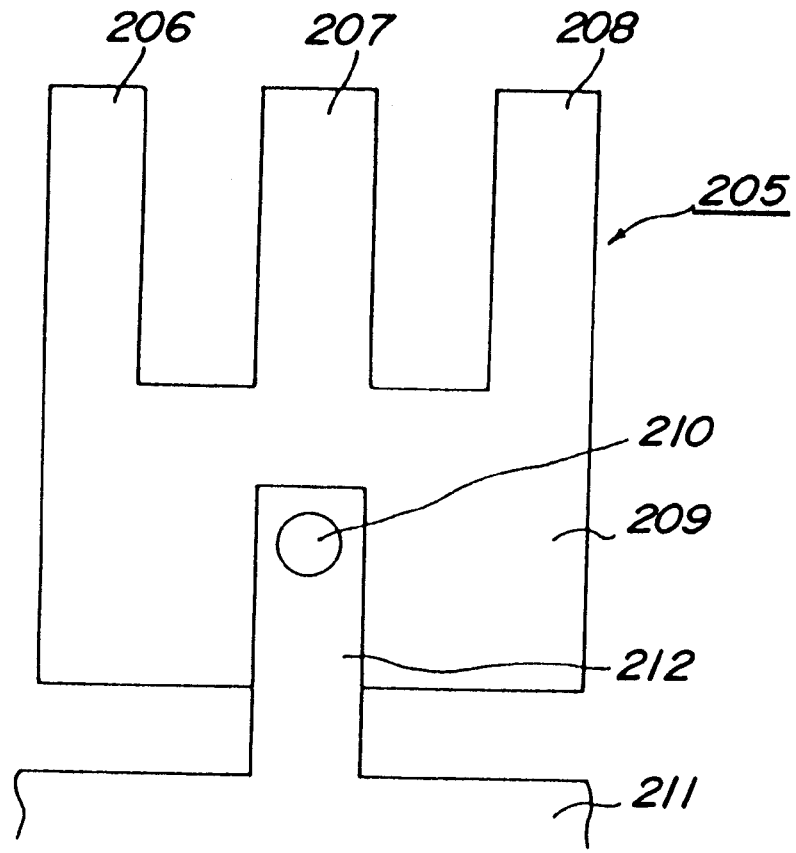
FIG_61b
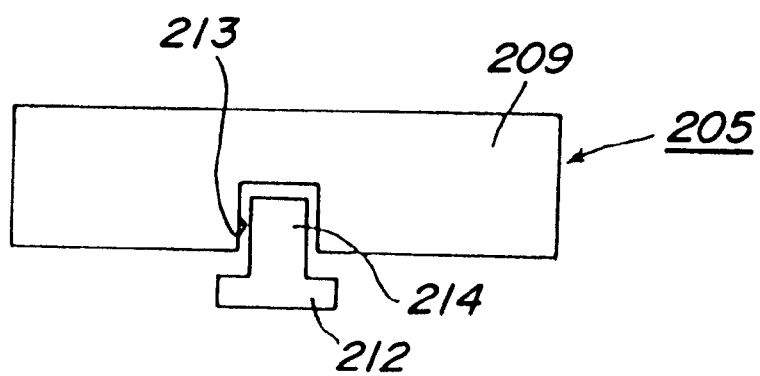

Distribution of vibration amplitudes obtained by a natural mode analysis of a face-parallel vibration Ratio of amplitude at a domain to amplitude at the maximum vibration amplitude point

- Less than 1/1000
- Less than 2/1000
- Less than 1/100
- Less than 2/100
- Less than 1/10
- Less than 2/10
- Less than 5/10
- Less than 1/1

FIG_63
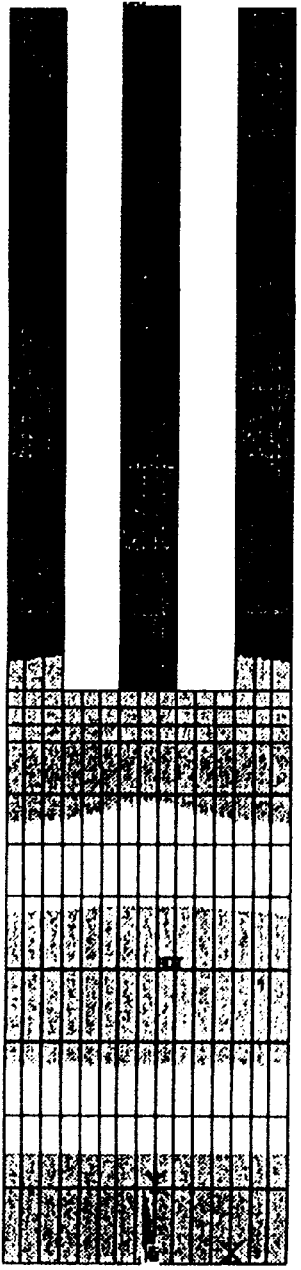
*Distribution of vibration amplitudes obtained by a natural mode analysis of a face-normal vibration*
Ratio of amplitude at a domain to amplitude at the maximum vibration amplitude point
| | |
|---|---|
| ▨ | Less than 1/1000 |
| ☐ | Less than 2/1000 |
| ▨ | Less than 1/100 |
| ■ | Less than 2/100 |
| ■ | Less than 1/10 |
| ■ | Less than 2/10 |
| ■ | Less than 5/10 |
| ■ | Less than 1/1 |

FIG_64
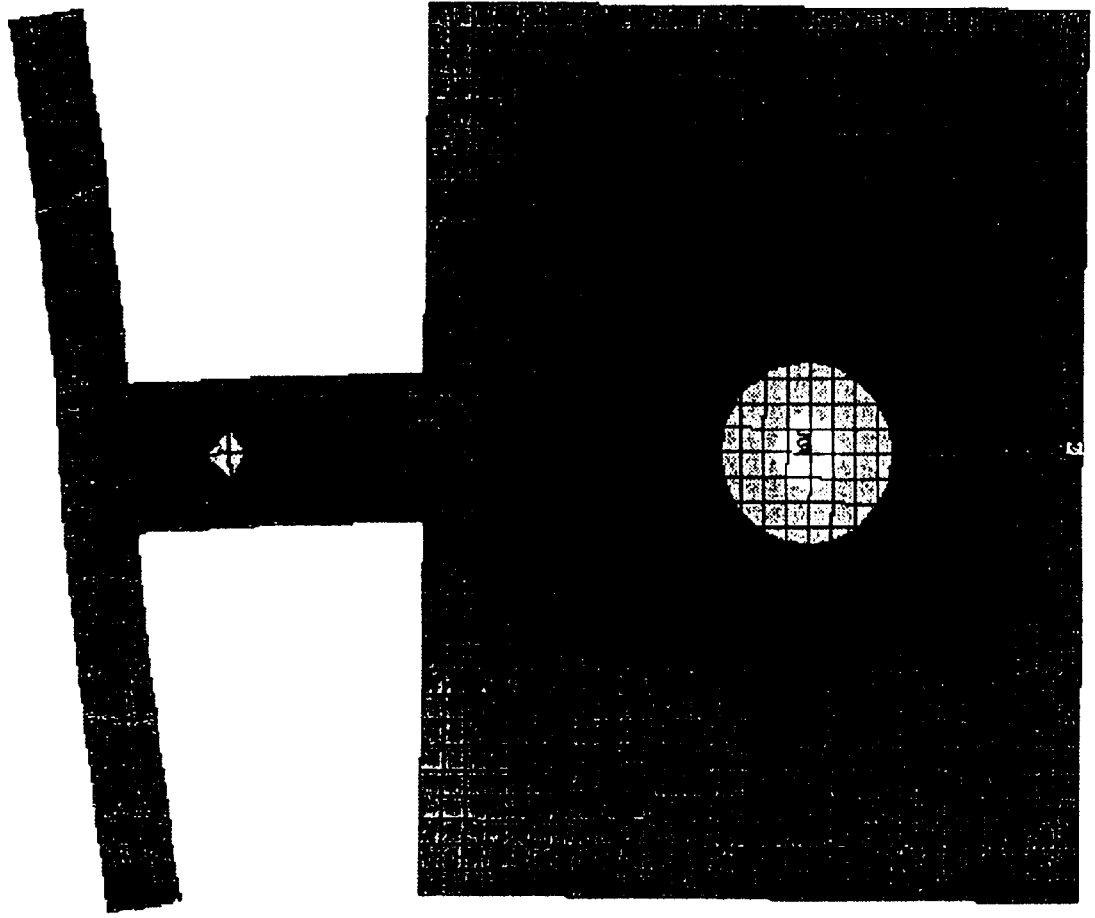
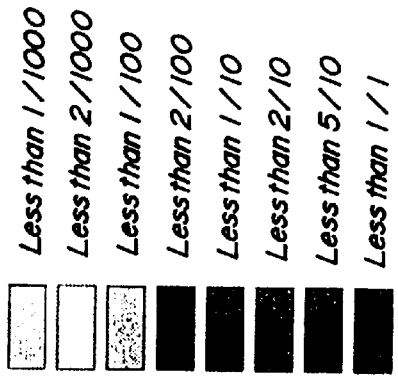

FIG_65
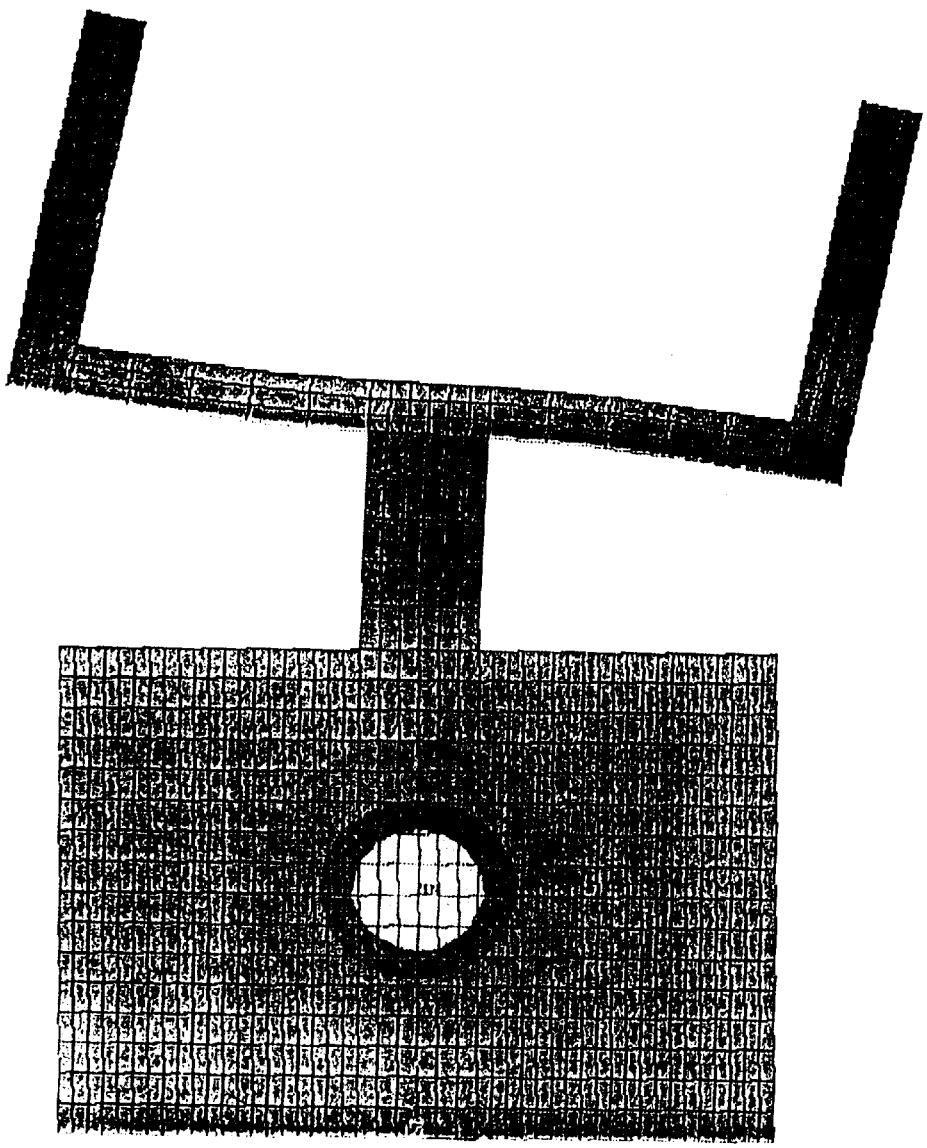

FIG_66
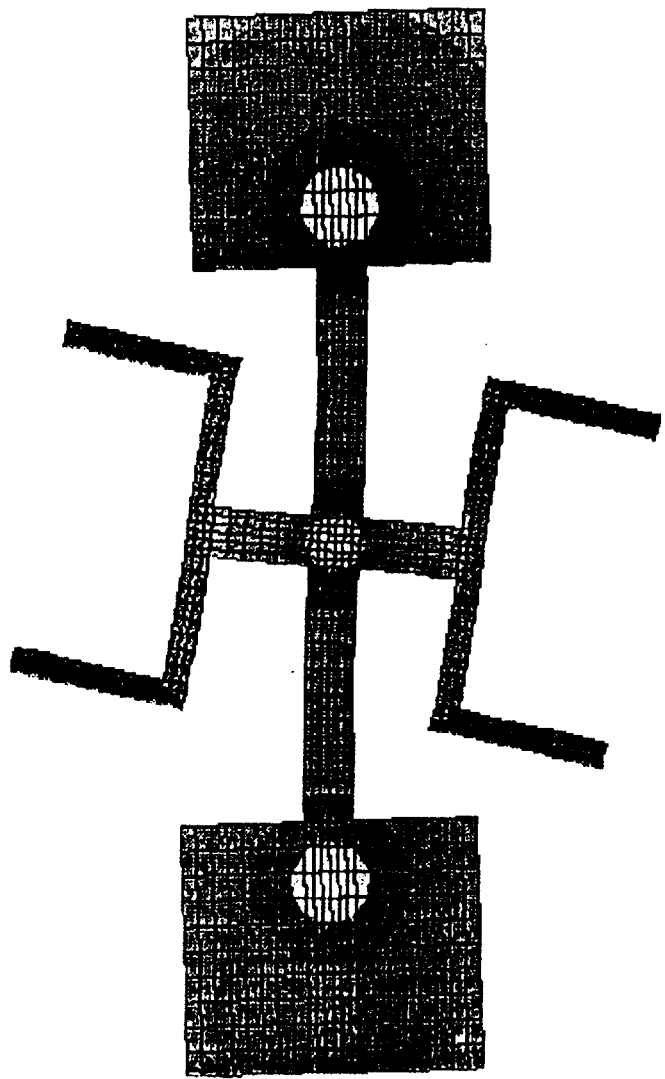
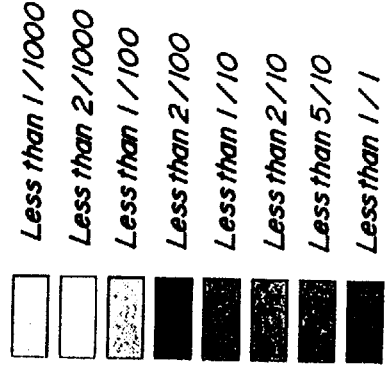

FIG_67
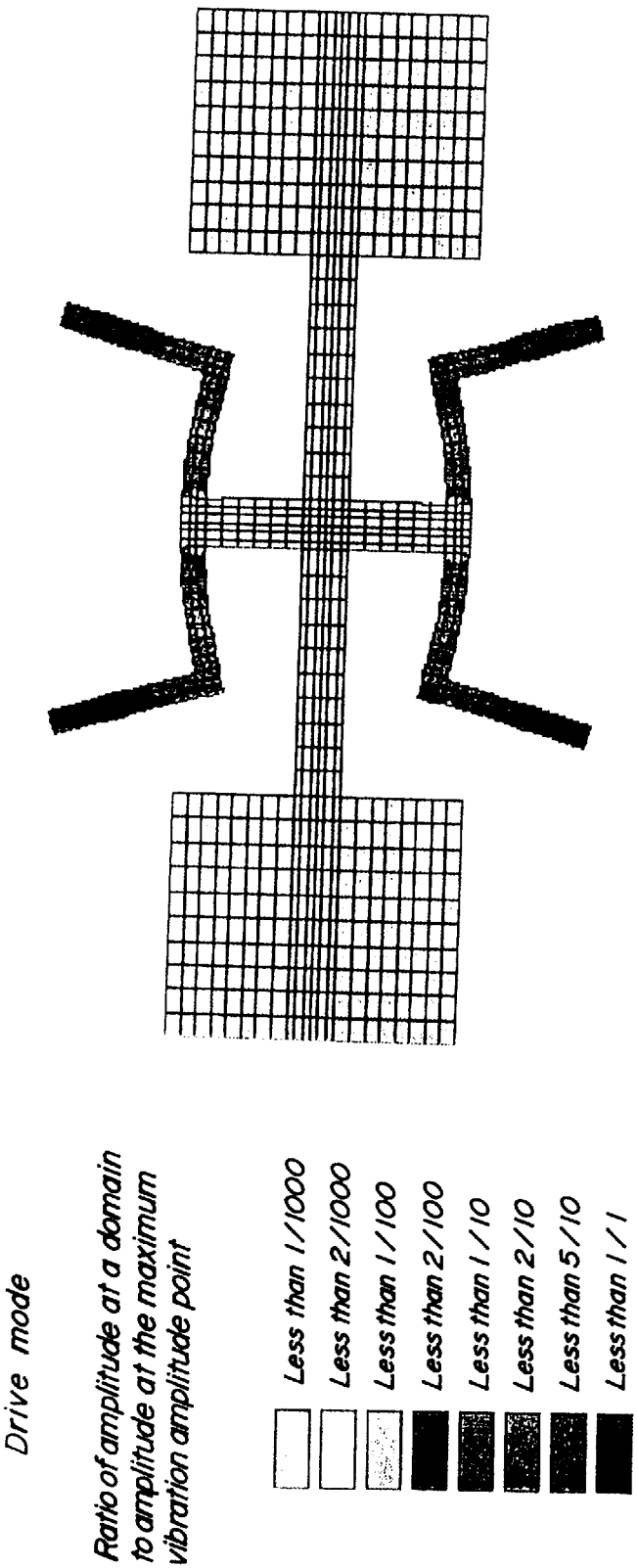

FIG_68
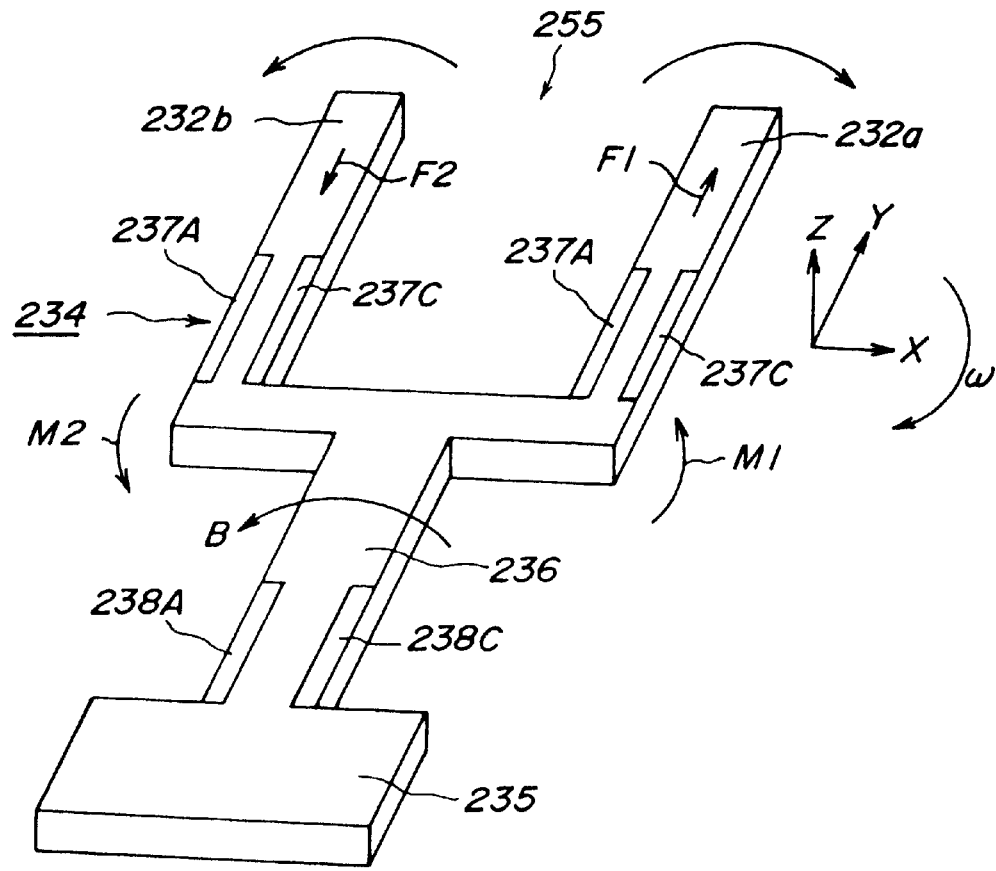
FIG_69
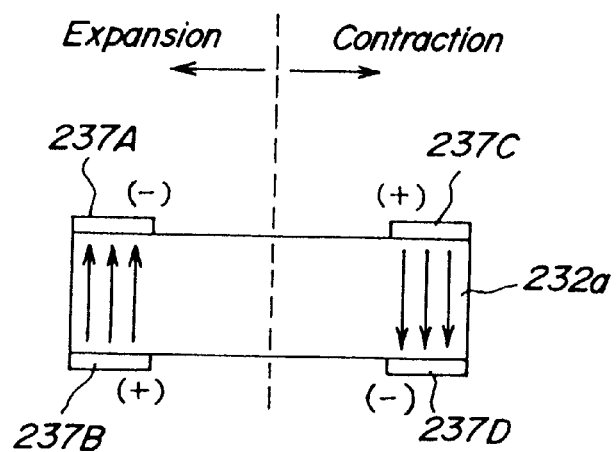

Unnecessary displacement generated

FIG_71
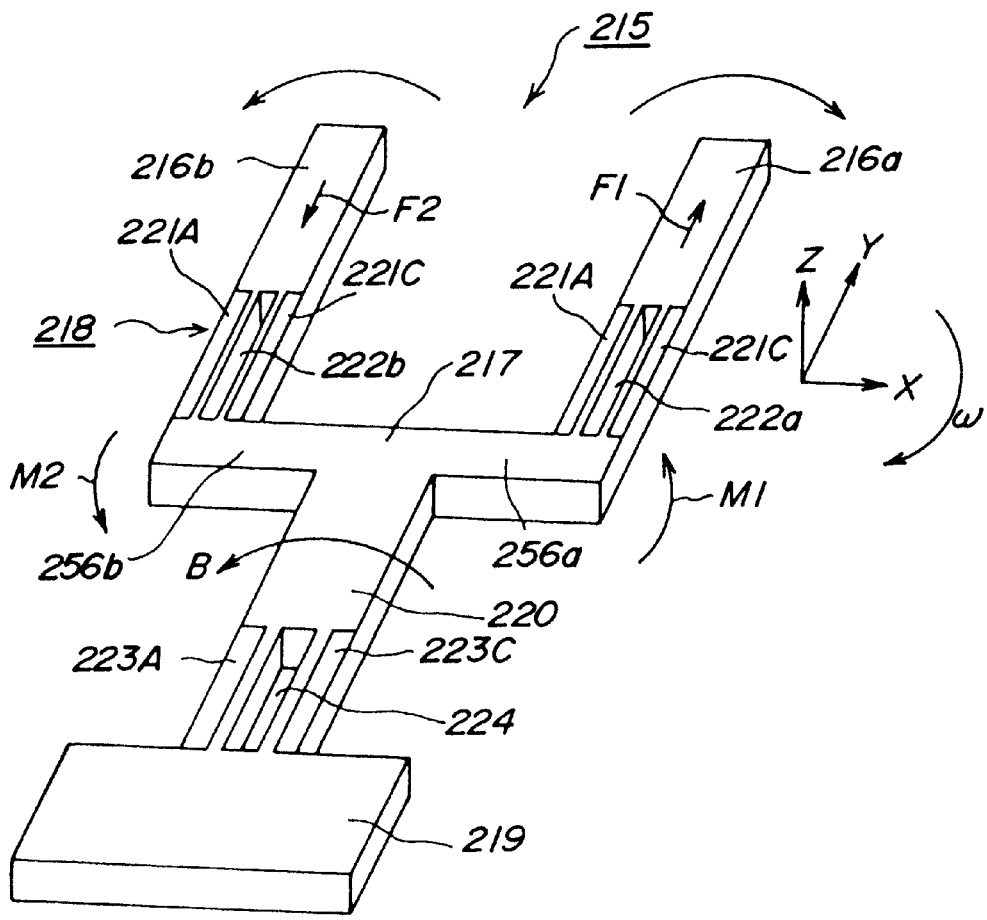
FIG_72
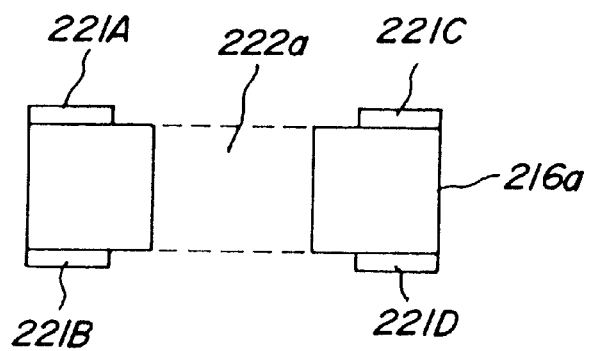

FIG_73
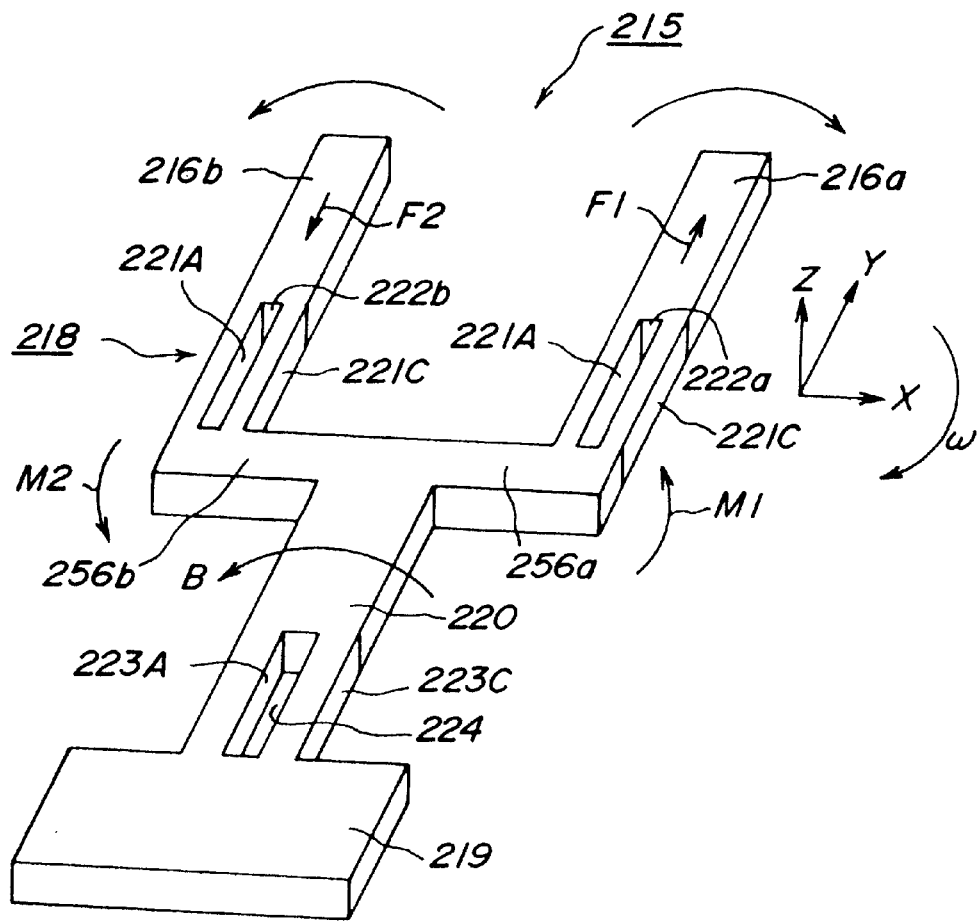
FIG_74
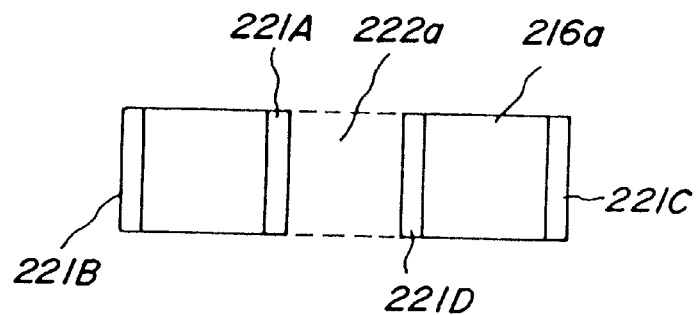

VIBRATOR, VIBRATORY GYROSCOPE, AND VIBRATION ADJUSTING METHOD

BACKGROUND OF THE INVENTION

1. Field of the Invention

The present invention relates to a vibrator used for an angular rate sensor used for detecting a turning angular rate in a turning system and a vibratory gyroscope using the same vibrator, and particularly to a vibrator using a piezoelectric member and a vibratory gyroscope using the same vibrator.

2. Description of the Related Art

Up to now, as an angular rate sensor used for detecting a turning angular rate in a turning system, a vibratory gyroscope using a piezoelectric member has been used for detecting position of an aircraft, a ship, a space satellite, or the like. Recently, it is used in a carnavigation system, a movement detecting mechanism of a VTR or a still camera, and the like in the field of public livelihood.

Such a vibratory gyroscope utilizes the phenomenon that when an angular speed is applied to a vibrating object, a Coriolis force is generated in the direction perpendicular to the vibratory direction. Its mechanism is analyzed by using a dynamic model (for example, "Handbook of Elastic Wave Device Technologies" (Danseiha-Sosi Gijutsu Handbook) issued by Ohm, Inc., pp.491 to 497). Various kinds of piezoelectric vibratory gyroscopes have been proposed up to now. For example, a Sperry tuning-fork gyroscope, a Watson tuning-fork gyroscope, a regular-triangle prism-shaped tuning-piece gyroscope, a cylindrical tuning-piece gyroscope, and the like are known as a piezoelectric vibratory gyroscope.

The inventors are studying various applications of vibratory gyroscopes, and have studied using a vibratory gyroscope as a turning rate sensor used in a car control method of an automobile body turning rate feedback system, for example. Such a system detects the direction of a steering wheel itself by a turning angle of the steering wheel. At the same time as this, the system detects a the actual turning rate of the car body by means of a vibratory gyroscope. The system finds a difference between the direction of the steering wheel and the actual body turning rate by comparing them with each other, and attains a stable body control by compensating a wheel torque and a steering angle on the basis of this difference.

However, any example of the above-mentioned former piezoelectric vibratory gyroscopes can detect a turning angular rate only by arranging a vibrator in parallel with the axis of turning (what is called a vertical arrangement). The turning axis of a turning system to be measured is usually perpendicular to the gyroscope mounting part. Accordingly, in mounting such a piezoelectric vibratory gyroscope it has been impossible to shorten the piezoelectric vibratory gyroscope in height, namely, to reduce the piezoelectric vibratory gyroscope in size in the direction of the turning axis.

In recent years, a piezoelectric vibratory gyroscope capable of detecting a turning angular rate even when arranging a vibrator perpendicularly to the turning axis (what is called a horizontal arrangement) has been proposed in a Japanese laid-open publication Tokkaihei No.8-128833. In this example, as shown as an example in FIG. 1, a vibrator extends in the directions X and Y, namely, extends perpendicularly to the turning axis Z. Each of three elastic members 51*a*, 51*b* and 51*c* is provided with a weight 53 at one end therefor. The elastic members 51*a*, 51*b* and 51*c* are vibrated by piezoelectric devices 54 and 55 in the X-Y plane in phase inverse to one another. A Coriolis force in the Y direction generated by a turning angular rate ω around the Z axis is applied to the center of gravity of the weight 53. Since the plane of the elastic members 51*a*, 51*b* and 51*c* and the center of gravity of the weight 53 are slightly distant in the Z direction from each other, the ends of the elastic members 51*a*, 51*b* and 51*c* are bent reversely to one another in the Z direction by the Coriolis forces each of which is applied to the center of gravity of the weight 53. A turning angular rate ω around the Z axis is obtained by detecting this bending vibration by means of piezoelectric devices 56 and 57.

And up to now, various configurations have been known as a vibratory gyroscope using a vibrator which is composed of plural arms and a base part joining the plural arms, gives a drive vibration in a specified plane to each of the arms, and obtains a turning angular rate on the basis of a detection vibration which is perpendicular to this drive vibration and corresponds to the applied turning angular rate. For example, a Japanese laid-open publication Tokkaihei No. 7-83671 has disclosed a vibratory gyroscope using a tuning-fork vibrator made by joining three arms composed of a middle drive arm and two detection arms at both sides of the middle drive arm in one body at the base part. FIG. 2 shows a configuration example of such a former vibratory gyroscope. In the example shown in FIG. 2, a vibrator 102 forming a vibratory gyroscope is composed of three arms which are composed of a middle drive arm 104 and two detection arms 103 and 105 arranged at both sides of it nearly in parallel with it, and a base 106 at which the drive arm 104 and the detection arms 103 and 105 are joined in one body with one another.

In the above-mentioned tuning-fork vibrator 102, the drive arm 104 is vibrated in the X-Z plane by an unillustrated driving means provided on the drive arm. And the left and right detection arms 103 and 105 are resonated in the same X-Z plane. When a turning angular rate ω acts around the axis Z of symmetry of the tuning-fork vibrator 102, a Coriolis force f acts on each of the detection arms 103 and 105. Since the detection arms 103 and 105 are vibrating in the X-Z plane, vibration in the Y-Z plane is induced in the detection arms 103 and 105. A turning angular rate is measured by detecting this vibration by means of an unillustrated detecting means provided on each of the detection arms 103 and 105.

A piezoelectric vibratory gyroscope disclosed in the above-mentioned Japanese laid-open publication Tokkaihei No. 8-128833 can certainly detect a turning angular rate using the Coriolis principle even when the vibrator is arranged horizontally. However, necessity of providing the weight 53 makes it insufficient to shorten the gyroscope in height. And when the weight 53 is made thin in thickness in order to sufficiently shorten it in height, moment by a Coriolis force is made small and a bending vibration is made very small, and there is a problem that a measurement sensitivity is lowered.

And in a vibrator of a piezoelectric vibratory gyroscope having the above-mentioned configuration, the drive vibration and the detection vibration are different in the vibrating direction from each other due to the configuration of the vibrator. That is to say, that vibrator needs such vibrations in two directions that the elastic members 51*a*, 51*b* and 51*c* which are vibrating in the X-Y plane need to vibrate also in the Z direction. Generally in a piezoelectric vibratory gyroscope, it is required to keep always a constant relation between a vibration frequency for driving and a vibration frequency for detection in order to keep a good measurement sensitivity. Now, considering a single crystal as a material for a vibrator, since a single crystal is anisotropic, variation in vibration frequency caused by a temperature change varies with the direction of vibration. Therefore, attempting to form a vibrator having the above-mentioned the configuration out of a single crystal causes a problem that even in case of setting a constant relation between a drive vibration frequency and a detecting vibration frequency at a certain temperature, when the temperature is changed the relation cannot be kept and the measurement sensitivity is liable to vary with temperature.

In a former vibratory gyroscope of the above-mentioned composition shown in FIG. 2, in case of forming the vibratory gyroscope by supporting the tuning-fork vibrator 102, the vibrator 102 is supported by fixing the entire end part 107 of the base part 106 of the tuning-fork vibrator 102 opposite to the end part at which the drive arm 104 and the detection arms 103 and 105 exist, or by fixing an unillustrated supporting arm at a position of this end part 107 corresponding to the axis Z of symmetry. Therefore, it cannot be said that a Coriolis force generated by a turning angular rate is efficiently utilized for action of detection vibration in the detection arms 103 and 105, and there is a problem that sharpness of resonance (Q value) of the detection vibration in the Y-Z plane in the detection arms 103 and 105 is low and the measurement sensitivity is low.

On the other hand, as a turning angular rate detecting method, both of an ordinary vibratory gyroscope having a vertically-arranged vibrator and a vibratory gyroscope having the above-mentioned horizontally-arranged vibrator electrically take in vibration of the vibrator different in mode from a drive vibration generated by a Coriolis force as displacement of a piezoceramic member, and measures a turning angular rate on the basis of the amplitude of the output signal. However, since a vibratory gyroscope having a horizontally-arranged vibrator composed of a piezoelectric single crystal has a low sensitivity to a turning angular rate due to its composition, there is a problem that it deteriorates a detection accuracy to measure a turning angular rate on the basis of the amplitude of an output signal.

In order to solve the problem of noises caused by such external factors as a voltage fluctuation, a temperature change and the like, a technique which pays attention to a fact that a phase difference between the phase of a driving signal and the phase of an output signal is changed by a Coriolis force in a vertically-arranged tuning-piece vibrator, and measures a turning angular rate on the basis of variation of the phase difference has been disclosed in Japanese patent publication Tokkohei No. 4-14734. However, even by applying the above-mentioned detection of a turning angular rate on the basis of variation in phase difference to a vibratory gyroscope having a horizontally-arranged vibrator composed of a piezoelectric single crystal, a satisfactory result cannot be obtained in measurement sensitivity and in linearity of a phase difference to a turning angular rate.

A problem the present invention attempts to solve is to make it possible to detect a turning angular rate in a sufficiently high accuracy without providing a projection having a certain weight from a vibrator toward the axis of turning even in case of setting up the vibrator in a direction in which a vibrating arm of the vibrator extends perpendicularly to the axis of turning.

Another problem the invention attempts to solve is to provide a vibrator which can be simplified in construction, be horizontally arranged in mounting, and be reduced in height, a method for adjusting the same vibrator, and a vibratory gyroscope using the same vibrator.

SUMMARY OF THE INVENTION

An object of the invention is to provide a vibratory gyroscope capable of measuring a turning angular rate with high sensitivity by solving the above-mentioned problems.

Another object of the invention is to provide a vibratory gyroscope using a horizontally-arranged vibrator composed of a piezoelectric single crystal, the vibratory gyroscope being improved in detection accuracy of a turning angular rate.

A vibrator according to a first embodiment of the invention comprises a main arm provided with a base part and at least one bending-vibration piece extending from the base part in a direction crossing the longitudinal direction of the base part, and a fixing part for fixing one end of the base part, wherein the base part and the bending-vibration piece are formed so that they extend substantially in a specified plane.

The invention also relates to a vibratory gyroscope for detecting a turning angular rate, the vibratory gyroscope including the above discussed vibrator, an exciting means for exciting vibration of the vibrator in a plane, and a detecting means for detecting a bending vibration of the vibrator generated by a Coriolis force to be applied to the vibrator when the vibrator turns in the plane and outputting a signal according to the detected bending vibration.

Since according to the invention a drive vibration and a detection vibration of a vibrator take place in a specified plane and the invention uses a bending vibration as vibration to be detected, the invention can detect a turning angular rate with sufficiently high sensitivity without providing a projection of a certain weight from the vibrator toward the axis of turning, even when setting up the vibrator so that a vibrating arm of the vibrator extends perpendicularly to the axis of turning.

The first preferred embodiment uses a fixing piece which is fixed at both ends of it as a fixing part, and a main arm is provided at one side of this fixing piece and a resonator piece is provided at the other side of the fixing piece. The fixing piece, the main arm and the resonator piece are formed so as to extend substantially in a specified plane. That is to say, an exciting means and a bending-vibration detecting means can be disposed with a fixing piece fixed at both ends between them. Thanks to this, since such bad influences as electromechanical coupling and the like between the exciting means and the bending-vibration detecting means can be prevented, the detection accuracy is improved.

In the above-mentioned construction, since displacement of the vibrator is in a plane, the main arm, the resonator arm, and the fixing piece can be made of the same single crystal, for example, a single crystal of quartz, $LiTaO_3$, or $LiNbO_3$. In this case, the measurement sensitivity can be improved. The whole of a vibrator can be made by making a single crystal thin plate and processing this single crystal thin plate by means of etching or grinding.

Although the base part and the bending-vibration piece can be made of different members from each other, it is particularly preferable that they are formed in one body. Although a material for the vibrator is not limited in particular, it is preferable to use a single crystal of quartz, $LiNbO_3$, $LiTaO_3$, a solid solution of lithium niobatelithium tantalate $(Li(Nb, Ta)O_3)$, or the like. By using such a single crystal, it is possible to improve a detection sensitivity and reduce a detection noise.

And since such a single crystal is particularly insensitive to a temperature change, it is suitable for a sensor used in a car where thermal stability is necessary. This point is further described. As an angular speed sensor using a tuning-fork vibrator, there is, for example, a piezoelectric vibratory gyroscope disclosed in the above-mentioned Japanese laid-open publication Tokkaihei No. 8-128833. In such a vibrator, however, the vibrator vibrates in two directions. That is to say, in FIG. 1, the vibrator vibrates in the Z direction as well as in the X-Y plane. Therefore, particularly in case of forming the vibrator out of such a single crystal as described above, it is necessary to match the characteristics of the single crystal in the two directions with each other. In practice, however, a piezoelectric single crystal is anisotropic.

Generally in a piezoelectric vibratory gyroscope, in order to keep good sensitivity, it is required to keep a constant vibration frequency difference between a natural resonance frequency of a drive vibration mode and a natural resonance frequency of a detection vibration mode. However, a single crystal is anisotropic and a degree of variation in vibration frequency caused by a temperature change varies with the crystal face. For example, although variation in vibration frequency caused by a temperature change is very little when a single crystal is cut along a specific crystal face, variation in vibration frequency is very sensitive to a temperature change in case of cutting the single crystal along another crystal face.

Thus, when a vibrator vibrates in two directions, at least one of the two vibrating faces is a crystal face having a large variation in vibration frequency caused by a temperature change.

On the other hand, as shown in the invention, by making the whole of a vibrator vibrate in a specified plane and forming the vibrator out of a piezoelectric single crystal it is possible to prevent the vibrator from being influenced by anisotropy of a single crystal as described above and use only the best crystal face in characteristics of the single crystal in the vibrator.

Concretely, since every vibration of a vibrator takes place in a single plane, it is possible to manufacture a vibrator using only a crystal face having little variation in vibration frequency caused by a temperature change of a single crystal. Therefore, it is possible to provide a vibratory gyroscope having a very high thermal stability.

Among the above-mentioned single crystals, single crystals of $LiNbO_3$, $LiTaO_3$, and a single crystal of a solid solution of lithium niobate-lithium tantalate have particularly large electromechanical coupling coefficients. Comparing a single crystal of $LiNbo_3$ and a single crystal of $LiTaO_3$ with each other, the single crystal of $LiTaO_3$ has a larger electromechanical coupling coefficient and a better thermal stability than the single crystal of $LiNDbO_3$.

A vibrator according to a second embodiment of the invention is the above-mentioned vibrator in which the main arm comprises a pair of bending-vibration pieces extending in a direction crossing the longitudinal direction of the base part and a tuning-fork vibrator piece whose tines extend respectively from the bending-vibration pieces, and the base part, the bending-vibration pieces and the tuning-fork vibrator piece are formed so as to extend substantially in a specified plane. In the above-mentioned construction, since displacement of the vibrator is in a plane, the bending vibration piece, the tuning-fork vibrator piece and the base part can be made of the same single crystal, for example, a single crystal of quartz, $LiTaO_3$, $LiNbO_3$, or $Li(Nb, Ta)O_3$. This case is preferable, since the measurement sensitivity can be improved and the vibrator can be made of a single crystal thin plate by means of a wafer etching process and the like (in case of quartz) or a single crystal cutting method of grinding and the like (in case of a single crystal of $LiTaO_3$, $LiNbO_3$, or the like).

A vibrator adjusting method of the invention is a method for adjusting a vibrator having the above-mentioned construction, the vibrator being adjusted to a specified relation between the resonance frequency of vibration of said bending vibration piece and tuning-fork vibrator piece in said single plane and the resonance frequency of bending vibration of said base part in said single plane, by projecting both ends of said tuning-fork vibrator piece outwardly from the position of said bending vibration piece in said same single plane and reducing the length of at least one of the projected parts.

A vibratory gyroscope of this invention is a vibratory gyroscope for detecting a turning angular rate by means of a vibrator of the above-mentioned second embodiment, said vibratory gyroscope comprising an exciting means, provided in said tuning-fork vibrator piece, for exciting vibration of said tuning-fork vibrator piece, and bending vibration piece in said single plane; and a bending-vibration detecting means, provided in the base part, for detecting a bending vibration taking place in said base part in said single plane and outputting a signal according to the detected bending vibration.

And a vibratory gyroscope of this invention is a vibratory gyroscope for detecting a turning angular rate by means of a vibrator of the above-mentioned second embodiment, said vibratory gyroscope comprising an exciting means, provided in said base part, for exciting a bending movement of said base part in said single plane; and a bending-vibration detecting means, provided in the tuning-fork vibrator piece, for detecting vibration taking place in said tuning-fork vibrator piece and bending vibration piece in said single plane and outputting a signal according to the detected vibration.

A vibrator according to a third embodiment of the invention is a vibrator wherein said vibrator comprises a main arm provided with a pair of said bending-vibration pieces extending in a direction crossing the longitudinal direction of the base part and a tuning-fork vibrator piece whose tines extend respectively from the bending-vibration pieces and additionally to this main arm, a fixing piece which is fixed at both ends and at which the base part of the main arm is fixed, and a resonator piece provided on the fixing piece at a position which is at the opposite side to and corresponds to said base part, and wherein said main arm, fixing piece, and resonator piece extend in a specified plane.

It is possible to make a bending movement, having as a fulcrum the fixing piece joined with said base part and said resonator piece, take place in said base part and said resonator piece.

A vibrator adjusting method of this invention is a method for adjusting a vibrator of the third embodiment, the vibrator being adjusted to a specified relation between the resonance frequency of vibration of said tuning-fork vibrator piece and bending vibration piece in said single plane and the resonance frequency of bending vibration of said base part and said resonator piece in said single plane, by reducing length of at least one of the projected parts provided at both ends of the bending vibration pieces.

A vibratory gyroscope of this invention is a vibratory gyroscope for detecting a turning angular rate by means of a vibrator of the third embodiment, said vibratory gyroscope comprising an exciting means, provided in said tuning-fork vibrator piece, for exciting vibration of said tuning-fork vibrator piece in said single plane; and a bending-vibration detecting means, provided in the resonator piece, for detecting a bending vibration taking place in said resonator piece in said single plane and outputting a signal according to the detected bending vibration.

And a vibratory gyroscope of this invention is a vibratory gyroscope for detecting a turning angular rate by means of a vibrator of the third embodiment, said vibratory gyroscope comprising an exciting means, provided in said resonator piece, for exciting a bending movement of said resonator piece in said single plane; and a vibration detecting means, provided in the tuning-fork vibrator piece, for detecting vibration taking place in said tuning-fork vibrator piece in said single plane and outputting a signal according to the detected vibration.

In any case of the above-mentioned vibratory gyroscopes, it is possible to set an exciting means and a bending-vibration detecting means or a vibration detecting means at a position more distant from and above a vibrator in comparison with a former vibrator having no resonator piece. Accordingly, since such bad influences as electro-mechanical coupling and the like between the exciting means and the bending-vibration detecting means or the vibration detecting means can be prevented, the detection accuracy is improved.

A vibratory gyroscope according to a fourth embodiment of the invention is a vibratory gyroscope comprising one of said vibrators, a driving means for driving a drive vibration, a detecting means for detecting a vibrating state in a vibration mode which is caused by the drive vibration generated by the driving means and is different from the drive vibration, and a phase difference detecting means for detecting a phase difference between a reference signal and an output signal, when assuming that an electrical signal used for generating a drive vibration is a reference signal and an electrical signal taken by the detecting means from a vibration having a vibration mode which is caused by the drive vibration and is different from the drive vibration;

said vibratory gyroscope detecting a turning angular rate on the basis of variation of the phase difference detected by the phase difference detecting means.

The invention has been developed by finding that in a vibratory gyroscope comprising a vibrator composed of a piezoelectric single crystal using vibration in a horizontal plane as a drive vibration, it is possible to improve detection of a turning angular rate in accuracy by obtaining a phase difference between a reference signal based on a drive vibration and an output signal based on a detection vibration, and detecting the turning angular rate on the basis of the obtained phase difference. That is to say, even in such a vibratory gyroscope as a vibratory gyroscope using a horizontally-arranged vibrator, said vibratory gyroscope being a little in vibration of the vibrator generated by a Coriolis force and low in sensitivity, it is possible to improve a gyroscopic signal to be detected in the signal-to-noise ratio of a signal to a noise caused by such external factors as a voltage fluctuation, a temperature change, and the like by using as a material for the vibrator a piezoelectric single crystal itself having a high Q value, for example, a single crystal of quartz, $LiNbO_3$, or $LiTaO_3$. As a result, in a range in which the amplitude of a signal called a leakage signal caused by an unnecessary vibration due to an insufficient processing accuracy or the like is 7 times larger than the amplitude of an original gyroscopic signal, it is possible to detect a turning angular rate in a range where the detection sensitivity is low but linearity of variation in phase difference to a turning angular rate is good. Therefore, the detection accuracy can be improved.

A fifth embodiment of the invention is a vibratory gyroscope having said vibrator, wherein the vibrator is a plate-shaped vibrator composed of a piezoelectric single crystal and layer-shaped parts of plural layers each of which is composed of a piezoelectric single crystal are provided between one main face and the other main face of the vibrator, and the axial directions of polarization of the respective layer-shaped parts are different from one another.

This invention relates to a vibratory gyroscope, wherein said vibrator is provided with one electrode provided on one main face and the other electrode which is provided on the other main face and is opposite to the one electrode.

This invention relates to a method for making said vibrator vibrate in a direction crossing the central face of the vibrator, said method providing one electrode on one main face, providing the other electrode opposite to the one electrode on the other main face, and applying alternating voltages different in polarity from each other, respectively, to the one electrode and the other electrode.

The invention relates to a method for detecting vibration of said vibrator, said method providing one electrode on one main face, providing the other electrode opposite to the one electrode on the other main face, connecting the one electrode and the other electrode with a voltage detecting mechanism, and detecting an alternating voltage generated between the one electrode and the other electrode by making the vibrator vibrate in a direction crossing the one main face and the other main face.

According to a vibrator and a vibratory gyroscope of the fifth embodiment, it is possible to make the vibrator perform a bending vibration in a direction crossing, preferably, perpendicular to a main face by forming electrodes on a pair of main faces of the vibrator opposite to each other and applying an alternating voltage to these electrodes. Furthermore, when a bending vibration is excited, an electric field is uniformly applied to the inside of the vibrator. Therefore, a locally uniform electric field and an internal stress caused by the un-uniform electric field are not generated inside the vibrator.

In a preferred embodiment of the invention, the respective layer-shaped parts are composed of plate-shaped members each of which is composed of a piezoelectric single crystal and which are different in the direction of polarization from one another, and these plate-shaped members are joined with one another, respectively, to form the layer-shaped parts.

And in a particularly preferred embodiment, the axial direction of polarization in one layer-shaped part of at least one main face side and the axial direction of polarization in the other layer-shaped part of the other main face side are reverse to each other.

Although a piezoelectric single crystal which is a material for the vibrator is not limited in particular, it is particularly preferable that a single crystal is quartz, lithium niobate, lithium tantalate, a solid solution of lithium niobate-lithium tantalate, langasite, or lithium tetraborate, and it is more preferable that a single crystal is lithium niobate, lithium tantalate, a solid solution of lithium niobate-lithium tantalate, or langasite. Among the above-mentioned single crystals, single crystals of quartz, $LiNbO_3$, $LiTaO_3$, and $(Li(Nb, Ta)O_3$ have particularly large electromechanical coupling coefficients. Comparing a single crystal of $LiNbO_3$ and a single crystal of $LiTaO_3$ with each other, the single crystal of $LiTaO_3$ has a larger electromechanical coupling coefficient and a better thermal stability than the single crystal of $LiNbO_3$.

And it is possible to exemplify lead zirconate titanate (PZT), relaxer compounds (general expression: $Pb(A1/3B2/3)O3$ where A is Cd, Zn, Mg or the like, and B is Nb, Ta, W or the like), a piezoelectric single crystal of a mixed crystal system of lead zirconate titanate and a relaxer compound, langasite, and lithium tetraborate.

A vibratory gyroscope of a sixth embodiment of the invention is a vibratory gyroscope using a vibrator which is composed of plural arms and a base part for joining the plural arms with it, gives a drive vibration in a specified plane to the arms, and obtains a turning angular rate from a detection vibration corresponding to the applied angular rate of turning, said vibratory gyroscope supporting the vibrator at a small domain where there is locally a domain having the smallest detection vibration.

The invention can fix a domain where movement of the vibrator is the smallest by supporting the vibrator at a small domain where there is locally a domain having the smallest detection vibration in case of supporting the vibrator. Accordingly, since it is possible to effectively generate a detection vibration by means of a Coriolis force, a Q value of the detection vibration becomes high and the sensitivity can be improved. Since the detection vibration generated by the Coriolis force is small in amplitude, the invention is particularly effective to improve the sensitivity.

And since it increases not only the Q value of detection vibration but also the Q value of drive vibration and furthermore can improve also the sensitivity to support a vibrator at small domain where there is locally a domain having the smallest detection vibration and a small domain where there is locally a domain having the smallest drive vibration coincide with each other, it is preferable as a preferred embodiment to support the vibrator in this way. Furthermore, it is preferable to use as a material for a vibrator a piezoelectric material such as piezoceramic or a single crystal of quartz, $LiTaO_3$, $LiNbO_3$, or the like, and it is more preferable in particular to use a single crystal of quartz, $LiTaO_3$, $LiNbO_3$, or the like. The reason is that a high Q value of a single crystal itself can be effectively used.

In the present invention, a small domain where there is locally a domain having the smallest detection vibration or the smallest drive vibration is a domain within a range where the amplitude of detection vibration or drive vibration is smaller than a thousandth of the maximum amplitude in a vibrator.

A vibratory gyroscope of a seventh embodiment of the invention is a vibratory gyroscope having a vibrator composed of an arm of a piezoelectric member, wherein said arm has a hollow part and a pair of electrodes are provided on each of the parts between which the hollow part of the arm is disposed.

In this invention, to provide a pair of electrodes on each of the parts between which the hollow part of the arm is disposed prevents an unnecessary displacement from being generated by an electric field flowing from one pair of electrodes to the other pair of electrodes, since there is no piezoelectric member at that place. Accordingly, since noises can be removed, it is possible to make a high-accuracy angular speed detection.

Although the hollow part is not limited in size in particular, it is preferable to form the hollow part equal to or longer than the electrode in the longitudinal direction of the electrode, because a leakage electric field does not cause an unnecessary displacement of the arm at all since there is no piezoelectric member to contribute the displacement. And since it is necessary to provide the hollow part correspondingly to the electrodes, it is preferable to provide the hollow part at a range of ⅓ to ⅔ arm length distant from the base of the arm in the arm of this invention which is more curved at a position closer to its base and in which each of the electrodes needs to be provided at a range of ⅓ to ⅔ arm length distant from the arm base. Furthermore, it is preferable to use a 130-degree Y plate of lithium tantalate ($LiTaO_3$) as a piezoelectric member, since to provide the hollow part of the invention is very effective to a large influence of a leakage electric field which this invention takes as a problem.

BRIEF DESCRIPTION OF INVENTION

FIG. 1 is a perspective view showing a configuration of a former vibrator;

FIG. 2 is a perspective view showing a configuration of a former vibrator;

Figure 3:
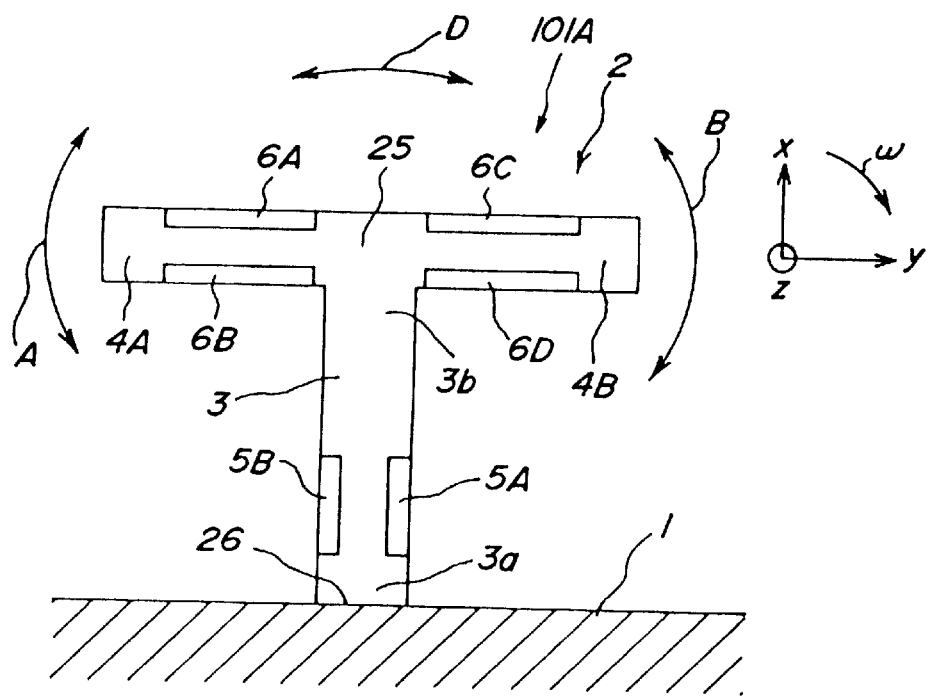
Figure 4A:
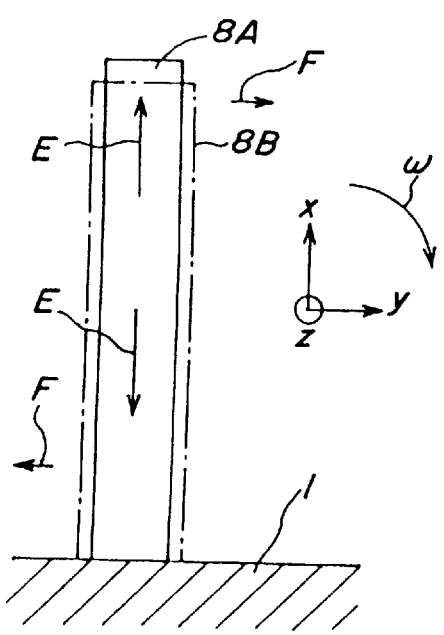
Figure 4B:
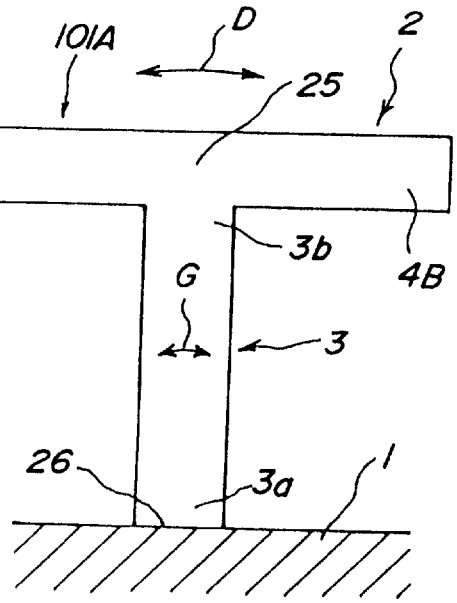
Figure 6:
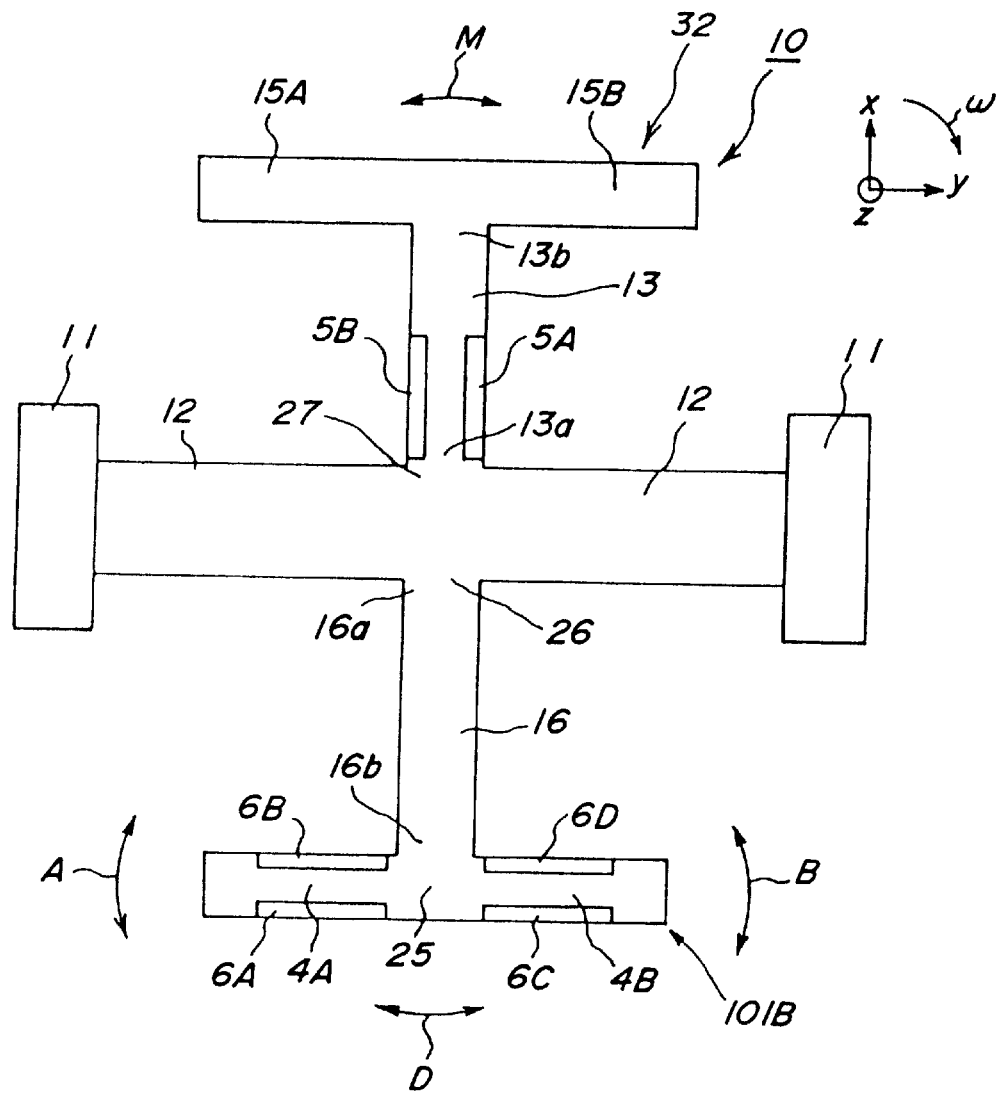
Figure 7:
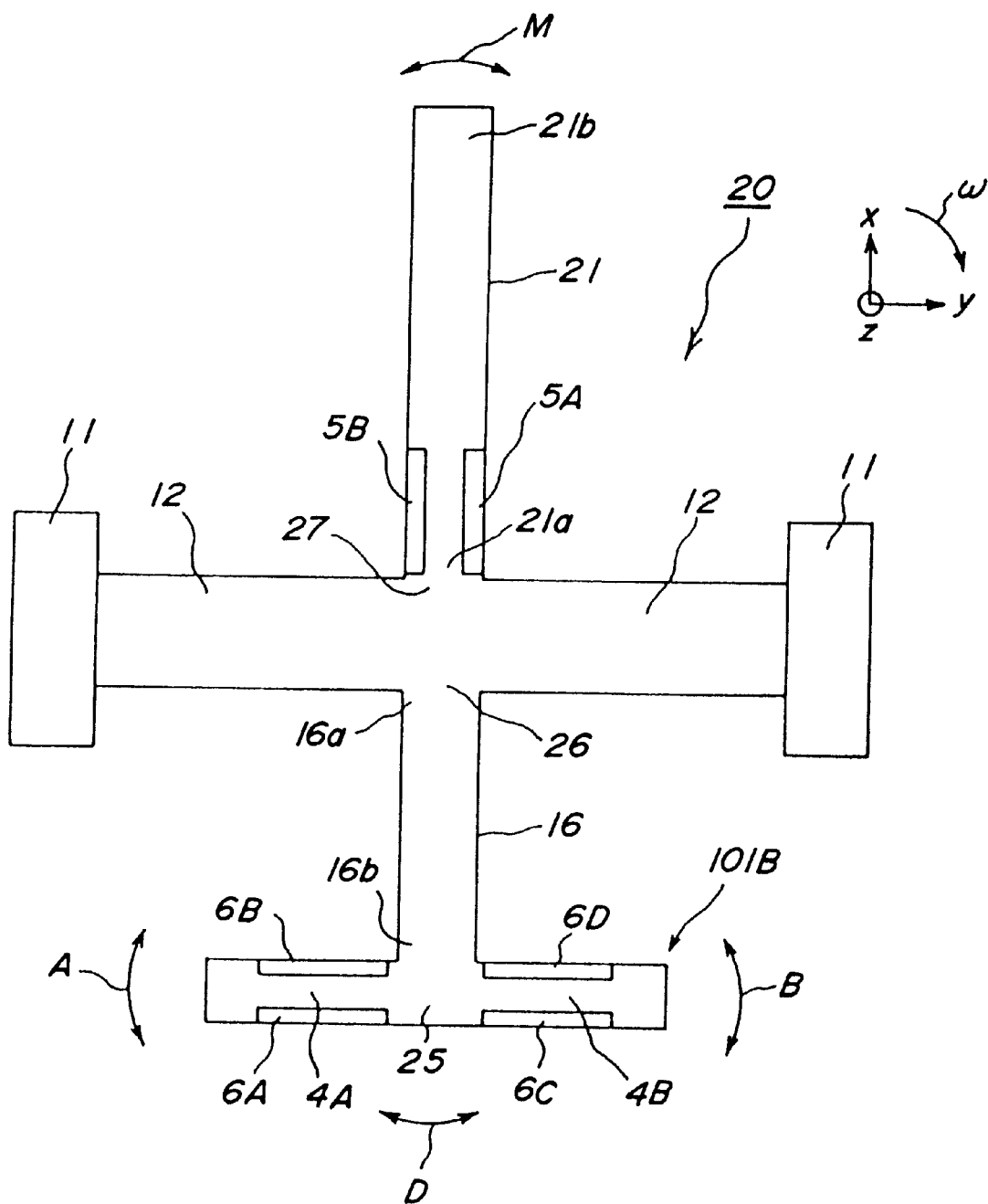
Figure 8:
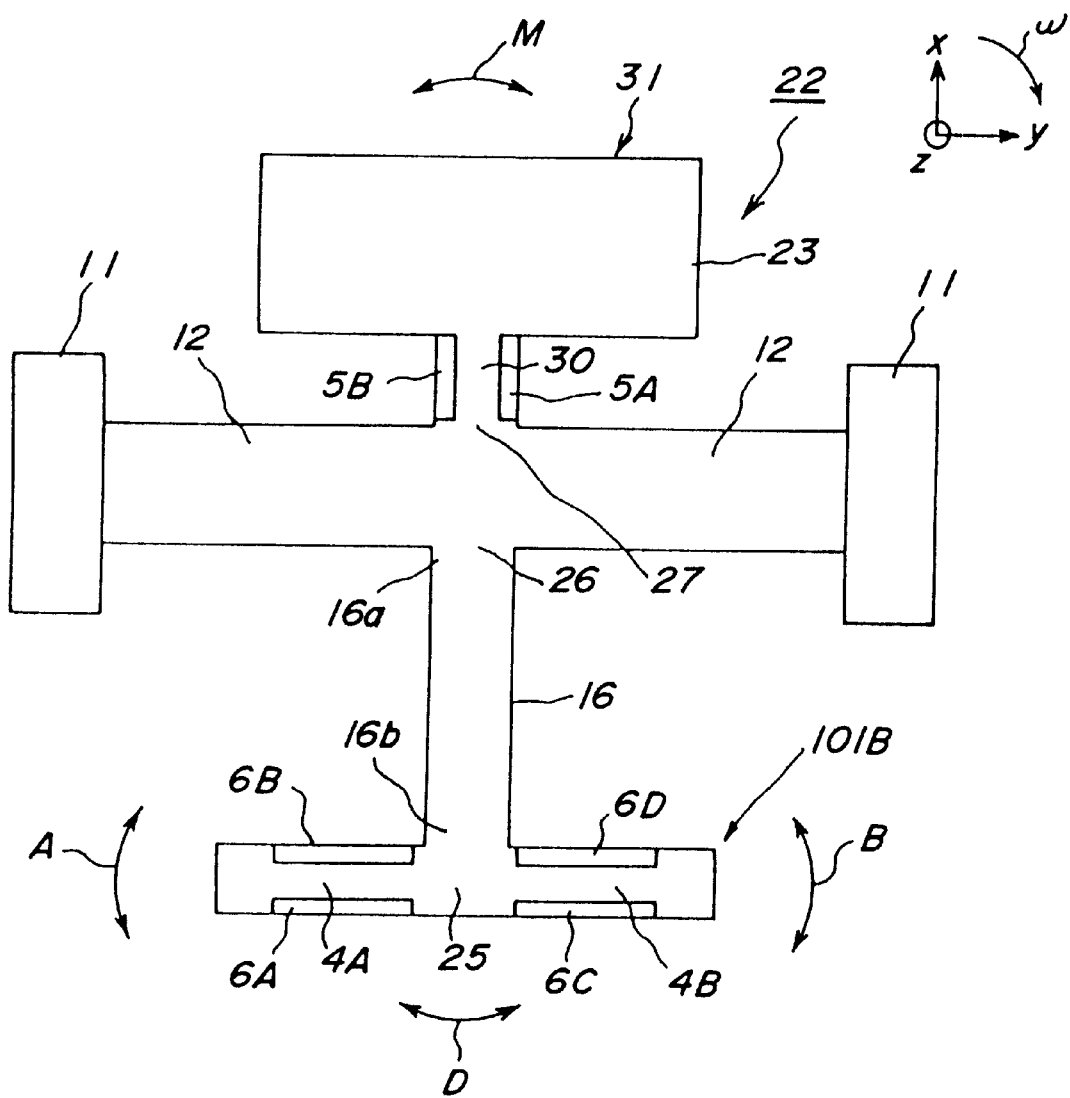
Figure 9:
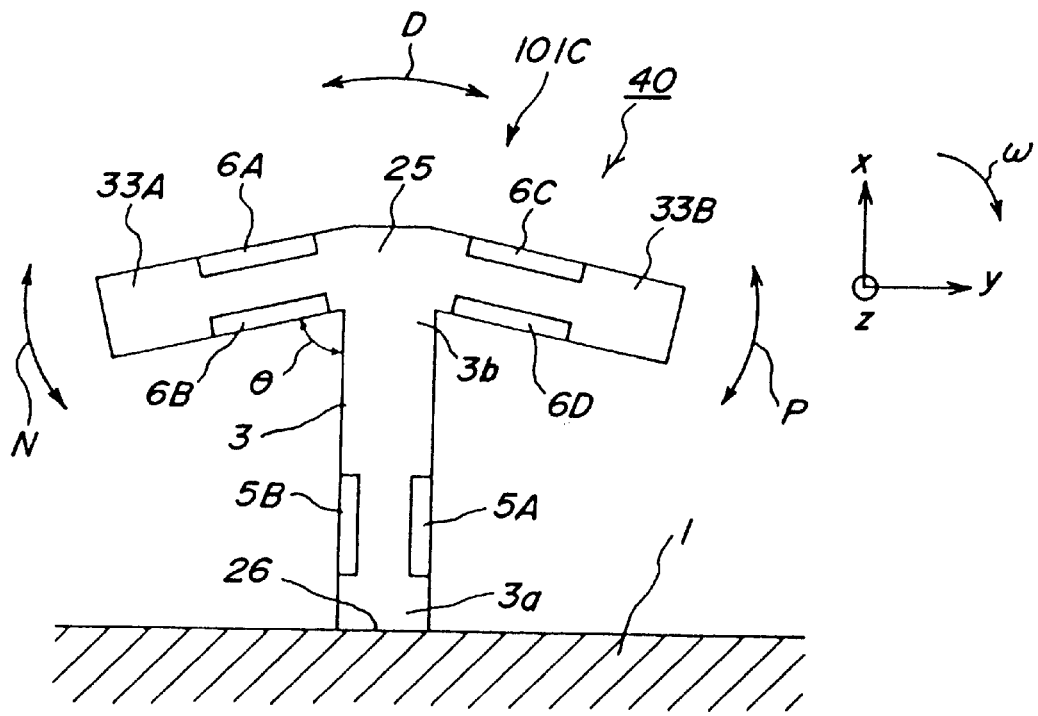
Figure 10:
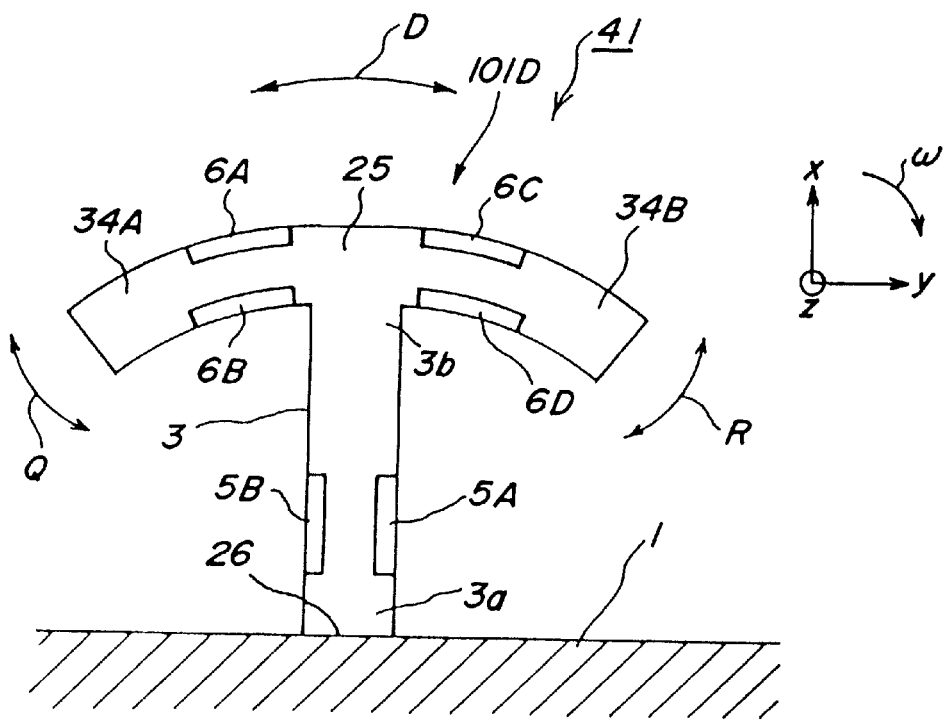
Figure 11:
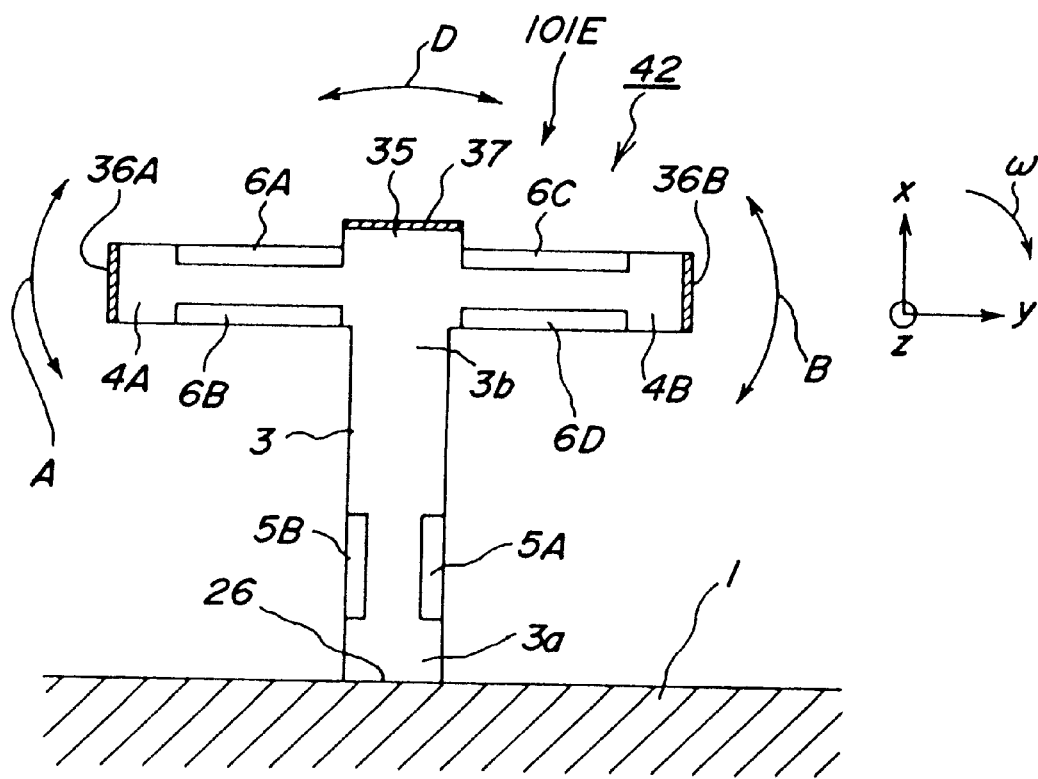
Figure 12:
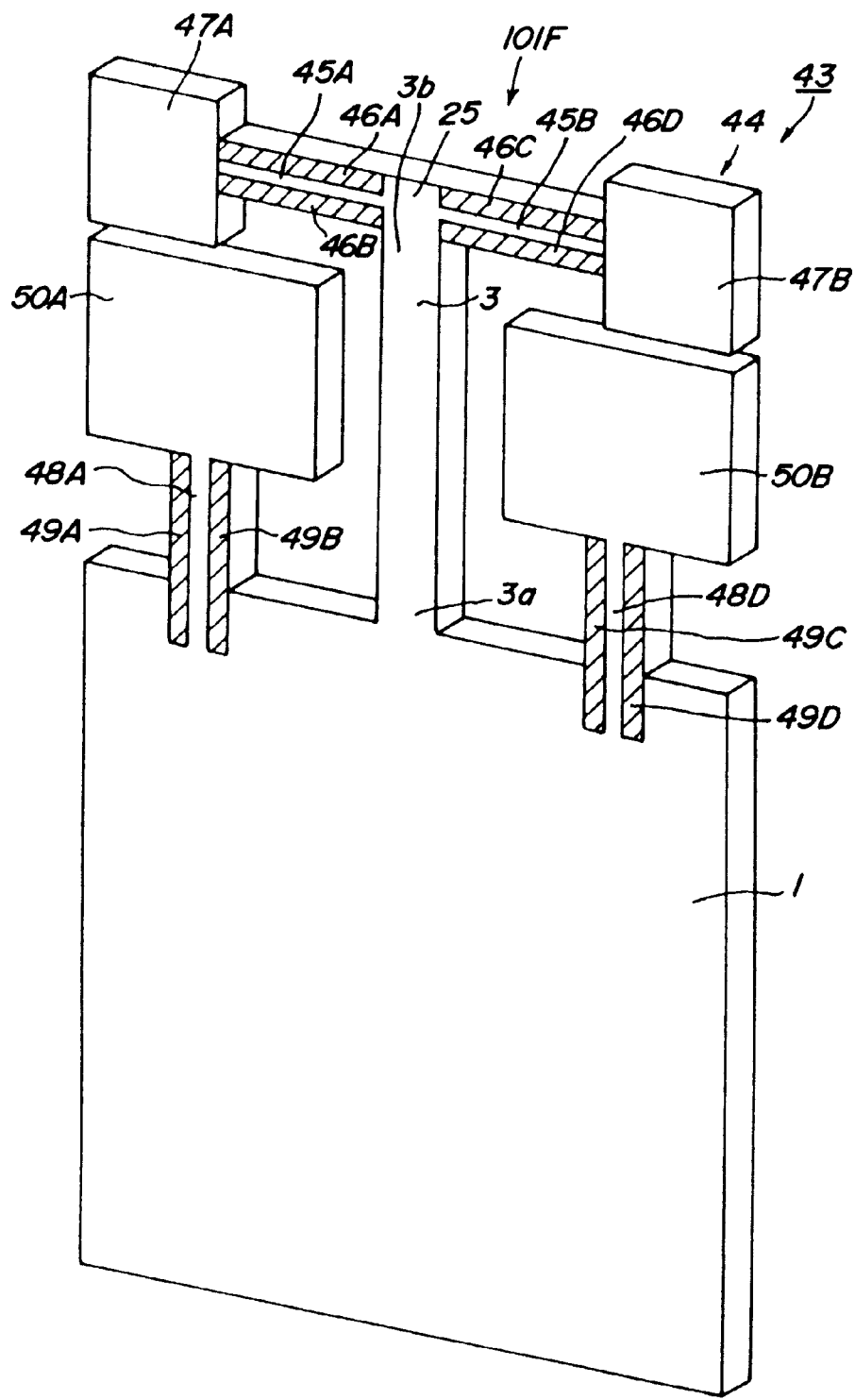
Figure 17:
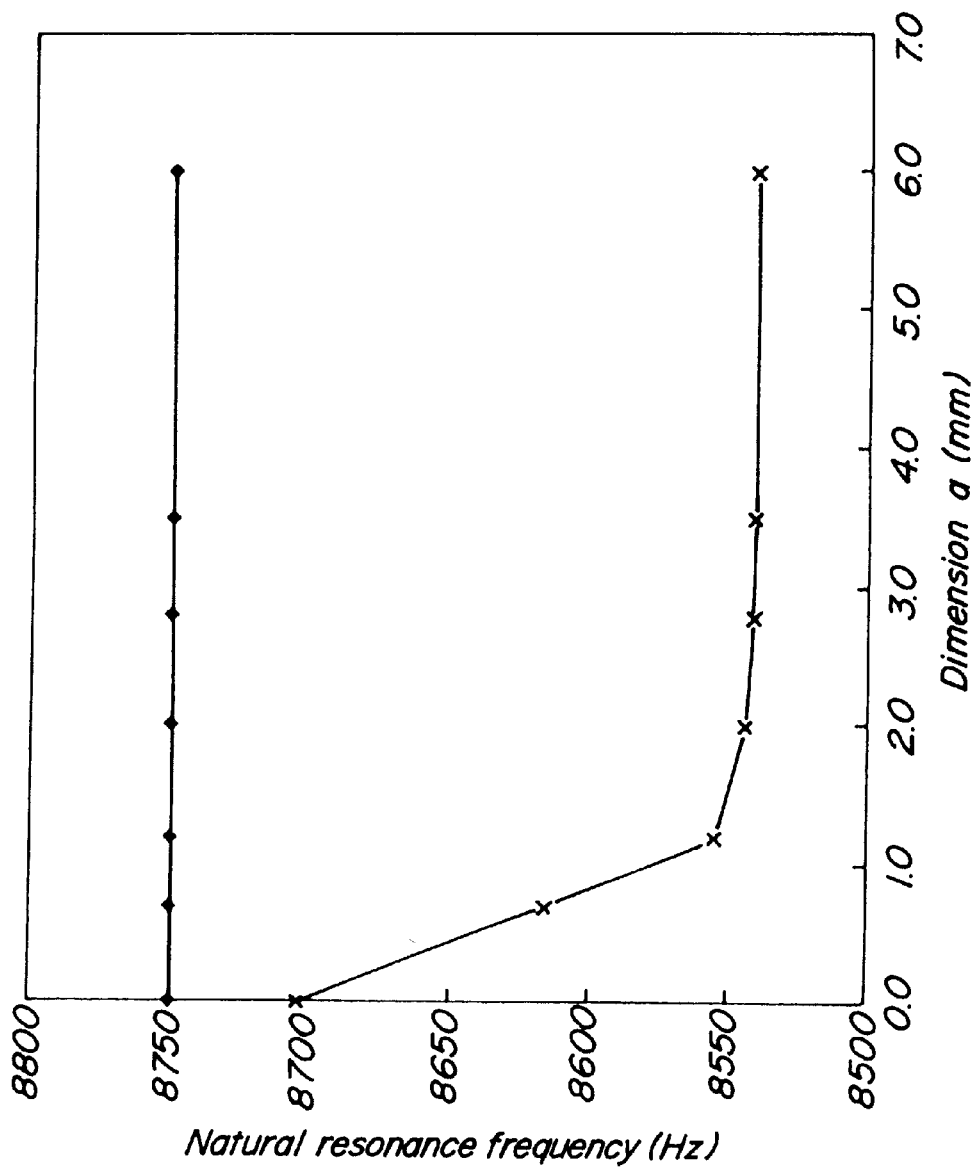
Figure 19:
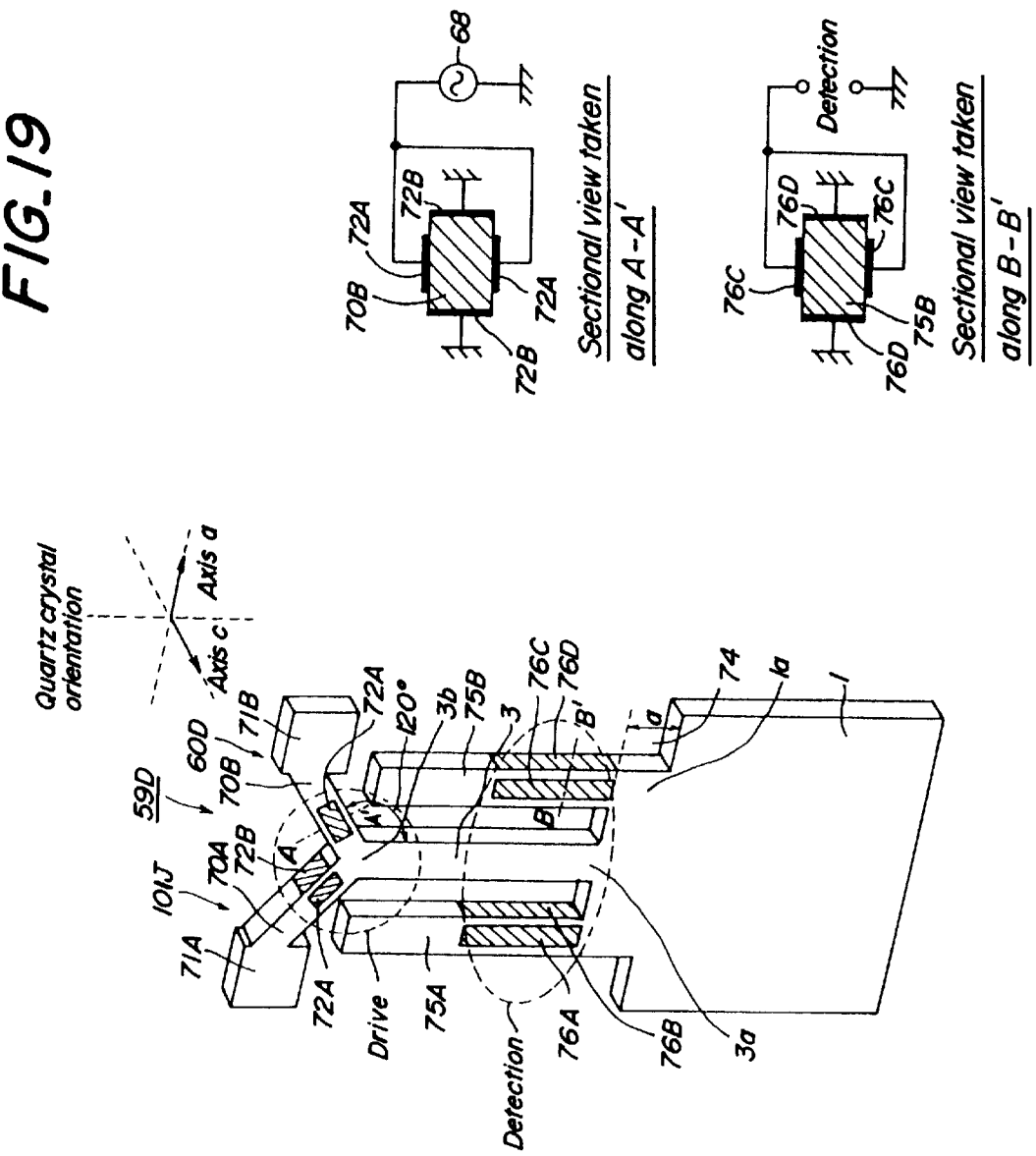
Figure 20:
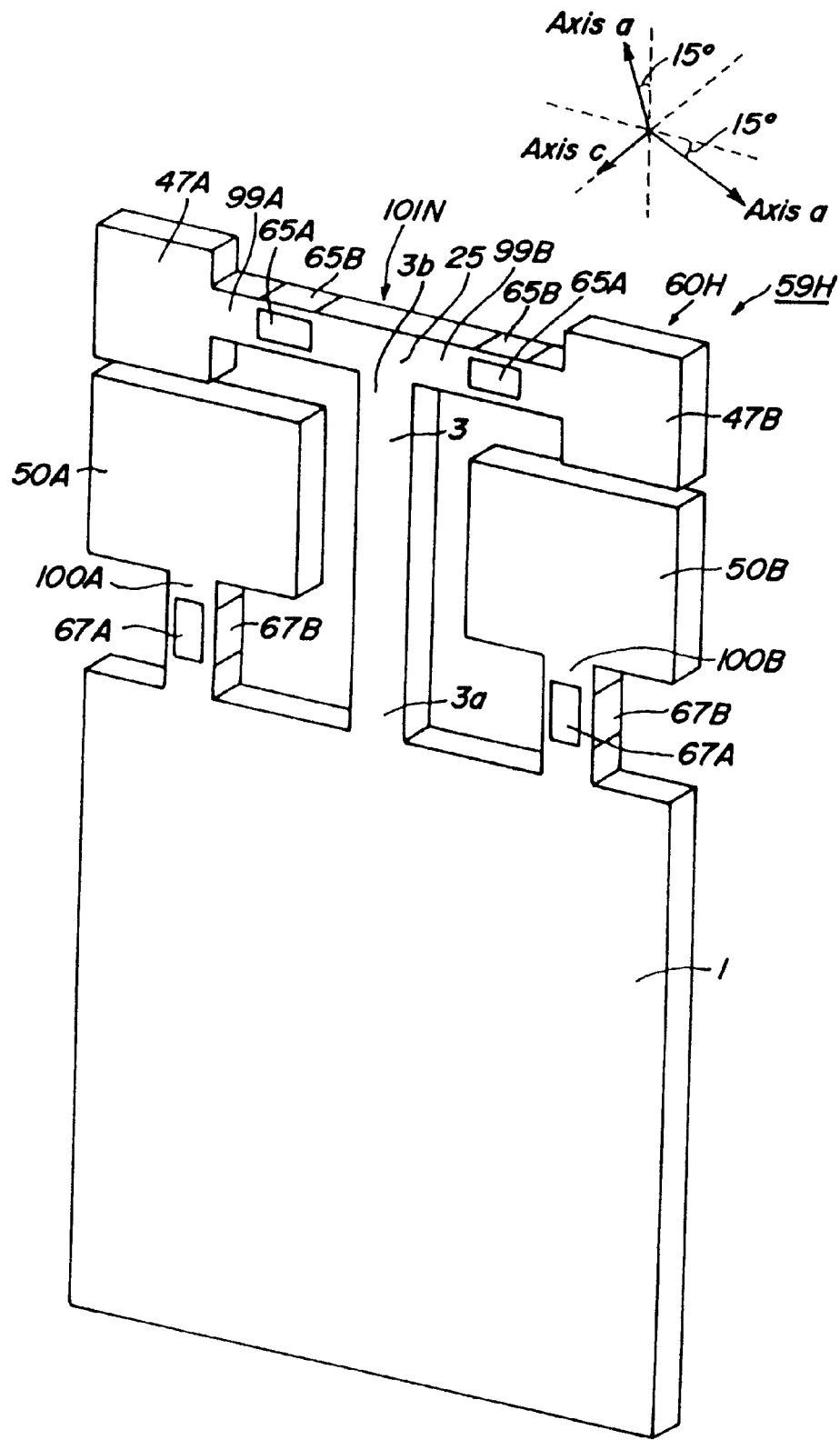
Figure 21:
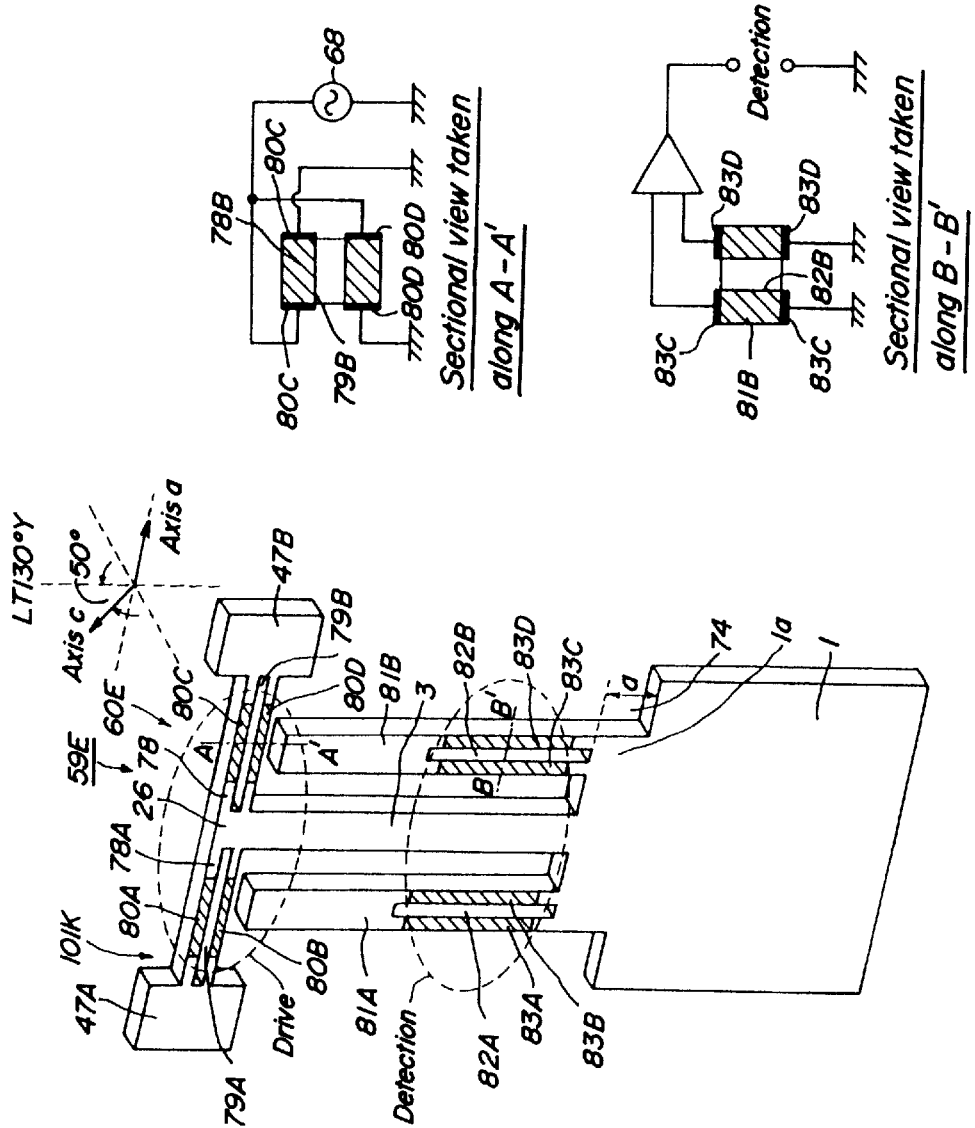
Figure 22:
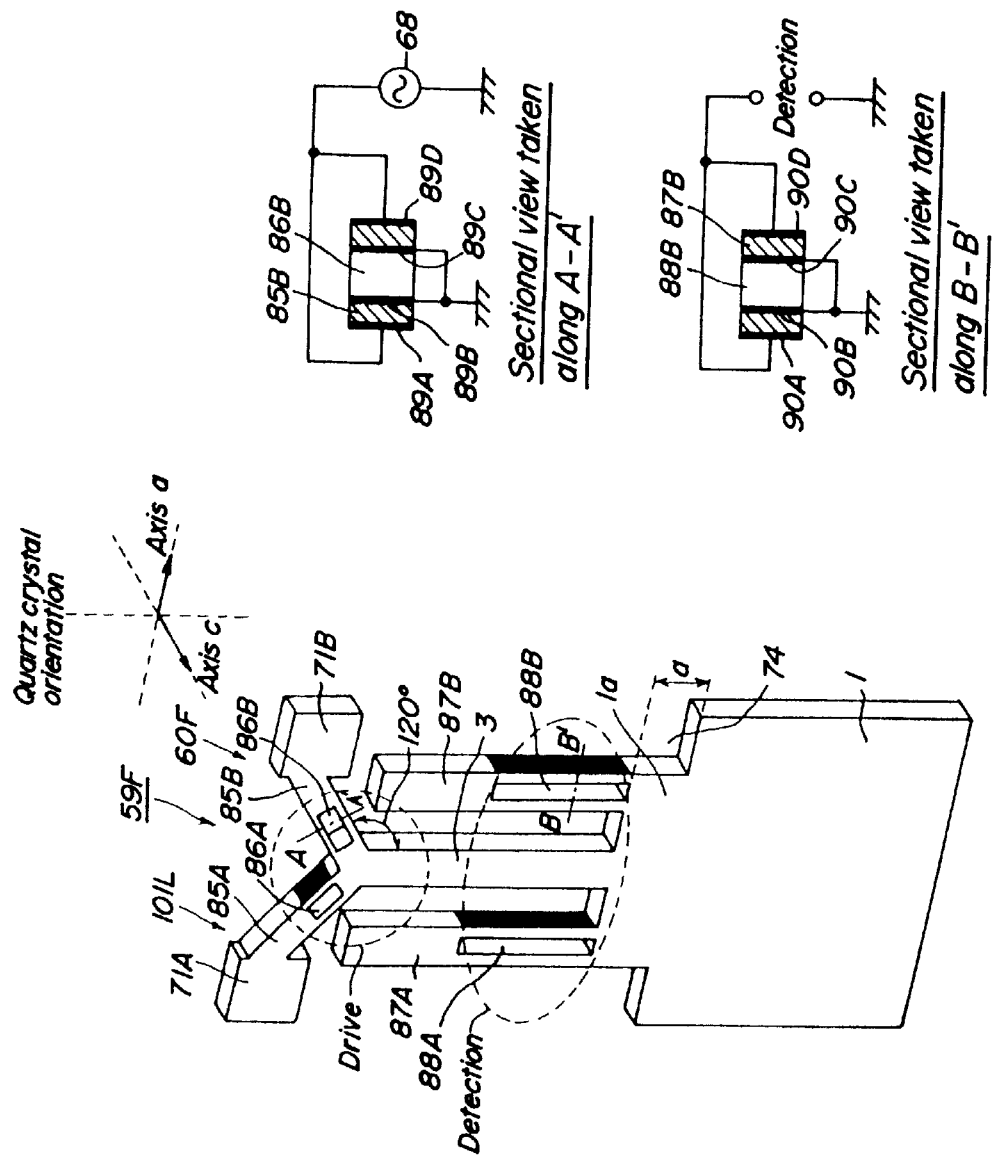
Figure 23:
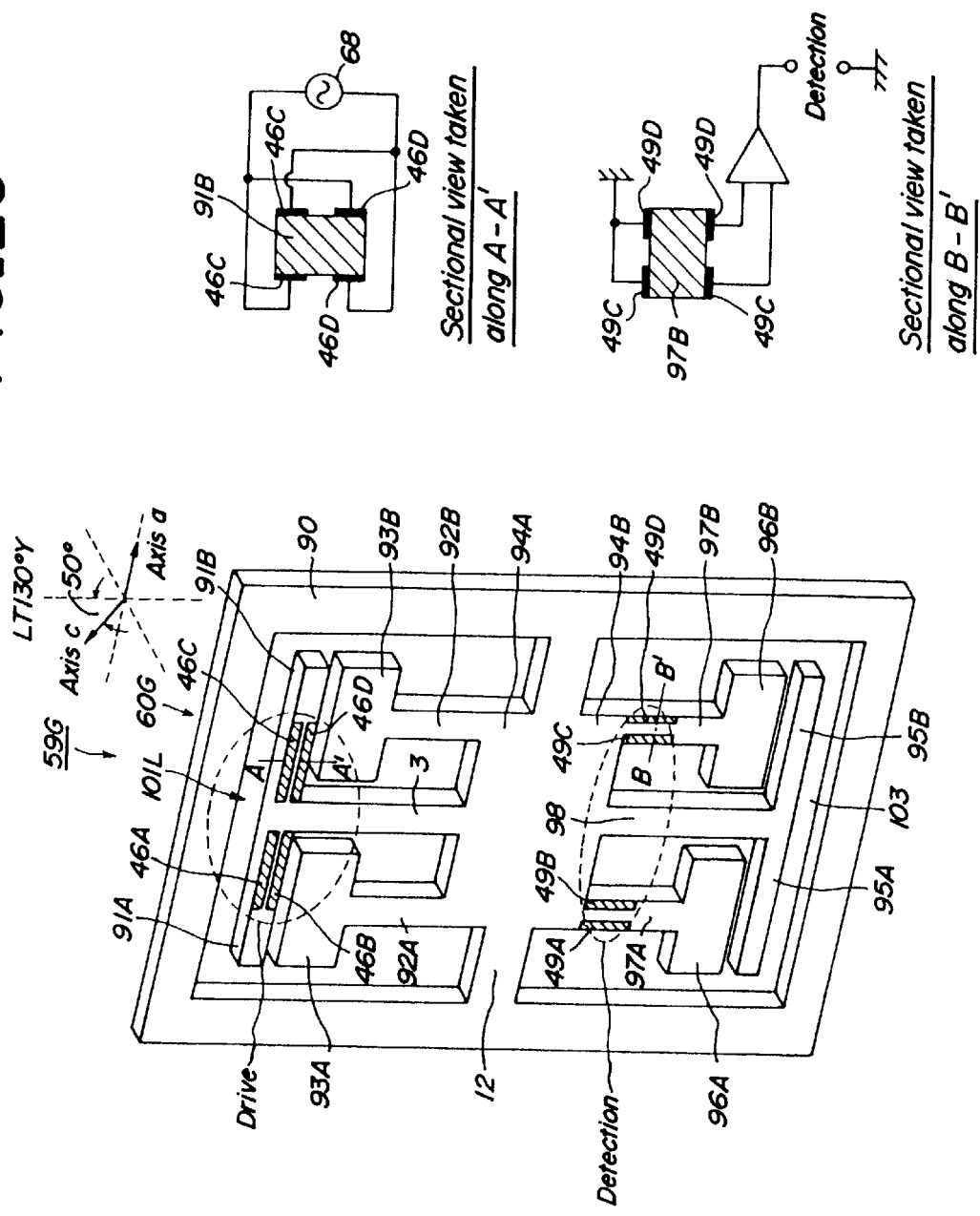
Figure 35:
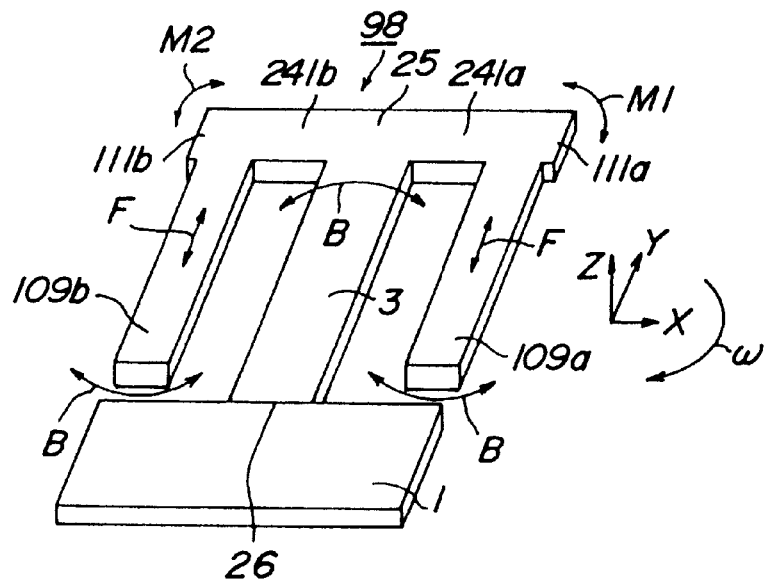
Figure 36:
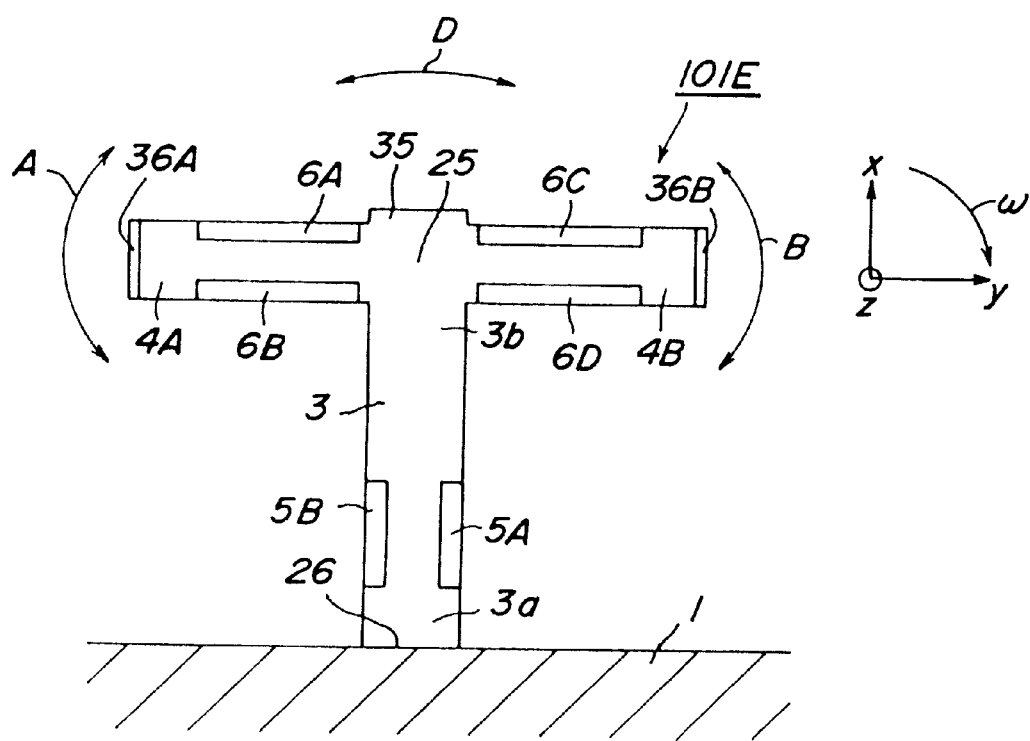
Figure 37:
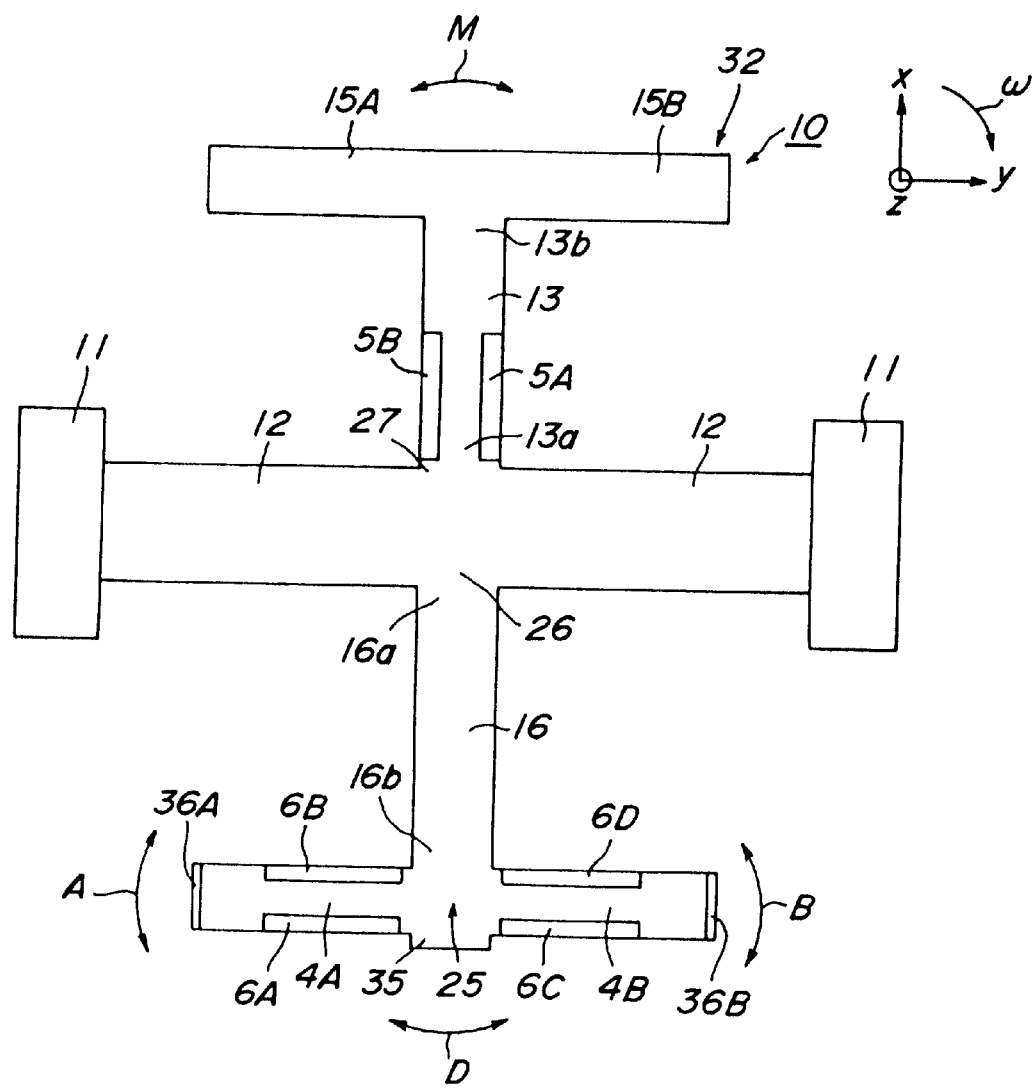
Figure 38:
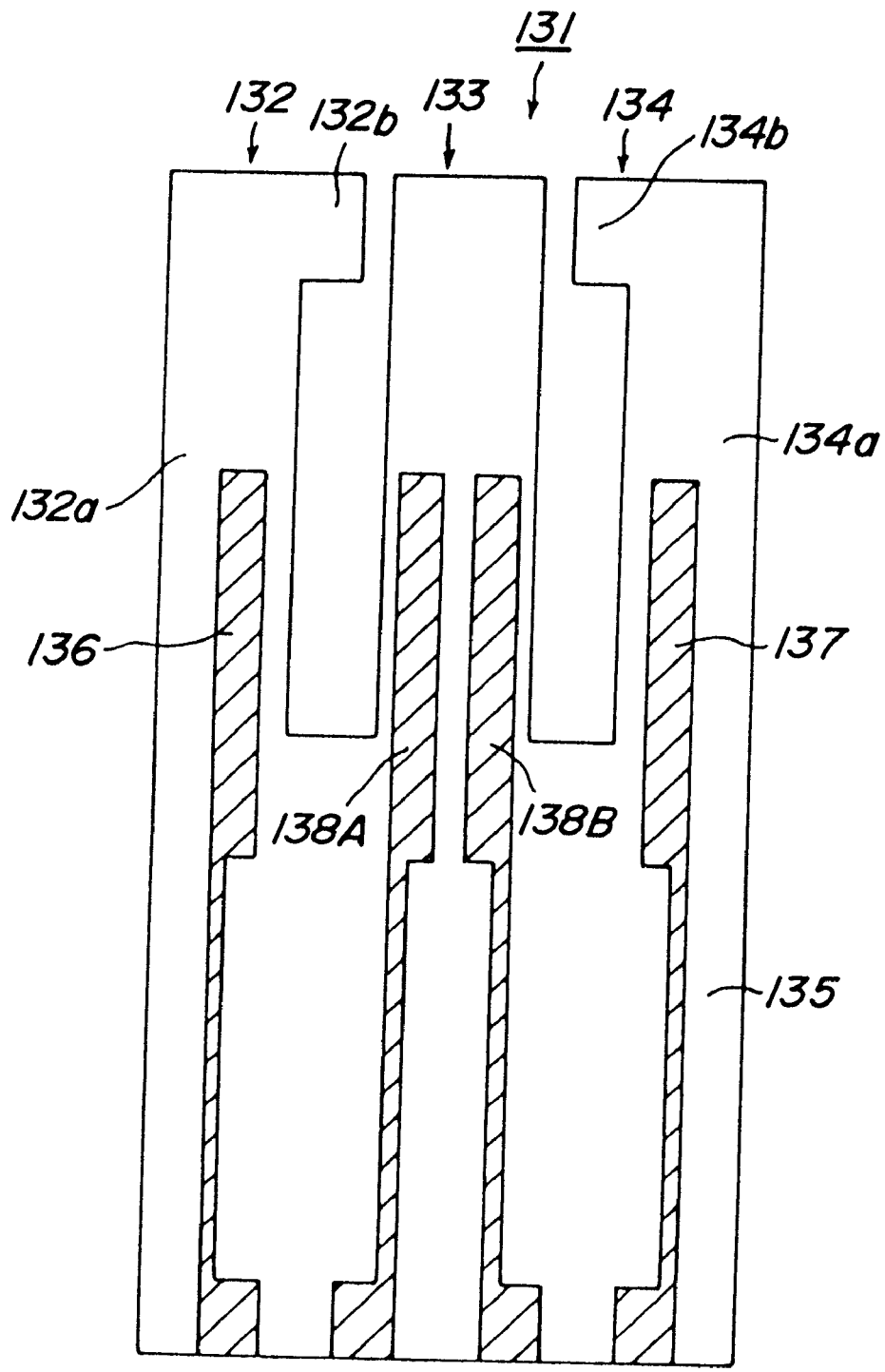
Figure 39:
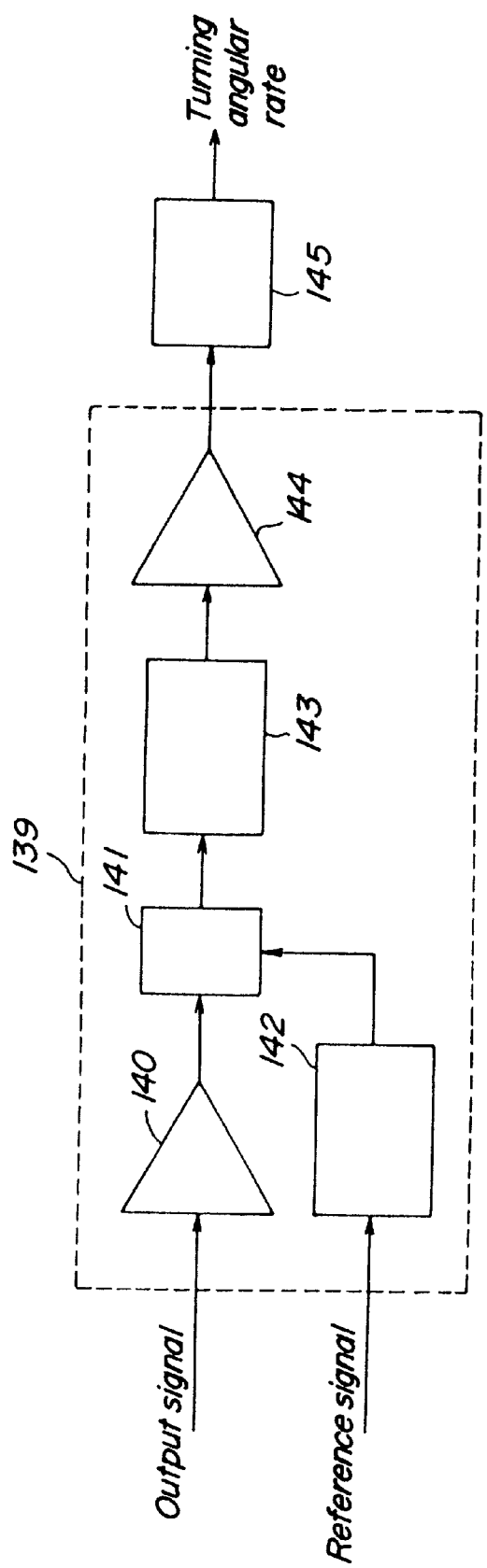
Figure 46:
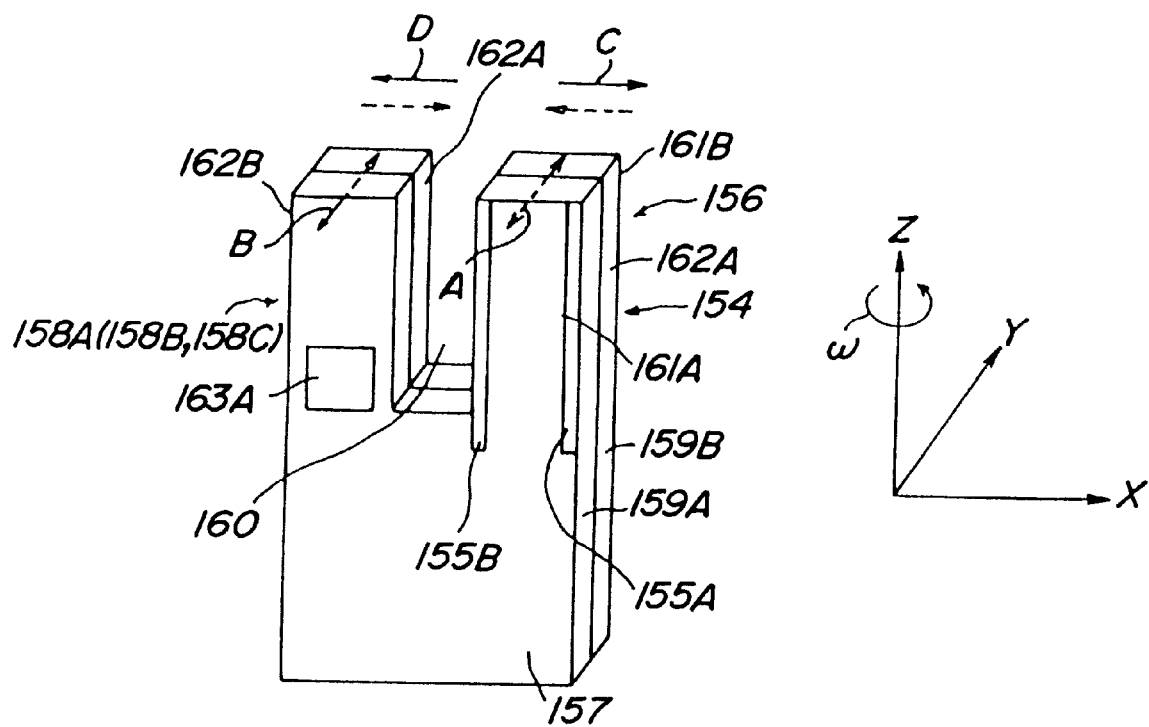
Figure 47A:
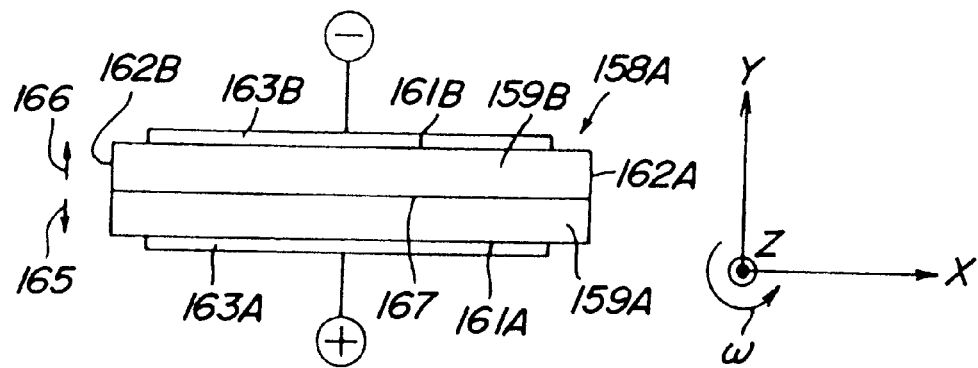
Figure 47B:
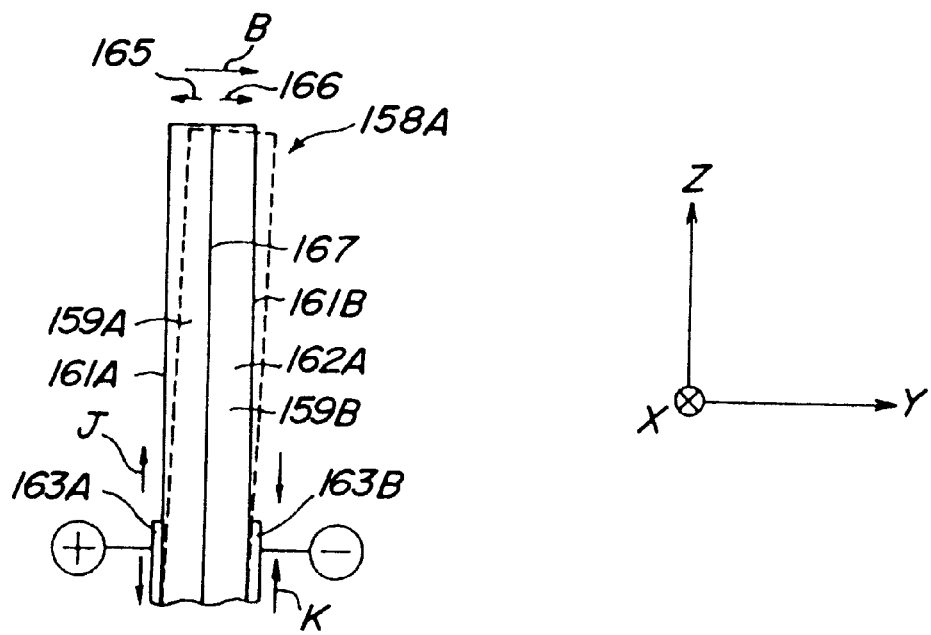
Figure 51:
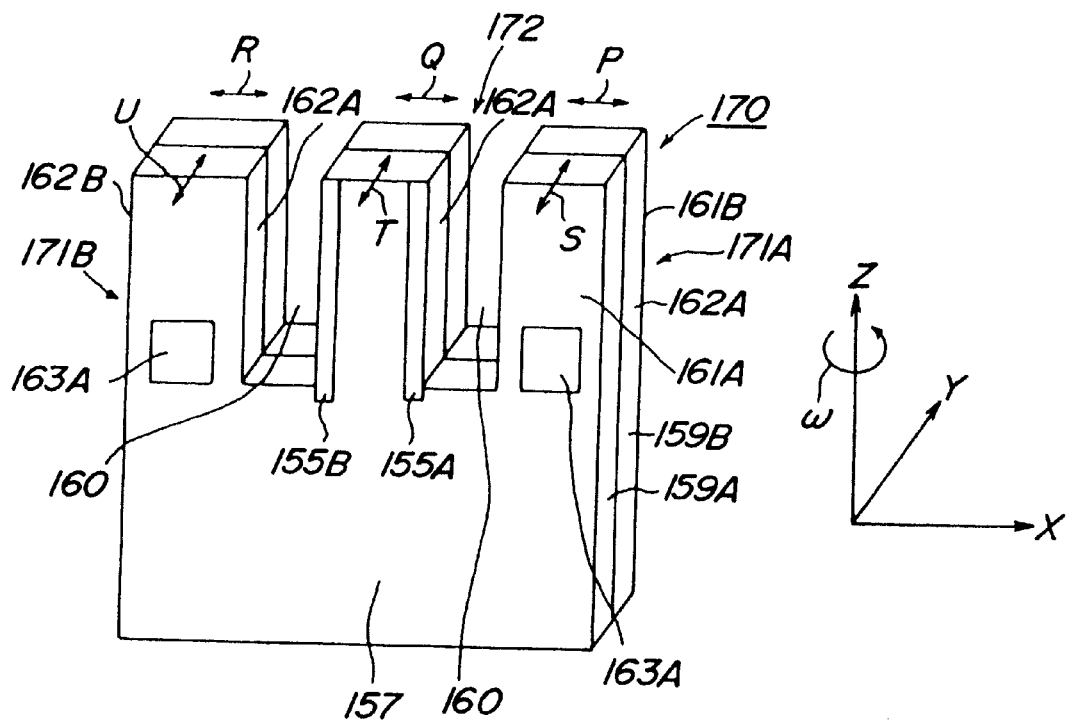
Figure 52:
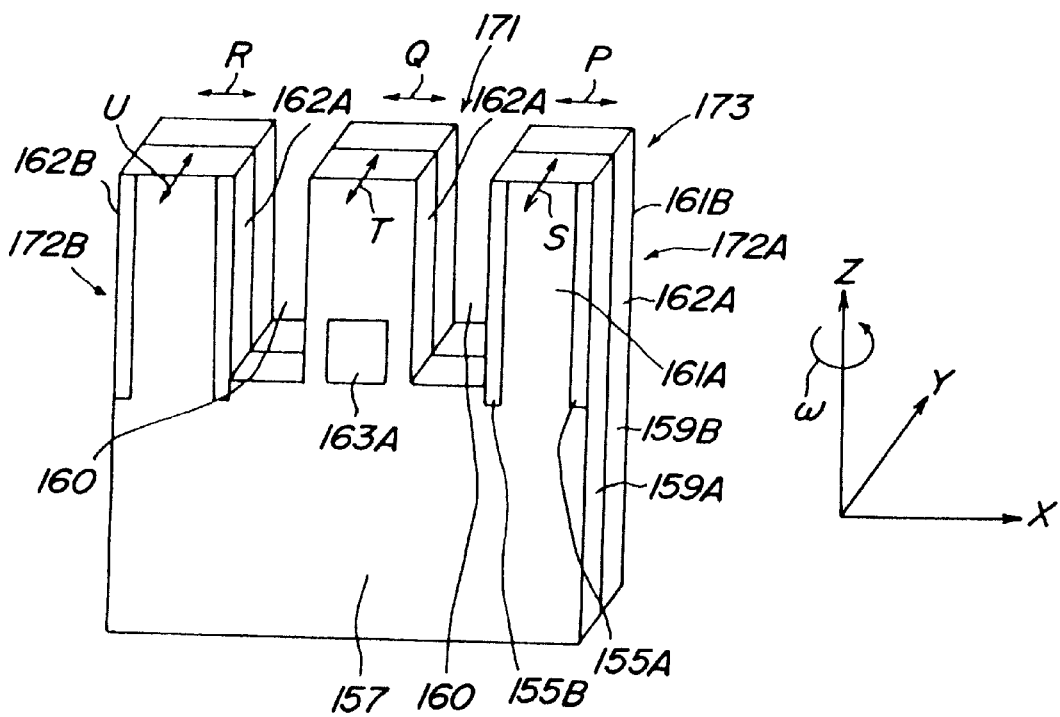
Figure 62:
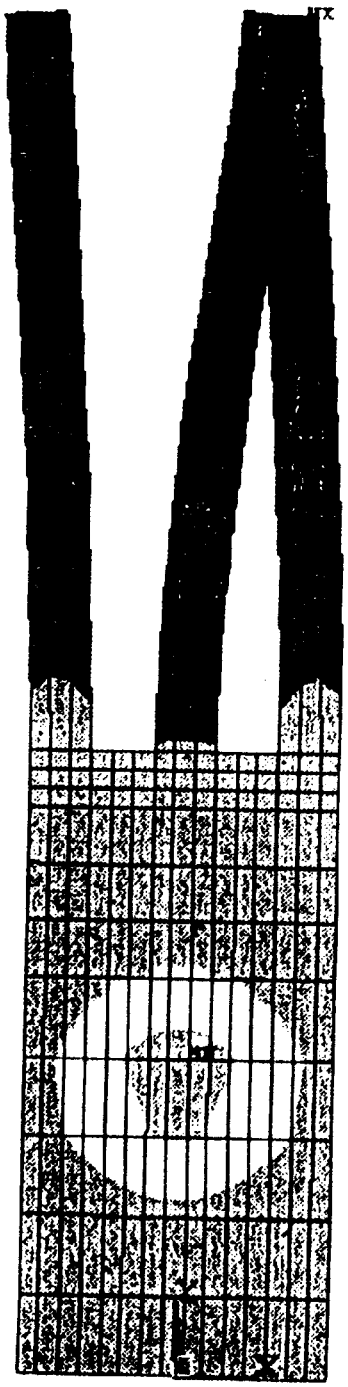
Figure 70:
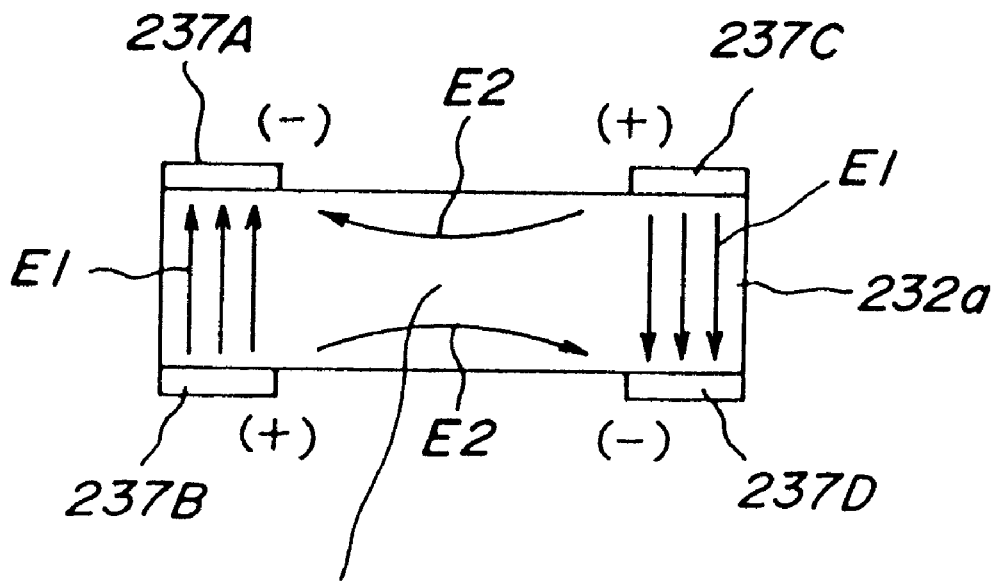

FIGS. 3 to 23 relate to a first embodiment of the present invention;

FIG. 3 is a front view of a vibratory gyroscope of an embodiment;

FIG. 4(a) is a front view for explaining a vibration direction of a linear vibrator;

FIG. 4(b) is a front view for explaining a drive direction of the vibrator of FIG. 3;

FIGS. 5(a), 5(b) and 5(c) are schematic diagrams for explaining vibration directions of the respective parts of the vibrator of FIG. 3 and the principle of vibration of it;

FIG. 6 is a front view of a vibratory gyroscope using a fixing piece part;

FIG. 7 is a front view of another vibratory gyroscope using a fixing piece part;

FIG. 8 is a front view of a further other vibratory gyroscope using a fixing piece part;

FIG. 9 is a front view showing a vibrator whose bending-vibration pieces are not perpendicular to a base part;

FIG. 10 is a front view showing a vibrator whose bending-vibration pieces are curved in shape;

FIG. 11 is a front view of a vibrator having a projection 35 projecting further from its bending-vibration piece;

FIG. 12 is a perspective view roughly showing a vibratory gyroscope using a vibrator comprising a main arm 101F and a pair of resonate arms;

FIG. 13(a) is a diagram showing the form of a drive vibration of the vibrator of FIG. 11;

FIGS. 13(b) and 13(c) are diagrams showing the form of a detection vibration of the vibrator of FIG. 11;

FIG. 14 is a perspective view roughly showing a vibratory gyroscope using a vibrator comprising a main arm 101G and a pair of resonate arms;

FIG. 15 is a perspective view roughly showing a vibratory gyroscope using a vibrator comprising a main arm 101H and a pair of resonate arms, both sides of which are different in size;

FIG. 16 is a perspective view of the vibratory gyroscope of FIG. 15;

FIG. 17 is a graph showing a relation between dimension a and variation in the natural frequencies of a drive vibration and a spurious vibration of the vibratory gyroscope shown in FIGS. 15 and 16;

FIG. 18 is a perspective view roughly showing a vibratory gyroscope provided with a main arm 101I and a pair of resonant arms, wherein a voltage applying direction to the main arm and a voltage applying direction to the resonant arms make an angle of 120 degrees with each other;

FIG. 19 is a perspective view roughly showing a vibratory gyroscope provided with a main arm 101J and a pair of resonant arms, wherein a voltage applying direction to the main arm and a voltage applying direction to the resonant arms make an angle of 120 degrees with each other;

FIG. 20 is a perspective view roughly showing a vibratory gyroscope provided with a main arm 101N and a pair of resonant arms, wherein a voltage applying direction to the main arm and a voltage applying direction to the resonant arms make an angle of 15 degrees respectively to axes a;

FIG. 21 is a perspective view roughly showing a vibratory gyroscope using a vibrator provided with a main arm 101K and a pair of resonant arms, wherein each of the bending-vibration piece and the resonant arms is provided with a through hole;

FIG. 22 is a perspective view roughly showing a vibratory gyroscope using a vibrator provided with a main arm 101L and a pair of resonant arms, wherein each of the bending-vibration piece and the resonant arms is provided with a through hole;

FIG. 23 is a perspective view roughly showing a vibratory gyroscope using a vibrator provided with a fixing piece part 12, a main arm 101L, a pair of resonant arms 92A and 92B, a resonant piece 103, and a pair of second resonant arms 97A and 97B;

FIGS. 24 to 27 relate to a second embodiment of the present invention;

FIG. 24 is a figure showing a configuration of an example of a vibrator of the invention;

FIG. 25 is a figure showing a configuration of another example of a vibrator of the invention;

FIG. 26 is a figure showing a configuration of a further other example of a vibrator of the invention;

FIG. 27 is a figure showing a configuration of a still further other example of a vibrator of the invention;

FIGS. 28 to 34 relate to a third embodiment of the present invention;

FIG. 28 is a figure showing a configuration of an example of a vibrator of the invention;

FIGS. 29(a) and (b) are diagrams for explaining a drive vibration and a detection vibration in a vibrator of the invention;

FIG. 30 is a figure showing a configuration of another example of a vibrator of the invention;

FIG. 31 is a figure showing a configuration of a further other examle of a vibrator of the invention;

FIG. 32 is a figure showing a configuration of a still further other example of a vibrator of the invention;

FIG. 33 is a figure showing a configuration of a still further other example of a vibrator of the invention;

FIG. 34 is a figure showing a configuration of a still further other example of a vibrator of the invention;

FIGS. 35 to 43 relate to a fourth embodiment of the present invention;

FIG. 35 is a figure showing a configuration of an example of a vibrator used in the invention;

FIG. 36 is a figure showing a configuration of another example of a vibrator used in the invention;

FIG. 37 is a figure showing a configuration of a further other example of a vibrator used in the invention;

FIG. 38 is a figure showing a configuration of a still further other example of a vibrator used in the invention;

FIG. 39 is a block diagram showing an example of a phase difference detecting means in a vibratory gyroscope of the invention;

FIG. 40 is a graph showing an example of a relation between a phase difference and a turning angular rate in case that a leakage signal and a gyroscopic signal have a specified relation between them in the invention;

FIG. 41 is a graph showing another example of a relation between a phase difference and a turning angular rate in case that a leakage signal and a gyroscopic signal have a specified relation between them in the invention;

FIG. 42 is a graph showing a further other example of a relation between a phase difference and a turning angular rate in case that a leakage signal and a gyroscopic signal have a specified relation between them in the invention;

FIG. 43 is a graph showing a relation between a linearity error and the ratio of a leakage signal to a gyroscopic signal in the invention;

FIGS. 44 to 59 relate to a fifth embodiment of the present invention;

FIG. 44 is a perspective view of a tuning-fork vibrator studied by the inventors;

FIG. 45(a) is a plan view for explaining a method for exciting vibration in vibration arms;

FIG. 45(b) is a front view of each vibration arm taken in the direction of the X axis;

FIG. 46 is a perspective view showing a vibrator 156 of a vibratory gyroscope of an embodiment of the invention;

FIG. 47(a) is a plan view for explaining a method for exciting vibration in a plane-normal vibration arm of a vibrator of an embodiment of the invention;

FIG. 47(b) is a front view of the vibration arm taken in the direction of the X axis;

FIG. 48 is a schematic plan view for showing a plane-parallel vibration excited in a plane-parallel vibration arm;

FIG. 49(a) is a plan view for explaining a method for exciting vibration in a plane-normal vibration arm of a vibrator of another embodiment of the invention;

FIG. 49(b) is a front view of the plane-normal vibration arm taken in the direction of the X axis;

FIG. 50(a) is a plan view for explaining a method for exciting vibration in a plane-normal vibration arm of a vibrator of a further other embodiment of the invention;

FIG. 50(b) is a front view of the plane-normal vibration arm taken in the direction of the X axis;

FIG. 51 is a perspective view showing a three-forked tuning-fork vibrator of a vibratory gyroscope of the invention;

FIG. 52 is a perspective view showing a three-forked tuning-fork vibrator of a vibratory gyroscope of another embodiment of the invention;

FIG. 53 is a perspective view showing a three-forked tuning-fork vibrator of a vibratory gyroscope of a further other embodiment of the invention;

FIGS. 54(a), 54(b) and 54(c) are perspective views showing base members 185A, 185B and 185C, respectively;

FIG. 55 is a perspective view showing a three-forked tuning-fork vibrator of a vibratory gyroscope of a still further other embodiment of the invention;

FIG. 56 is a plan view schematically showing the form of plane-normal vibration arms 188A and 188B;

FIG. 57 is a plan view schematically showing the form of plane-normal vibration arms;

FIG. 58 is a plan view schematically showing the form of plane-normal vibration arms of another embodiment;

FIG. 59 is a plan view schematically showing the form of plane-parallel vibration arms of another embodiment;

FIGS. 60 to 67 relate to a sixth embodiment of the present invention;

FIGS. 60(a), 60(b) and 60(c) are figures showing a configuration of an example of a vibrator of a vibratory gyroscope of the invention;

FIGS. 61(a) and 61(b) are figures showing an example of a method for supporting a vibrator in the invention;

FIG. 62 is a figure showing an example of a result of a natural mode analysis of a tuning-fork vibrator by means of a finite element method;

FIG. 63 is a figure showing another example of a result of a natural mode analysis of a tuning-fork vibrator by means of a finite element method;

FIG. 64 is a figure showing an example of a result of a natural mode analysis of a vibrator having a T-shaped arm by means of a finite element method;

FIG. 65 is a figure showing an example of a result of a natural mode analysis of a vibrator having a Y-shaped arm by means of a finite element method;

FIG. 66 is a figure showing an example of a result of a natural mode analysis of a vibrator having opposite Y-shaped arms by means of a finite element method;

FIG. 67 is a figure showing another example of a result of a natural mode analysis of a vibrator having opposite Y-shaped arms by means of a finite element method;

FIGS. 68 to 74 relate to a seventh embodiment of the present invention;

FIG. 68 is a figure showing a configuration of an example of a vibratory gyroscope of the prior art;

FIG. 69 is a figure showing a configuration of an example of a vibration arm in the former example shown in FIG. 68;

FIG. 70 is a figure for explaining a problem in the vibration arm of the former examle shown in FIG. 68;

FIG. 71 is a figure showing a configuration of an example of a vibratory gyroscope of the invention;

FIG. 72 is a figure showing a configuration of an example of a vibration arm in the example shown in FIG. 71;

FIG. 73 is a figure showing a configuration of another example of a vibratory gyroscope of the invention;

FIG. 74 is a figure showing a configuration of an example of a vibration arm in the example shown in FIG. 73.

DESCRIPTION OF THE PREFERRED EMBODIMENTS OF THE INVENTION

A first preferred embodiment of the present invention is described with reference to the drawings in the following. FIG. 3 is a front view showing a vibrator of an embodiment of the invention, FIG. 4(a) is a front view for explaining a direction of vibration of a linear vibrator, FIG. 4(b) is a front view for explaining a direction of vibration of the vibrator of FIG. 3, and FIGS. 5(a), 5(b) and 5(c) are schematic diagrams for explaining vibration directions of the respective parts of the vibrator of FIG. 3 and the principle of vibration of it.

In a main arm 101A of a vibrator 2 of FIG. 3, a base part 3 extends from and perpendicularly to a fixing part 1, and one end part 3a of the base part 3 is fixed on the fixing part 1. Specified exciting means 5A and 5B are provided in the base part 3. Two bending-vibration pieces 4A and 4B extending perpendicularly to the base part 3 are provided at the other end part 3b of the base part 3.

A vibration mode of this vibrator 2 is described. As schematically shown in FIG. 5(a), the base part 3 is bent in the direction of arrow H around a joint 26 of it and the fixing member 1 by applying a drive voltage to the exciting means 5A and 5B. With this bending, not only the base part 3 of the vibrator 2 but also each point of the bending-vibration pieces 4A and 4B are moved as shown by arrow I. A velocity vector of this movement is assumed as V.

In this embodiment, the Z axis is the axis of turning, and the vibrator 2 is turned around the Z axis. For example, when the vibrator 2 is moved in the direction of arrow H and the whole vibrator 2 is turned around the Z axis as shown by arrow w, a Coriolis force acts as shown by arrow J. As a result, as shown in FIG. 5(b), the bending-vibration pieces 4A and 4B are bent in the direction of arrow J around a joint 25 of the other end part 3b of the base part 3 and the bending-vibration pieces.

On the other hand, as shown in FIG. 5(c), when the base part 3 is driven in the direction of arrow K and the whole vibrator 2 is turned around the Z axis as shown by arrow ω, a Coriolis force acts as shown by arrow L. As a result, the bending-vibration pieces 4A and 4B are bent in the direction of arrow L around the joint 25 of the other end part 3b of the base part 3 and the bending-vibration pieces. In this way, the bending-vibration pieces 4A and 4B can be vibrated as shown by arrows A and B.

In this way, it is possible to convert a Coriolis force generated in the X-Y plane in the bending-vibration pieces 4A and 4B to a bending vibration around the joint 25 of the bending-vibration pieces 4A and 4B, and obtain a turning angular rate on the basis of the bending vibration. Thanks to this, even in case that the vibrator is arranged perpendicularly to the axis Z of turning (horizontally arranged), a turning angular rate can be detected in high sensitivity.

The sensitivity of detection by the vibrator 2 shown in FIGS. 3 and 5 is furthermore described. As shown in FIG. 4(a), the inventors use a vibrator 8A and 8B in the shape of a long and narrow stick, set the vibrator 8B in the X-Y plane, and extend and contract it. Hereupon, 8A represents a state where the vibrator is extended and 8B represents a state where the vibrator is contracted. Hereupon, a moment when the vibrator is going to extend as shown by arrow E toward the state 8A from the state 8B is considered. When the vibrator 8B is turned around the Z axis, a Coriolis force acts as shown by arrow F. However, since displacement of such a piezoelectric member caused by longitudinal vibration is small and its resonance frequency is low, the sensitivity cannot be made high.

On the other hand, as shown in FIG. 4(b), the invention vibrates the base part 3 as shown by arrow G and thus vibrates the bending-vibration pieces 4A and 4B as shown by arrow D. In this way, it is possible to obtain a much larger amplitude, a much larger vibration speed and a greater Coriolis force than the case of FIG. 4(a).

And in case of using the vibrator shown in FIGS. 3 and 5, it is possible to excite a bending vibration in the bending-vibration pieces 4A and 4B as shown by arrows A and B. When the vibrator 2 turns in the X-Y plane, a Coriolis force is applied to each of the bending-vibration pieces and the Coriolis forces of the bending-vibration pieces are applied to the base part 3. By this, the base part 3 performs a bending vibration around the joint 26 as shown by arrow G. It is possible to detect the bending vibration of the base part 3 and output a signal according to the detected bending vibration.

In case of forming the vibrator out of a piezoelectric single crystal, electrodes are used as exciting means and detecting means 5A, 5B, 6A, 6B, 6C and 6D. However, the vibrator can be formed out of an elastic material, and in this case, piezoelectric members provided with electrodes can be used as exciting means and detecting means 5A, 5B, 6A, 6B, 6C and 6D. And in case that there is one of the exciting means (or detecting means) 5A and 5B, at least one of excitation and detection of vibration can be performed. And in case that there is one of the detecting means (or exciting means) 6A, 6B, 6C and 6B, at least excitation (or detection) of vibration can be performed.

In embodiments shown in FIGS. 6 to 8, a main arm is provided at one side of a fixing piece part both ends of which are fixed, a resonant piece is provided at the other side of the fixing piece part, and the fixing piece part, the main arm and the resonant piece are formed so as to extend substantially in a specified plane.

In the embodiment of FIG. 6, an exciting means side and a detecting means side are separated by a fixing piece part 12. Concretely, both ends of the fixing piece part 12 are fixed by fixing members 11. A main arm 101B is provided at one side of the fixing piece part 12. The main arm 101B is provided with a long and narrow base part 16 and two bending-vibration pieces 4A and 4B extending from an end part 16b of the base part 16 in a direction perpendicular to the longitudinal direction of the base part 16.

A resonant piece 32 is provided at the other side of the fixing piece part 12. The resonant piece 32 is provided with a rectangular supporting part 13 extending from and perpendicularly to the fixing piece part 12, and specified exciting means 5A and 5B are provided in the supporting part 13. Two vibration pieces 15A and 15B extending perpendicularly to the supporting part 13 are provided at the other end 13b side of the supporting part 13. The end part 16a of the base part 16 and the end part 13a of the supporting part 13 are joined to the fixing piece part 12. In this way, both sides of the fixing piece part 12 are nearly line-symmetric to each other.

A vibration mode of this vibrator 10 is described. By applying a driving voltage to the exciting means 5a and 5B, the supporting part 13 and the pair of vibration pieces 15A and 15B are vibrated around the joint 27 of the fixing piece part 12 and the supporting part 13 as shown by arrow M. In resonance with this vibration, the base part 16 and the pair of vibration pieces 4A and 4B are vibrated around the joint 26 of the fixing part 12 and the base part 16 as shown by arrow D.

When the whole of this vibrator 10 is turned around the axis Z of turning, a Coriolis force acts on each of the bending-vibration pieces 4A and 4B as described above. As the result, the bending-vibration pieces 4A and 4B are vibrated around the joint 25, respectively, as shown by arrows A and B.

In this way, it is possible to convert a Coriolis force generated in the X-Y plane in the bending-vibration pieces 4A and 4B by the bending vibration of the resonant piece 32 to a bending vibration around the joint 25 of the bending-vibration pieces 4A and 4B, and obtain a turning angular rate on the basis of this bending vibration. Thanks to this, even in case that the vibrator is arranged perpendicularly to the axis Z of turning (horizontally arranged), a turning angular rate can be detected in high sensitivity.

In the embodiment of FIG. 6, in the vibrator 10, the resonant piece 32 and the main arm 101B are mirror-symmetric in shape to each other in relation to the fixing piece part 12, and by this the natural resonance frequencies of the respective vibration modes of the resonant piece and the main arm are matched with each other. However, it is not necessary that the resonant piece 32 and the main arm 101B are line-symmetric in shape to each other in relation to the fixing piece part 12.

In a vibrator 20 of FIG. 7, since a main arm 101B composed of a base part 16 and a pair of bending-vibration pieces 4A and 4B, and a fixing piece part 12 are the same in shape as those shown in FIG. 6, description of them is omitted. A long and narrow rectangular resonant piece 21 extends from the fixing piece part 12 perpendicularly to it. Exciting means 5A and 5B are provided near an end part 21a at the fixing piece part 12 side of the resonant piece 21.

By applying a driving voltage to the exciting means 5A and 5B, the resonant piece 21 is vibrated around the joint 27 of it and the fixing piece part 12 as shown by arrow M. In resonance with this vibration, the base part 16 and the pair of bending-vibration pieces 4A and 4B are vibrated around the joint 26 of them and the fixing member 11 as shown by arrow D.

In this way, the whole vibrator is more simplified in structure in comparison with the embodiment of FIG. 6 by forming the resonant piece 21 into a long and narrow rectangle. So as not to make large a frequency difference between the vibration frequency at the exciting side and the vibration frequency at the detection side of the fixing piece part 12, it is necessary to adjust both sides so that they are nearly equal in moment to each other. Comparing the resonant piece 21 of FIG. 7 with the resonant piece 32 of FIG. 6 from this viewpoint, in FIG. 7 there are no vibration pieces 15A and 15B, and there are no weights for them. Therefore, it is necessary that the height of the top end 21b of the resonant piece projecting from the fixing piece part 12 is higher than the height of the resonant piece 32 projecting from the fixing piece part 12, namely, that the resonant piece 21 is heavier in weight than the supporting part 13. Accordingly, the resonant piece 21 projecting from the fixing piece part 12 tends to increase in height.

In a vibrator 22 of FIG. 8, since a main arm 101B composed of a base part 16 and a pair of bending-vibration pieces 4A and 4B, and the fixing piece part 12 are the same in shape as those shown in FIG. 6, description of them is omitted. A resonant piece 31 is provided on the fixing piece part 12. The resonant piece 31 is provided with a rectangular supporting part 30 extending from the fixing piece part 12 perpendicularly to it, and the supporting part 30 is provided with exciting means 5A and 5B. An ended part 23 in the shape of a broad rectangle is formed at the top end side of the supporting part 30.

By applying a driving voltage to the exciting means 5A and 5B, the resonant piece 31 is vibrated around the joint 27 of it and the fixing piece part 12 as shown by arrow M. In resonance with this vibration, the base part 16 and the pair of bending-vibration pieces 4A and 4B are 55 vibrated around the joint 26 of them and the fixing piece part 12 as shown by arrow D.

In this way, by providing the expanded part 23 in the resonant piece 31, it is possible to make lower in height the resonant piece 31 projecting from the fixing piece part 12 and furthermore make a vibration frequency of the resonant piece 31 closer to a vibration frequency of the base part 16 and bending-vibration pieces 4A and 4B side.

In vibrators of the present invention, the longitudinal direction of a bending-vibration piece and the longitudinal direction of a base part do not have to be necessarily perpendicular to each other. And a bending-vibration piece may be straight or curved in shape. In case that a pair of bending-vibration pieces are provided, however, it is preferable that both of them have mirror-symmetry to each other in relation to the base part.

In a main arm 101C of a vibrator 40 of FIG. 9, bending-vibration pieces 33A and 33B intersect the extending direction of a base part 3 at a specified angle θ. Although the intersecting angle is not a right angle, the intersecting angle is preferably 45° to 135°, and it is particularly preferably 70° to 100°. Due to this, the natural resonance frequencies of vibration modes of vibrations N and P of the bending-vibration pieces 33A and 33B vary slightly in comparison with the natural resonance frequency of the vibration mode of the bending-vibration piece of the vibrator shown in FIG. 3.

In a main arm 101D of a vibrator 41 of FIG. 10, bending-vibration pieces 34A and 34B are in the shape of a slightly curved arc. Due to this, the natural resonance frequencies of vibration modes of vibrations Q and R of the bending-vibration pieces 34A and 34B vary slightly in comparison with the vibrator shown in FIG. 9. The shapes as shown in FIGS. 9 and 10 can be adopted also in the vibrators shown in FIGS. 6, 7, and 8.

Generally in a piezoelectric vibratory gyroscope, in order to keep a good measurement sensitivity, it is required to keep a constant vibration frequency difference between the natural resonance frequency of a drive vibration mode and the natural resonance frequency in a detection vibration mode. In vibrators of the present invention, when the natural resonance frequency of a vibration mode of a base part and the natural resonance frequency of a vibration mode of a bending-vibration piece become close to each other, the sensitivity becomes good but the response speed is deteriorated. When a frequency difference between the natural resonance frequency of a vibration mode of a base part and the natural resonance frequency of a vibration mode of a bending-vibration piece becomes large, the response speed becomes good but the sensitivity is deteriorated.

Due to this, by removing a weight at the top end of the bending-vibration piece, it is possible to vary the natural resonance frequency of a vibration mode of the bending-vibration piece. And by providing a projection projecting from the bending-vibration piece at the opposite side to the fixed end part of the base part and removing a weight of this projection, it is possible to vary the natural resonance frequency of a vibration mode of the base part.

For example, in a main arm 101E of a vibrator 42 of FIG. 11, a projection 35 projecting from bending-vibration pieces 4A and 4B is provided at the other end part 3b side of the base part 3. And the natural resonance frequency of a vibration mode of vibration D of the base part is varied by performing a process of removing a weight from a part 37 of the projection 35. And the natural resonance frequencies of vibration modes of vibrations A and B of the bending-vibration pieces 4A and 4B can be varied independently of each other by performing a process of removing weights from the top ends 36A and 36B of the bending-vibration pieces 4A and 4B. This removing process can be performed by a laser irradiation process or a machining process.

Next, an embodiment in which a vibrator of the invention is provided with at least a pair of resonant pieces which resonate with vibration of the base part and project from the fixing part is described.

As shown in FIGS. 3 to 11, a vibratory gyroscope utilizing a bending vibration of a main arm or a resonant piece can attain such a high sensitivity that it cannot be obtained up to now in case of adopting a vibrator extending perpendicularly to a turning system. As a result of a further study of the inventors, however, it has been found that the following problem remains. That is to say, since a main arm composed of a bending-vibration piece and a base part is formed so as to project from a fixing part, for example, in case of using a bending vibration of the bending-vibration piece as a drive vibration and detecting a bending vibration around the fixing part of the base part, it has been found that the vibration of the base part is apt to damp comparatively soon and there is room for improvement in the Q value of the detection vibration.

As a result of study for solving this problem, the inventors have thought of projecting at least one pair of resonant arms together with a base part from a fixing part and resonating the resonant arms with vibration of the base part. In this case, although it is possible to use vibration of the resonant arms and the base part as a drive vibration, it is more preferable to use vibration of the resonant arms and the base part as a detection vibration. Since since a detection vibration bearing a gyroscopic signal is much smaller in amplitude than a drive vibration, a greater effect of improvement of the Q value can be obtained.

FIGS. 12 to 14 show vibratory gyroscopes of such embodiments.

In a vibrator 44 of a vibratory gyroscope 43 of FIG. 12, a main arm 101F projects from a fixing part 1, and a pair of resonant arms 48A and 48B project at both sides of the main arm 101F. A base part 3 projects from the fixing part 1, bending-vibration pieces 45A and 45B extending perpendicularly to the base part 3 are formed at an end part 3b side of the base part 3, and weights 47A and 47B are formed at the top ends of the bending-vibration pieces 45A and 45B. The bending-vibration pieces 45A and 45B are provided, respectively, with exciting means (detecting means) 46A, 46B, 46C and 46D.

The resonant arms 48A and 48B projecting from the fixing part 1 are provided, respectively, with detecting means (exciting means) 49A, 49B, 49C and 49D, and weights 50A and 50B are formed, respectively, at the top ends of the resonant arms.

A preferable vibration mode in this case is described with reference to FIGS. 13(a) to 13(c). As described above, the bending-vibration pieces 45A and 45B are excited to bending-vibrate as shown by arrow S in FIG. 13(a). A Coriolis force acts as shown by arrow T when the whole vibrator is turned as described above. There are plural vibrations excited in the base part and a pair of resonant arms by this Coriolis force.

FIG. 13(b) shows the secondary vibrations. In this case, the base part 3 and the resonant arms 45A and 45B are bending-vibrated reversely in phase to each other, and simultaneously with this, the bending-vibration pieces 45A and 45B are vibrated so as to deviate from a straight line 58. FIG. 13(c) shows the primary vibrations. In this case, the base part 3 and the resonant arms 45A and 45B also are bending-vibrated reversely in phase to each other, and simultaneously with this, the bending-vibration pieces 45A and 45B also are vibrated so as to deviate from a straight line 58. The vibrations of the bending-vibration pieces 45A and 45B are reverse in phase to each other, respectively, in case of the primary vibrations and the secondary vibrations.

Hereupon, although any of the primary vibration and the secondary vibration may be used as a detection vibration, it is necessary to select it so that a frequency difference between the natural resonance frequency of a drive vibration and the natural resonance frequency of a detection vibration can be within a certain range.

In a vibrator 60A of a vibratory gyroscope 59A of FIG. 14, a main arm 101G projects from a fixing part 1, a base part 3 projects from the fixing part 1, and bending-vibration pieces 61A and 61B extending perpendicularly to the base part 3 are formed at an end part 3b side of the base part 3. Since there are not parts corresponding to the weights 47A and 47B, it is necessary to lengthen the bending-vibration pieces accordingly. The bending-vibration pieces 61A and 61B are provided, respectively, with exciting means (detecting means) 46A, 46B, 46C and 46D.

A pair of resonant arms 62A and 62B project from the fixing part 1, and a resonant arms 62A and 62B are provided, respectively, with detecting means (exciting means) 49A, 49B, 49C and 49D.

In this invention, in case of using resonant arms, it is possible to vary the natural resonance frequency of vibration of a so-called spurious mode by making different in projection height the resonant arms projecting from both positions of the fixing part. This embodiment is described with reference to a vibratory gyroscope 59B shown in FIGS. 15 and 16.

In a vibrator 60B, a main arm 101H projects from a projection 1a of a fixing part 1. That is to say, a base part 3 projects, and bending-vibration pieces 61A and 61B extending perpendicularly to the base part 3 are formed at an end part 3b side of the base part 3. The bending-vibration pieces 61A and 61B are provided, respectively, with driving electrodes 46A, 46B, 46C and 46D. And a pair of resonant arms 63A and 63B project from the fixing part 1, and the resonant arms 63A and 63B are provided, respectively, with detecting electrodes 49A, 49B, 49C and 49D.

In a perspective view of FIG. 16, the driving electrodes and the detection electrodes are shown in cross-sectional views.

A cut-off part 74 of dimension a is provided outside each of the resonant arms, and by this a projection 1a of a in height is projected from the fixing part 1. As a result, it is possible to deviate the natural resonance frequency of vibration of a spurious mode from the natural resonance frequency of a drive vibration.

For example, in a vibrator shown in FIG. 15, in case of using a bending vibration of the bending-vibration pieces 61A and 61B as a drive vibration, and adjusting its natural resonance frequency to 8750 Hz, bending vibrations of the resonant arms 63A and 63B reverse in phase to each other as shown by arrow U in FIG. 15 are in a spurious mode. Natural resonance frequencies of these vibrations are 8700 Hz as shown in FIG. 17, in case of a=0 as shown in FIG. 14. As a result, since a frequency difference between the natural resonance frequency of the drive vibration and the natural resonance frequency of the spurious mode is 50 Hz, a signal generated by the vibrations reverse in phase of the resonant arms is made much larger than a gyroscopic signal.

As shown in FIG. 17, however, the natural resonance frequency of a spurious mode is greatly varied with the increase of height a. Particularly by making the a 1.0 mm or more, it is possible to greatly deviate the natural resonance frequency of a spurious mode from the natural resonance frequency of a drive vibration.

In this way, to make different in height the resonant arms projecting from both positions of the fixing part is effective to reduce noises caused by vibration in a spurious mode, and for the purpose of this, the a is particularly preferably 1.0 mm or more. This is preferably 6.0 mm or less.

In the vibratory gyroscopes of the embodiments described above, in case of forming a vibrator out of a piezoelectric single crystal, bending-vibration pieces, a base part or resonant arms are bending-vibrated by applying a voltage in the direction perpendicular to the page face. Such a bending-vibration method for vibrating the arms is particularly useful in case of using a single crystal, for example, of lithium niobate, lithium tantalate, or a solid solution of lithium niobate-lithium tantalate.

As described above, however, the vibrators of the embodiments of FIGS. 3 to 16 can be naturally applied also to another piezoelectric single crystal such as quartz crystal or the like as adopting the same form of a drive vibration and a detection vibration. However, since this case is different in direction of an effective piezoelectric axis of the piezoelectric single crystal from the case of lithium niobate and the like, it is necessary to properly change the driving electrode and the detection electrode in shape in order to utilize the effective piezoelectric axis for bending vibration.

FIGS. 18 to 20 all show vibratory gyroscopes of particularly preferred embodiments in case that a vibrator is formed by using a piezoelectric single crystal having the triad axis of symmetry (a-axis) in a specified plane like a quartz crystal and its c-axis is perpendicular to the specified plane.

In such a form, it is preferable to set a voltage applying direction in a bending-vibration piece and a signal voltage direction in a resonant arm along the a-axis. FIGS. 18 and 19 relate to such embodiments.

In a vibrator 60C of a vibratory gyroscope 59C of FIG. 18, a main arm 101I and a base part 3 project from a fixing part 1, and bending-vibration pieces 64A and 64B extending perpendicularly to the base part 3 are formed at an end part 3b side of the base part 3. The bending-vibration pieces 64A and 64B are provided, respectively, with driving electrodes 65A and 65B. These drive electrodes are shaped as shown in a sectional view taken along A–A', and the drive electrode 65A is grounded and the drive electrode 65B is connected to an alternating-current power source 68. By this, a voltage is applied in the direction of the a-axis in the bending-vibration pieces 64A and 64B, and a bending vibration is generated.

The longitudinal directions of a pair of resonant arms 66A and 66B are inclined at an angle of 120° to the bending-vibration pieces 64A and 64B. The detection electrodes 67A and 67B in the resonant arms 66A and 66B are the same in shape as the drive electrodes 65A and 65B. As the result, a voltage is applied in the direction of the a-axis also in the resonant arms 66A and 66B. Therefore, both of a piezoelectric constant utilized in a bending-vibration piece and a piezoelectric constant utilized in a resonant arm are increased and come to the same degree.

In a vibrator 60D of a vibratory gyroscope 59D of FIG. 19, a main arm 101J and a base part 3 project from a fixing part 1, and bending-vibration pieces 70A and 70B extending in the directions inclined at an angle of 120° to the base part 3 are formed at an end part 3b side of the base part 3. Weights 71A and 71B are provided, respectively, at the ends of the bending-vibration pieces 70A and 70B.

The bending-vibration pieces 70A and 70B are provided, respectively, with drive electrodes 72A and 72B. These drive electrodes are shaped as shown in a sectional view taken along A–A', and the drive electrode 72B is grounded and the drive electrode 72A is connected to an alternating-current power source 68. By this, a voltage is applied in the direction of the a-axis in the bending-vibration pieces 70A and 70B, and a bending vibration is generated.

The longitudinal direction of a pair of resonant arms 75A and 75B is inclined at an angle of 120° to the bending-vibration pieces 70A and 70B. The shape of the detection electrodes 76A, 76B, 76C and 76D is shown in a sectional view taken along B–B', and the detection electrodes 76D are grounded and a detection signal is taken out from the detection electrodes 76C. As the result, a signal voltage is generated in the direction of the a-axis also in the resonant arms 75A and 75B.

As shown in the embodiment of FIG. 20 for example, in case of extending a bending-vibration arm and resonant arms in the vertical direction, a detection signal can be taken out by inclining the longitudinal directions of the bending-vibration arm and the resonant arms at an angle of 10° to 20°, preferably 15° to the a-axis.

That is to say, in a vibrator 60H of a vibratory gyroscope 59H, a main arm 101N and a base part 3 project from a fixing part 1, and bending-vibration pieces 99A and 99B extending perpendicularly to the base part 3 are formed at an end part 3b side of the base part 3, and weights 47A and 47B are provided, respectively, at the top ends of the bending-vibration pieces. The bending-vibration pieces are provided, respectively, with drive electrodes 65A and 65B. And a pair of resonant arms 100A and 100B project from the fixing part 1 in parallel with the base part 3, and the resonant arms 100A and 100B are provided, respectively, with detection electrodes 67A and 67B.

Hereupon, both of a voltage applying direction in the bending-vibration pieces and a signal voltage direction in the resonant arms form an angle of 15° with the a-axis, and therefore, the same piezoelectric constant is utilized in both arms.

In this invention, each of the bending-vibration pieces or the resonant arms can be provided with a through hole extending in its longitudinal direction. Thanks to this, the sensor sensitivity can be improved by lowering the natural resonance frequency of the bending-vibration pieces or the resonant arms and increasing the amplitude of the resonant arms. FIGS. 21 and 22 show vibratory gyroscopes of such embodiments of the invention.

In a vibrator 60E of a vibratory gyroscope 59E of FIG. 21, a main arm 101K projects from a fixing part 1 and a base part 3 projects from a fixing part 1, and bending-vibration pieces 78A and 78B extending perpendicularly to the base part 3 are formed at an end part 3b side of the base part 3. Weights 47A and 47B are provided, respectively, at the top ends of the bending-vibration pieces. Through holes 79A and 79B extending in the longitudinal direction of the bending-vibration pieces are formed, respectively, in the bending-vibration pieces. And long and narrow drive electrodes 80A, 80B, 80C and BOD are provided, respectively, at both sides of the through holes of the bending-vibration pieces.

In this embodiment, a 130° Y plate of lithium tantalate is used and the c-axis forms an angle of 50° with the main face of the vibrator. The vibrator has the best temperature characteristics at this angle. In the bending-vibration pieces, as shown in a sectional view taken along A–A', since a voltage applying direction to the drive electrodes 80A and 80C, and a voltage applying direction to the drive electrodes 80B and 80D are reverse to each other, the bending-vibration pieces are bent.

A pair of resonant arms 81A and 81B project from a fixing part 1 and the resonant arms 81A and 81B are provided, respectively, with detection electrodes 83A, 83B, 83C and 83D. Through holes 82A and 82B extending in the longitudinal direction of the resonant arms are formed, respectively, in the resonant arms. And long and narrow detection electrodes 83A, 83B, 83C and 83D are provided, respectively, at both sides of the through holes in the resonant arms. In the resonant arms, as shown in a sectional view taken along B–B', a voltage generated in the detection electrodes 83A and 83C, and a voltage generated in the detection electrodes 83B and 83D are reverse to each other.

In a vibrator 60F of a vibratory gyroscope 59F of FIG. 22, a main arm 101L and a base part 3 project from a fixing part 1, and a pair of bending-vibration pieces 85A and 85B are formed at an end part 3b side of the base part 3, and weights 71A and 71B are provided, respectively, at the top ends of the bending-vibration pieces. Each of the bending-vibration pieces extends in the direction forming an angle of 120° to the base part. Through holes 86A and 86B extending in the longitudinal direction of the bending-vibration pieces are formed, respectively, in the bending-vibration pieces. And drive electrodes 89A and 89D are provided on the outside walls of each of the through holes, and drive electrodes 89B and 89C are provided on the inside walls of each of them.

In this embodiment, a piezoelectric single crystal plate having the a-axis of the triad axis of symmetry in a specified plane like quartz crystal is used. In each of the bending-vibration pieces, as shown in a sectional view taken along A–A', the drive electrodes 89A and 89D on the outside walls are connected to an alternating-current power source 68, and the drive electrodes 89B and 89C on the inside walls are grounded. Since a combination of the drive electrodes 89A and 89B and a combination of the drive electrodes 89C and 89D have voltage applying directions reverse in phase to each other, the bending-vibration pieces are bent.

A pair of resonant arms 87A and 87B project from a projection 1a of a fixing part 1 and through holes 88A and 88B extending in the longitudinal direction of the resonant arms are formed, respectively, in the resonant arms. And as shown in a sectional view taken along B–B', detection electrodes 90A and 90D are provided on the outside walls of each of the through holes, and detection electrodes 90B and 90C are provided on the inside walls of each of them. In the resonant arms, a voltage generated in the detection electrodes 90A and 90C, and a voltage generated in the detection electrodes 90B and 90D are reverse in phase to each other.

As shown in this embodiment, a bending-vibration piece or a resonant arm can be bent by providing a pair of drive electrodes on the inside and the outside wall of each of two sides of a through hole formed in the bending-vibration piece or the resonant arm. The detection side also goes in the same way.

In this invention, the above-mentioned main arm and at least a pair of resonant arms can be provided at one side of the fixing piece part and a resonant piece to resonate with the main arm can be provided at the other side of the fixing piece part. In this case, drive electrodes are provided on a bending-vibration piece of the resonant piece and detection electrodes are provided on the resonant arms. By this, it is possible to use a bending vibration of the bending-vibration piece of the resonant piece as a drive vibration and use a bending vibration of the resonant arm as a detection vibration. Otherwise, drive electrodes are provided on the resonant arms and detection electrodes are provided on the bending-vibration piece of the resonant piece. By this, it is possible to use a bending vibration of the resonant arm as a drive vibration and use a bending vibration of the bending-vibration piece of the resonant piece as a detection vibration.

In such a manner, furthermore, a second resonant arm can be provided at the other side of the fixing piece part. FIG. 23 is a perspective view roughly showing a vibratory gyroscope 59G of this embodiment.

In this vibrator 60G, a fixing piece part 12 is provided inside a fixing member 90. At one side of the fixing piece part 12, a main arm 101L and a pair of resonant arms 92A and 92B project from a projection 94A. In the main arm 101L, bending-vibration pieces 91A and 91B extending perpendicularly to the base part 3 are formed at an end side of the base part 3. Drive electrodes 46A, 46B, 46C and 46D are provided on the bending-vibration pieces. Weights 93A and 93B are, respectively, provided at the top ends of the resonant arms.

In the bending-vibration pieces 91A and 91B, as shown in a sectional view taken along A–A', a voltage applying direction to the drive electrodes 46A and 46C side and a voltage applying direction to the driving electrodes 46B and 46D side are reverse in phase to each other.

At the other side of the fixing piece part 12, a resonant arm 103 and a pair of second resonant arms 97A and 97B project from a projection 94B. In the resonant piece 103, bending-vibration pieces 95A and 95B extending perpendicularly to a base part 98 are formed at an end side of the base part 98.

Weights 96A and 96B are, respectively, provided at the top ends of the resonant arms 97A and 97B. As shown in a sectional view taken along B–B', detection electrodes 49A, 49B, 49C and 49D are provided on the resonant arms. A signal voltage generated in the detection electrodes 49A and 49C side and a signal voltage generated in the detection electrodes 49B and 49D side are reverse in phase to each other.

A second embodiment of the invention is described in more detail in the following.

FIG. 24 shows a construction of an example of a vibrator of the invention. In the example shown in FIG. 24, a vibrator 108 extends in the X-Y plane and is composed of a pair of tuning-fork vibration pieces 109a and 109b, a pair of bending-vibration pieces 241a and 241b for joining them in the X-Y plane, and a base part 3 for fixing these bending-vibration pieces on an external fixing member 1 in the X-Y plane. The one pair of tuning-fork vibration pieces 109a and 109b are almost in parallel with each other, and are joined with the bending-vibration pieces nearly perpendicularly to them. The base part 3 is joined with the nearly middle part 25 between the bending-vibration pieces 241a and 241b, and is almost in parallel with the tuning-fork vibration pieces 109a and 109b.

In the vibrator 108 having the above-mentioned construction of the invention, when forces F1 and F2 different in direction from each other act on both ends of the bending-vibration pieces 241a and 241b of the tuning-fork vibrator in parallel with the tuning-fork vibration pieces 109a and 109b, namely, in the Y direction, a bending motion B having a joint 26 where the base part 3 is joined with the fixing part 1 as a fulcrum takes place in the X-Y plane in the base part 3.

Although the tuning-fork vibration pieces, the bending-vibration pieces, and the base part which form the vibrator 108 can be formed out of separate members, it is preferable to form them in one body from a viewpoint of manufacturability and the like in case of forming them out of a single crystal in particular. Although a material for them also is not limited in particular, it is preferable to use a single crystal of quartz, LiNbO₃, LiTaO₃, or Li(Nb, Ta)O3. Using these single crystals makes it possible to obtain a good detection sensitivity and reduce detection noises. And since they are insensitive to a temperature change, they are preferable for a sensor mounted in a car requiring a thermal stability. Among the above-mentioned single crystals, since single crystals of LiNbO₃ and LiTaO₃ have comparatively large electromechanical coupling coefficients, it is preferable to use a single crystal of LiNbO₃ or LiTaO₃ rather than a quartz crystal. Comparing single crystals of LiNbO₃ and LiTaO₃ with each other, a single crystal of LiTaO₃ has a comparatively larger electromechanical coupling coefficient than a single crystal of LiNbO₃, it is more preferable to use a single crystal of LiTaO₃ rather than a single crystal of LiNbO₃.

The vibrator 108 having the above-mentioned construction is used mainly as a vibratory gyroscope. A case where a vibrator 1 is used as the first invention of a vibratory gyroscope is considered in the following. First, the tuning-fork vibration pieces are vibrated exactly reversely in phase to each other in the X-Y plane by means of an unillustrated exciting means in a turning system having the Z axis as the central axis. When a turning angular rate ω acts around the Z axis in this state, a Coriolis force makes forces F1 and F2 reverse in direction to each other act on the tuning-fork vibration pieces along the Y axis. As the result, moments M1 and K2 having the same direction act on both ends of the bending-vibration pieces. These moments M1 and M2 generate a bending vibration B in the X-Y plane in the base part 3. A turning angular rate can be measured by detecting this bending vibration B as deformation of the base part 3 by means of an unillustrated bending-vibration detecting means.

As described above, since the vibratory gyroscope of this invention converts a Coriolis force generated in the same X-Y plane as the tuning-fork vibration pieces into a bending vibration of the base part 3 and obtains a turning angular rate from the bending vibration, it can detect a turning angular rate even when the vibrator is arranged perpendicularly to the axis of turning (horizontally arranged). Accordingly, even in case of mounting the vibratory gyroscope of the invention as an angular-speed sensor for the purpose of obtaining a turning angular rate of a car body for example, it can be shortened in height for the mounting part.

Although the above-mentioned example vibrates the tuning-fork vibration pieces and the bending-vibration pieces in the X-Y plane and obtains a turning angular rate from a bending vibration of the base part 3 in this state, it is also possible to replace vibration and measurement with each other. That is to say, as shown in FIG. 27, in a state of exciting a bending vibration B in the fixing part 3 by means of an unillustrated exciting means, a Coriolis force generated on the basis of a turning angular rate makes forces F1 and F2 having the same direction as each other act on the tuning-fork vibration pieces 109a and 109b along the Y axis. As the result, moments M1 and M2 having the different directions from each other act on both ends of the bending-vibration pieces. In the same way, a turning angular rate can be measured by using an unillustrated vibration detecting means which detects vibration in the X-Y plane generated in the tuning-fork vibrator by these moments M1 and M2 and generates a signal according to the detected vibration. This copposition is the second invention of a vibratory gyroscope of the invention.

FIG. 25 shows the construction of another example of a vibrator of the invention. In the example shown in FIG. 25, the same symbols are given to the same members as the members shown in FIG. 24 and description of them is omitted. The examle shown in FIG. 25 is different from the example shown in FIG. 24 in that projections 111a and 111b, respectively, projecting outer than the tuning-fork vibration pieces 109a and 109b are provided at both ends of the bending-vibration pieces 241a and 241b forming the tuning-fork vibrator. In the example shown in FIG. 25, relation between the resonance frequency of vibration in the X-Y plane of the tuning-fork vibrator and the resonance frequency of a bending vibration of the base part can be simply adjusted to a specified relation by reducing at least one of the projections 111a and 111b in projection height.

Hereupon, when the resonance frequency of the tuning-fork vibrator and the resonance frequency of the base part 3 become close to each other, the sensitivity becomes good but the response speed is deteriorated, and when both of them become distant from each other, the response speed becomes good but the sensitivity is deteriorated. Therefore, relation between the resonance frequency of vibration in the X-Y plane of the tuning-fork vibrator and the resonance frequency of a bending vibration of the base part 3 is adjusted to a specified relation in which both of the sensitivity and the response speed become good to some degree.

FIG. 26 shows the construction of a further other example 98 of a vibrator of the invention. In the example shown in FIG. 26 also, the same symbols are given to the same members as the example shown in FIG. 24 and description of them is omitted. The example shown in FIG. 26 is different from the example shown in FIG. 24 in that while the tuning-fork vibration pieces 109a and 109b project from the bending-vibration pieces in a direction opposite to the base part 3 in relation to the bending-vibration pieces in the example shown in FIG. 24, the tuning-fork vibration pieces 109a and 109b project in the same direction as the base part 3 in the example shown in FIG. 26. A vibratory gyroscope can be made more compact by forming it as shown in FIG. 26.

The variation examples of a vibrator shown in FIGS. 25 and 26 also are used mainly in a vibratory gyroscope in the same way as the vibrator shown in FIG. 24, and act also in the same way as the example shown in FIG. 24. At that time, as an exciting means, a bending-vibration detecting means, and a vibration detecting means which are not illustrated, piezoelectric members of piezoceramic or the like can be preferably used in the same way as used up to now. And in case of using a vibrator made of a piezoelectric single crystal as a vibrator, an exciting means, a bending-vibration detecting means and a vibration detecting means can be formed by providing electrodes at specified positions. Furthermore, in a vibratory gyroscope using a vibrator having the construction shown in FIGS. 24 or 25, since it is possible to form an exciting means and a bending-vibration detecting means or a vibration detecting means at positions distant from each other as well as to shorten the gyroscope in height by horizontally arranging it, it is possible to further reduce a bad influence of an electromechanical coupling or the like between both of the exciting means and the detecting means.

Moreover, in any example, a vibrator of the invention can excite a drive vibration and a detection vibration in the same plane, and can arrange both of the vibrations in the same direction. Therefore, even in case of forming a vibrator of the invention out of a single crystal of quartz, $LiNbO_3$, $LiTaO_3$ or the like, if a frequency difference between the resonance frequency of a drive vibration and the resonance frequency of a detection vibration is adjusted to a certain frequency difference at which the detection sensitivity becomes the best, the relation between them is kept and is not influenced by anisotropy of the single crystal even when temperature varies. Therefore, a good detection sensitivity, a small detection noise, and a high thermal stability which are features of a single crystal known from the past can be displayed to the maximum.

A third embodiment of the invention is described in the following.

In an example shown in FIG. 28, a vibrator is provided with a fixing piece part 115 both ends of which are fixed on fixing members 114, and a main arm 121 composed of a tuning-fork vibrator 118 formed by joining a pair of tuning-fork vibration pieces 119a and 119b with bending-vibration pieces 241a and 241b in a specified plane and a base part 3 for fixing this tuning-fork vibrator on the fixing piece part 115 in a plane. And the vibrator is provided with a resonant piece 123 provided on the fixing piece part at a position which corresponds to and is opposite to the base part 3. In this example, as the resonant piece 123, a resonant piece which has the same shape and the same composition as the main arm 121 is provided on the fixing piece part at a position line-symmetrical to the main arm in relation to the fixing piece part. In this case, a vibration frequency of the main arm and the resonance frequency of the resonant piece can be made equal to each other. Hereupon, 122 is a joint at the resonant piece side, 120a and 120b represent driving electrodes, 117 represents a detecting electrode, and they are necessary for forming the whole vibratory gyroscope out of a single crystal.

Although the fixing piece part, the main arm, and the resonant piece can be formed out of separate members, it is preferable to form them in one body from a viewpoint of ease of manufacture or the like in case of forming them out of a single crystal in particular. Although a material for them is not limited in particular, as described above, it is preferable to use a single crystal of quartz, $LiNbO_3$, $LiTaO_3$, or $Li(Nb, Ta)O_3$.

In a vibrator of the invention having the above-mentioned construction, when forces F1 and F2 different in direction from each other act on both ends of the bending-vibration pieces of the tuning-fork vibrator 118 in parallel with the tuning-fork vibration pieces 119a and 119b, namely, in the Y direction, a bending vibration B1 having a joint 116 where the base part 3 is joined with the fixing piece part 115 as a fulcrum is generated in the base part 3 in the X-Y plane. At the same time, a bending vibration B2 in the same direction with the joint 116 as a fulcrum is generated by this bending vibration B1 of the base part 3. Accordingly, a drive vibration of the vibrator is as shown in FIG. 29(a), and a bending vibration for detection of the vibrator at this time is as shown in FIG. 29(b).

The vibrator having the above-mentioned construction is used mainly as a vibratory gyroscope. A case where a vibrator is used as the first invention of a vibratory gyroscope is thought with reference to FIG. 28 in the following. First, the tuning-fork vibration pieces are vibrated completely reverse in phase to each other in the X-Y plane by means of drive electrodes 120a and 120b as an exciting means in a turning system having the Z axis as the central axis. When a turning angular rateω acts around the Z axis in this state, a Coriolis force makes forces F1 and F2 along the Y axis in reverse directions to each other act on the tuning-fork vibration pieces. As the result, moments M1 and M2 in the same direction act on both ends of the bending-vibration pieces of the tuning-fork vibrator 118. Thanks to these moments M1 and M2, a bending vibration B1 in the X-Y plane is generated in the base part 3 of the main arm, and a bending vibration B2 in the X-Y plane is generated also in the resonant piece 123. A turning angular rate ω can be measured by detecting this bending vibration B2 by means of a detecting electrode 117 as a bending-vibration detecting means provided on the resonant piece.

As described above, since a vibratory gyroscope of the invention converts a Coriolis force generated in the same X-Y plane as the tuning-fork vibration pieces into a bending vibration of the base part 3 and the resonant piece 123 and obtains a turning angular rate from the bending vibration, it can detect a turning angular rate even when the vibrator is disposed perpendicularly to the axis of turning (horizontally disposed). Accordingly, even in case of mounting the vibratory gyroscope of the invention as an angular-speed sensor for the purpose of obtaining a turning angular rate of a car body for example, it can be shortened in height for the mounting part. And in this examle, since the vibratory gyroscope is provided with the main arm and the resonant piece at positions symmetrical to each other in relation to the fixing piece part 115, a driving means provided on the main arm and a detecting means provided on the resonant piece can be made distant from each other, and a bad influence such as an electro-mechanical coupling or the like can be prevented.

FIGS. 30 to 33 show the construction of other examples of the invention. In FIGS. 30 to 33, the same symbols are given to the same members as the members shown in FIG. 28 and description of them is omitted. In the example shown in FIG. 30, a resonant piece 123 is composed of a rectangular resonant piece 124 extending from and perpendicularly to a fixing piece part 115. In this case, the vibrator can be simplified in construction. In the example shown in FIG. 31, the resonant piece shown in FIG. 30 is shortened and an expanded part 126 is provided at the top end of a resonant piece 125. Thanks to this, this example can make the resonant piece lower in projection height from a fixing piece part and can make the vibrator more compact, and moreover can make the resonance frequency of the resonant piece closer to a vibration frequency of the main arm in comparison with the example shown in FIG. 30. Differently from the example shown in FIG. 28, in an example shown in FIG. 32 a pair of tuning-fork vibration pieces 119a and 119b is projected in the same direction as the base part 3 from the bending-vibration pieces 241a and 241b. Thanks to this, the gyroscope can be made more compact in comparison with the example shown in FIG. 28.

An example shown in FIG. 33 forms the second invention of a vibratory gyroscope of the invention. That is to say, although the vibratory gyroscope using the vibrator of the invention shown in FIG. 28 vibrates the tuning-fork vibrator 118 in the X-Y plane and obtains a turning angular rate from the bending vibration of the resonant piece 9 in that state, this example replaces vibration and measurement with each other in composition. In the example shown in FIG. 33, in a state where a bending vibration B1 is generated in a base part 3 by a drive electrode 250 as an exciting means and a bending vibration B2 is generated in a base part 125 of a resonant piece 123, a Coriolis force generated on the basis of a turning angular rate makes forces F1 and F2 along the Y axis in the same direction act on the tuning-fork vibration pieces 127a and 127b. As the result, moments M1 and M2 in different directions from each other act on both ends of the tuning-fork vibrator 128. A turning angular rate can be measured by using detecting electrodes 117a and 117b as a vibration detecting means for detecting vibration in the X-Y plane generated in the tuning-fork vibrator 128 by these moments M1 and M2 and generating a signal according to the detected vibration. It is a matter of course that a turning angular rate can be also measured by means of only one of the detecting electrodes 117a and 117b. In this example, 126 represents a joint.

In variation examples shown in FIGS. 30 to 33, on the assumption that the whole of a vibrator is formed out of a single crystal of quartz, $LiNbO_3$ or $LiTaO_3$, although a driving electrode is provided as an exciting means and a detecting electrode is provided as a bending-vibration detecting means, in case of forming a vibrator out of another material used for a vibratory gyroscope up to now, a piezoelectric material of piezoceramic or the like can be preferably used as an exciting means, a bending-vibration detecting means and a vibration detecting means in the same way as used from the past.

FIG. 34 shows the construction of a further other example of a vibrator of the invention. In the example shown in FIG. 34, the same symbols are given to the same members as the members shown in FIG. 28, and description of them is omitted. The example shown in FIG. 34 is different from the example shown in FIG. 28 in that projections 127a and 127b, respectively, extending outer than the tuning-fork vibration pieces 119a and 119b are provided at both ends of the bending-vibration pieces 241a and 241b forming the tuning-fork vibrator 118. In the example shown in FIG. 34, relation between the resonance frequency of vibration in the X-Y plane of the tuning-fork vibrator and the resonace frequency of a bending vibration of a base part and a resonant piece can be simply adjusted to a specified relation by reducing at least one of the projections in projection height.

Hereupon, when the resonance frequency of the tuning-fork vibrator and the resonance frequency of the base part and the resonant piece become close to each other, the sensitivity becomes good but the response speed is deteriorated, and when both of them become distant from each other, the response speed becomes good but the sensitivity is deteriorated. Therefore, relation between the resonance frequency of vibration of the tuning-fork vibrator and the resonance frequency of a bending vibration of the base part and the resonant piece is adjusted to a specified relation in which both of the sensitivity and the response speed become good to some degree.

A fourth embodiment of the invention is described in the following.

FIGS. 35 to 38 illustrate mainly the shapes of vibrators of vibratory gyroscopes of the invention.

FIG. 35 is a perspective view showing a vibrator 98 of this embodiment. Since this is almost the same as the vibrator 98 shown in FIG. 26 in this specification, description of the duplicated parts is omitted and the above-mentioned description is quoted. In FIG. 35, 111a and 111b represent projections.

FIG. 36 is a front view showing another vibrator 101E, and since this is almost the same as the vibrator shown in FIG. 11 in this specification, description of the duplicated parts is omitted and the above-mentioned description is quoted.

A vibrator as described above can be applied to a vibrator called a H-shaped vibrator. For example, a vibrator provided with a fixing piece part both ends of which are fixed, a base part provided at one side of the fixing piece part, at least one bending-vibration piece extending from the base part in a direction crossing the longitudinal direction of the base part, and a resonant piece provided at the other side of the fixing piece part, wherein the fixing piece part, the base part, the bending-vibration piece, and the resonant piece are formed so as to extend substantially in a specified plane can be manufactured.

FIG. 37 is a front view showing a vibrator 10 of this embodiment. Since this is almost the same as the vibrator shown in FIG. 6 in this specification, description of the duplicated parts is omitted.

FIG. 38 is a front view showing a three-forked tuning-fork vibrator 131. The vibrator 131 is provided with a base part 135 to be fixed on an external fixing member and three vibration pieces 132, 133 and 134 of a three-forked type projecting from the base part. The vibration pieces 132 and 134 at both sides comprise main body parts 132a and 134a projecting long and slenderly from the base part 135, and weight parts 132b and 134b respectively extending from and perpendicularly to the main body parts. Detecting electrodes 136 and 137 are formed, respectively, on the vibration pieces 132 and 134. A pair of driving electrodes 138A and 138B are formed on the middle vibration piece 133.

In any of the examples shown in FIGS. 35 to 38, since a vibratory gyroscope can be formed in a state where a vibrator is horizontally disposed, it is possible to shorten the gyroscope in height. And since a specified single crystal is used as a vibrator so that the vibrator can be made by means of etching, grinding or the like, the vibrator can be simply manufactured and the gyroscope can be produced at a low cost. Moreover, as shown in FIG. 37, in case of providing a vibration piece and a resonant piece on a fixing piece part symmetrically to each other in relation to the fixing piece part, since a driving means provided on the vibration piece and a detecting means provided on the resonant piece can be made distant from each other, it is possible to prevent a bad influence caused by an electromechanical coupling or the like between both of them.

A method for detecting a turning angular rate in a vibratory gyroscope provided with a horizontal-arrangement vibrator composed of a piezoelectric single crystal having the above-mentioned composition is described in the following. First, in a method for detecting a turning angular rate in a former gyroscope, it is known that a leakage signal due to an unnecessary vibration which is generated by an influence of a drive signal and is caused by an insufficient machining accuracy or the like is contained in an output signal detected by a detecting means. Since when this leakage signal is large it is difficult to detect a gyroscopic signal caused by a Coriolis force in an output signal, a former method of obtaining a turning angular rate from the amplitude of an output signal has removed the influence of a leakage signal by means of taking a differential output from detecting means provided at two positions.

Such an influence of a leakage signal becomes hardly a problem in a vibratory gyroscope using a vibrator which is a vertical-arrangement tuning-piece vibrator as disclosed in the Japanese patent publication Tokkohei No. 4-14734 described in the prior art section, furthermore is formed out of a constant-elasticity metal, and is high in detection sensitivity. Moreover, as disclosed in the Japanese patent publication Tokkohei No. 4-14734, in case of detecting a turning angular rate on the basis of variation of a phase difference between a drive signal and detection signal, since variation of a phase difference is little influenced by a leakage signal, the leakage signal becomes hardly a problem.

In case of horizontally disposing a vibrator in the same manner as the present invention, since a gyroscopic signal caused by a Coriolis force is made small due to its composition and the detection sensitivity is low, it is thought in general that the above-mentioned method of detection by a phase difference cannot be applied as it is. As the result of studying this point in various ways, the inventors have found that a turning angular rate can be accurately detected on the basis of a phase difference between a reference signal and an output signal even in a range where a leakage signal is large and a gyroscopic signal is small, by using a piezoelectric single crystal. Additionally, the inventors have found that an output signal in a range where a leakage signal is fairly larger and a gyroscopic signal is fairly smaller than those in a range which is thought to be suitable for measurement in general is better in linearity of a phase difference to a turning angular rate and can be measured in higher accuracy.

FIG. 39 is a block diagram showing an example of a phase difference detecting means in a vibratory gyroscope of the invention. In FIG. 39, it is assumed that an electric signal used for generating a drive vibration is a reference signal and an electric signal taken out by a detecting means from a vibration which has a vibration mode different from the drive vibration and is generated with the drive vibration is an output signal.

Concretely, in the example shown in FIG. 35, an electric signal supplied to an unillustrated driving electrode provided on the tuning-fork vibration piece 109a or 109b is a reference signal, and an electric signal detected by an unillustrated detecting electrode provided on the base part is an output signal. And in the example shown in FIG. 36, an electric signal supplied to the exciting means 5A and 5B is a reference signal, and an electric signal detected by the detecting means 6A, 6B, 6C and 6D is an output signal. Furthermore, in the examle shown in FIG. 37, an electric signal supplied to the exciting means 5A and 5B is a reference signal, and an electric signal detected by the detecting means 6A, 6B, 6C and 6D is an output signal. Still further, in the example shown in FIG. 38, an electric signal supplied to the electrodes 136 and 137 is a reference signal, and an electric signal detected by the electrodes 138A and 138B is an output signal.

Although in the above-mentioned examples an electric signal used for generating a drive vibration is used as a reference signal, an electric signal obtained by resonating the drive vibration itself can be used as a reference signal.

In a phase detecting means 139 shown in FIG. 39, an output signal is amplified by an alternating-current amplifier 140 and then is supplied to a phase different detecting circuit 141. A reference signal is preprocessed for waveform-shaping or the like by a reference signal preprocessing circuit 142, and then is supplied to a phase different detecting circuit 141 in the same way. The phase difference detecting circuit 141 detects a phase difference between a preprocessed reference signal and an output signal which have been supplied. The detected phase difference is supplied to a low-pass filter 143 and a direct-current amplifier 144 to be a direct-current signal according to the phase difference. A direct-current signal obtained by the above-mentioned phase difference detecting means 139 is supplied to a turning angular rate detecting circuit 145. The turning angular rate detecting circuit obtains a turning angular rate on the basis of a predetermined relation between the magnitude of a direct current and a turning angular rate. Since the above-mentioned circuit cannot directly obtain a phase difference between an output signal and a reference signal as a numerical value, it obtains a turning angular rate from the magnitude of a direct-current signal according to a phase difference, but it is possible also to directly obtain a phase difference as a numerical value and then obtain a turning angular rate on the basis of a predetermined relation between a phase difference and a turning angular rate.

Relation between a leakage signal and a gyroscopic signal which form an output signal is described in the following. The inventors have obtained a phase difference between a reference signal and an output signal and examined the relationship between a variation of the obtained phase difference and a turning angular rate in a vibratory gyroscope having a vibrator which has the construction shown in FIG. 38 and is composed of a single crystal of LiTaO₃. The result is shown in FIGS. 40 to 42. FIG. 40 shows the relation in case that the ratio of a gyroscopic signal to a leakage signal is 1:100 at a turning angular rate of 100°/second, FIG. 41 shows the relation in case that the ratio of a gyroscopic signal to a leakage signal is 1:7 at a turning angular rate of 100°/second, and FIG. 42 shows the relation in case that the ratio of a gyroscopic signal to a leakage signal is 5:1 at a turning angular rate of 100°/second. Hereupon, the ratio of the amplitude of a signal which is excited by a Coriolis force and is outputted at the time of turning at a turning angular rate of 100°/second in an output signal to the amplitude of a signal which is outputted at the time of turning at a turning angular rate of zero in an output signal is referred to as the ratio of a gyroscopic signal to a leakage signal at a turning angular rate of 100°/second. A vector diagram shown in each of the figures shows the relationship among an output signal, a gyroscopic signal and a leakage signal under each condition in case of taking a phase angle in a turning direction with the origin of a vector as the center, and taking the magnitude of a signal in a radial direction. And each of the figures shows a case where a leakage signal and a reference signal are the same in phase, and represents a phase difference between a leakage signal and a output signal as a phase difference between a reference signal and an output signal. Hereupon, in case that there is a certain phase difference between a leakage signal and a reference signal, variation of a phase difference is as illustrated.

From the result shown in FIG. 40, it has been found that in a vibratory gyroscope using a horizontal-arrangement vibrator also, in case of using a piezoelectric single crystal, it is possible to detect a minute phase difference of such a low level as shown in FIG. 40 and obtain a high linearity between a phase difference and a turning angular rate in such a case. From the result shown in FIG. 41 also, it has been found that it is possible to obtain a high linearity although it is not so good as shown in FIG. 40. On the other hand, from the result shown in FIG. 42, it has been found that the linearity between a phase difference and a turning angular rate cannot be kept, the usable range is limited to a turning angular rate of ±50°/second or so, and it is difficult to detect a phase difference at a turning angular rate in a range of 70° to 100°/second. The above-mentioned results are collected as relation between the linearity of a phase difference to a turning angular rate and the ratio of a gyroscopic signal to a leakage signal in FIG. 43.

Since it is generally thought to need a linearity of ±1%, when obtaining a range satisfying the above-mentioned conditions from the result shown in FIG. 43, it has been found that the above-mentioned relation of linearity can be obtained in a range where a leakage signal is so large that the ratio of a gyroscopic signal to a leakage signal is 1:7 or more. However, too large a leakage signal exceeds the detection limit of a vibrator even if it uses a piezoelectric single crystal. Therefore, the upper limit of a leakage signal is determined according to the sensitivity of a vibratory gyroscope.

In the present invention, as described above, in a range where the ratio of a leakage signal to a gyroscopic signal is larger than a specified ratio at a specified turning angular rate, the detection sensitivity is low but the linearity of a phase difference to a turning angular rate is good, and it is possible to improve the signal-to-noise ratio in relation to noises caused by external factors in comparison with the prior art by forming a horizontal-arrangement vibrator out of a piezoelectric single crystal good in mechanical quality. Since the invention can cope with a large leakage signal and does not need a manufacturing apparatus of high machining accuracy for manufacturing a vibrator, the invention can greatly reduce the manufacturing cost and can dispense with an adjusting process by reprocessing performed according to circumstances up to now. And the invention dispenses with a circuit and the like for removing a leakage signal provided according to circumstances up to now.

A fifth embodiment of the invention is described in the following.

The inventors made a vibrator 147 shown in FIG. 44, and performed an experiment of detecting a turning angular rate using the vibrator. Hereupon, the vibrator is formed out of a piezoelectric single crystal, and is provided with a fixing part 2 fixed on an external construction and a pair of long and narrow tuning-fork vibration arms 148A and 148B projecting from the fixing part 2. A gap 149 is formed between the pair of vibration arms. In a coordinate system shown in FIG. 44, main faces 150A and 150B of the vibrator are directed to the Y-axis direction, and side faces 151A and 151B are directed to the X-axis direction.

The vibration arms of the vibrator are vibrated in the X direction as shown by arrows C and D. When the vibrator is turned around the Z axis as shown by ω in this state, the vibration arms are respectively vibrated in the Y-axis direction as shown by arrows A and B. A turning angular rate is computed by detecting this vibration. Theoretically, it is possible to first vibrate the vibration arms as shown in arrows A and B, turn the vibrator around the Z axis in this state, vibrate the vibration arms as shown by arrow C and D, and detect this vibration.

In such a vibrator 147, the vibration arms 148A and B need to be vibrated in the Y-axis direction, or vibrations of the vibration arms in the Y-axis direction need to be converted to electric signals. As for such an exciting method, a method shown in FIG. 45 is disclosed in "Three-Forked Tuning-Fork Resonator Aiming at a Horizontal-Arrangement Vibratory Gyroscope Sensor" in pp. 1071 to 1072 of "Japan Society of Acoustics Engineers '96 Spring Convention Proceedings II issued in March 1996 by Japan Society of Acoustics Engineers". FIG. 45(a) is a plan view of the vibration arm 148A or 148B, and FIG. 45(b) is a front view of it.

Electrodes 152A and 152B are formed, respectively, on the main faces 150A and 150B of each vibration arm, and electrodes 153A and 153B are also formed, respectively, on the side faces 151A and 151B. The direction of polarization of a piezoelectric single crystal forming the vibration arms is assumed as a direction shown by arrow E. It is assumed that the opposite electrodes 152A and 152B are the same in phase, and the opposite electrodes 153A and 153B are the same in phase. At a certain moment the opposite electrodes 152A and 152B become negative, and the opposite electrodes 153A and 153B become positive.

At this time, in the upper half part of the vibration arm in FIG. 45(a), an electric field is generated slantly upward as shown by arrows F and G. A component of this electric field in the Y-axis direction is in the +Y direction, which coincides with the direction of polarization E of the piezoelectric single crystal. Therefore, the vibration arm is contracted as shown by aoK in FIG. 45(b).

On the other hand, in the lower half part of the vibration arm in FIG. 45(a), an electric field is generated slantly downward as shown by arrow H and I. A component of this electric field in the Y-axis direction is in the −Y direction, which is reverse to the direction of polarization E of the piezoelectric single crystal. Therefore, the vibration arm is extended as shown by arrow J in FIG. 45(b). As the result, the vibration arm is bent as shown arrow A(B).

As a result of a detailed examination of the vibrator performed by the inventors, the following problem has been found. That is to say, although it is preferable to make larger the magnitude of displacement in a bending vibration generated by an applied voltage, it has been found that this has a limit. And displacements of bending vibrations in the respective parts inside the vibration arm are uniform in magnitude, and internal strain or internal stress is generated inside the vibration arm at the time of vibration. Due to this, the magnitude of an applied voltage and the magnitude of displacement of a bending vibration of the vibration arm do not have necessarily a linear relation, and the vibrators have large variations in production with regard to the relation between the magnitude of an applied voltage and the magnitude of displacement of a bending vibration of the vibration arm.

This is thought to be caused by ununiformity in the internal electric field of the vibration arm in FIG. 45(a). For example, an electric field is applied as shown in arrow F or H in a domain 154 close to a corner, and in these domains, the electrodes 153A and 153B and the electrodes 152A and 152B are, respectively, close to each other, and so a strong electric field is applied to the piezoelectric single crystal at each of these domains. On the other hand, an electric field is applied as shown in arrow G or I in a domain 155 distant from a corner, and an applied electric field is weak in such a domain 155 distant from a corner. In this way, it is thought that an electric field greatly varies with the position in the piezoelectric single crystal forming a vibrator and this variation appears as internal stress and internal strain.

FIG. 46 is a perspective view showing a vibratory gyroscope of an embodiment of the invention, FIG. 47(a) is a plan view of a plane-normal vibration arm 158A in FIG. 46, FIG. 47(b) is a front view of the plane-normal vibration arm 158A taken in the direction of the X axis, and FIG. 48 is a schematic view for explaining operation of a plane-parallel vibration 154.

A vibrator 156 is provided with a fixing part 157 fixed on an external fixing member, and a pair of tuning-fork vibration arms 154 and 158A (158B or 158C) projecting from the fixing part. The whole vibrator is composed of a joined member obtained by joining two plate-shaped members 159A and 159B to each other. The direction of polarization (shown by arrow 165) of the plate-shaped member 159A and the direction of polarization (shown by arrow 166) of the plate-shaped member 159B are exactly opposite to each other, and are perpendicular to one main face 161A and the other main face 161B.

One electrode 163A and the other electrode 163B are respectively formed on the main faces of the plane-normal vibration arm 158A. No electrode is formed on the respective side faces 162A and 162B of the vibration arm 158A. And electrodes 155A and 155B are formed on one main face 161A of the plane-parallel vibration arm 154, and electrodes 155C and 155D are formed on the other main face 161B of it, and no electrode is formed on the respective side faces of the vibration arm 154. A gap 160 is provided between the vibration arms 154 and 158A.

In a coordinate system shown in FIG. 46, the main faces of the vibrator are directed to the Y-axis direction, and the side faces are directed to the X-axis direction.

The plane-normal vibration arm 158A is vibrated by applying an alternating voltage to a pair of electrodes 163A and 163B. In this case, at a certain moment one electrode 163A becomes positive and the other electrode 163B becomes negative as shown in FIG. 47(a). At this moment a voltage is applied from the electrode 163A to the electrode 163B.

At this time the direction of an electric field and the direction of polarization 165 become exactly opposite to each other inside the plate-shaped member 159A. As the result, the plate-shaped member 159A is expanded as shown by arrow J as shown in FIG. 47(b). On the other hand, the direction of an electric field and the direction of polarization 166 become the same as each other inside the plate-shaped member 159B. As the result, the plate-shaped member 159B is contracted as shown by arrow K as shown in FIG. 47(b). By this, the whole vibration arm can be bending-vibrated as shown by arrow B. At this time the plane-parallel vibration arm 154 is resonated as shown by arrow A by setting the resonance frequencies of the vibration arms as a specified value.

When the vibrator is turned around the Z axis as shown by ω in this state, the vibration arms 154 and 158A are respectively vibrated in the X-axis direction as shown by arrows C and D. A turning angular rate is computed by detecting a plane-parallel vibration as shown by arrow C by means of the plane-parallel vibration arm 154.

Concretely, as shown in FIG. 48, the electrodes 155A and 155C are connected to a voltage detecting apparatus 168, and the electrodes 155B and 155C are grounded. When a bending vibration as shown by arrow C is applied to the plane-parallel vibration arm 154 in this state, an electric field as shown by arrow 167 is excited, and according to this, electromotive forces are generated, respectively, between the electrodes 155A and 155B, and between the electrodes 155C and 155D. This voltage signal is detected and a turning angular rate is detected from this value.

The plane-normal vibration arm 154 of the vibration can be vibrated in the X direction as shown by arrow C. In order to do so, the electrodes 155A and 155C are connected to a specified alternating-current power source, and an electric field 167 is applied between the electrodes 155A and 155B, and between the electrodes 155C and 155D. In this case, in FIG. 48 the direction of an electric field and the direction of polarization become reverse to each other in domains close to the electrodes 155A and 155C in the plane-parallel vibration arm 154, while the direction of an electric field and the direction of polarization become nearly equal to each other in domains close to the electrodes 155B and 155D. Thanks to this, the plane-parallel vibration arm is vibrated as shown by arrow C. On the other hand, the plane-normal vibration arm is resonated as shown by arrow D.

When the vibrator is turned around the Z axis as shown by ω in this state, the vibration arms 154 and 158A are respectively vibrated in the Y-axis direction as shown by arrows A and B. An electromotive force is generated between the electrodes 163A and 163B by this vibration of the vibration arm 158A. At this time the electrodes 163A and 163B are connected to a specified voltage detecting apparatus 168. A turning angular rate is computed by measuring this voltage.

FIGS. 49(a) and 50(a) are, respectively, plan views of vibration arms of vibrators of other embodiment of the invention, and FIGS. 49(b) and 50(b) are, respectively, front views of the vibration arms of FIGS. 49(a) and 50(a) taken in the direction of the X axis. The same symbols are given to the same components as the components shown in FIGS. 47(a) and 47(b), and description of them is omitted.

In FIGS. 49(a) and 49(b), the vibration arm 158B is composed of a joined member obtained by joining a pair of plate-shaped members 169A and 169B to each other. The direction of polarization (shown by arrow 180) of the plate-shaped member 169A and the direction of polarization (shown by arrow 181) of the plate-shaped member 169B are exactly opposite to each other, and are perpendicular to one main face 161A and the other main face 161B.

An alternating voltage is applied to a pair of electrodes. In this case, at a certain moment one electrode 163A becomes negative and the other electrode 163B becomes positive as shown in FIG. 49(a). At this moment a voltage is applied from the electrode 163B to the electrode 163A.

At this time the direction of an electric field and the direction of polarization become exactly opposite to each other inside the plate-shaped member 169A. As the result, the plate-shaped member 169A is expanded as shown by arrow J as shown in FIG. 49(b). On the other hand, the direction of an electric field and the direction of polarization become equal to each other inside the plate-shaped member 169B. As the result, the plate-shaped member 169B is contracted as shown by arrow K as shown in FIG. 49(b). Thanks to this, the whole vibration arm 158B is bending-vibrated as shown by arrows A and B.

In FIGS. 50(a) and 50(b), the vibration arm 158C is composed of a joined member obtained by joining a pair of plate-shaped members 251A and 251B to each other. The direction of polarization (shown by arrow 165) of the plate-shaped member 251A is perpendicular to the main faces. The direction of polarization (shown by arrow 172) of the plate-shaped member 251B is in parallel with the main faces. In such a case also, the vibration arm of the invention can be moved perpendicularly to the main faces.

That is to say, an alternating voltage is applied to a pair of electrodes. In this case, at a certain moment one electrode 163A becomes positive and the other electrode 163B becomes negative as shown in FIG. 50(a). At this moment a voltage is applied from the electrode 163A to the electrode 163B.

At this time the direction of an electric field and the direction of polarization become exactly opposite to each other inside the plate-shaped member 251A. As the result, the plate-shaped member 251A is expanded as shown by arrow J as shown in FIG. 50(b). On the other hand, contraction and expansion in such a direction are a little inside the plate-shaped member 251B. However, the whole vibration arm 158C is bending-vibrated as shown by arrows A and B due to expansion and contraction of the plate-shaped member 251A.

FIGS. 51 to 53 are, respectively, perspective views showing three-forked tuning-fork vibrators of vibratory gyroscopes of the invention. In FIGS. 51 to 53, description of the composition already described in FIG. 47 is omitted.

A vibrator 170 of a vibratory gyroscope shown in FIG. 51 is provided with a fixing part 157 fixed on an external fixing member, and three tuning-fork vibration arms 171A, 172 and 171B projecting from the fixing part. The whole vibrator is composed of a joined member obtained by joining two plate-shaped members 159A and 159B to each other. The direction of polarization of the plate-shaped member 159A and the direction of polarization of the plate-shaped member 159B are exactly opposite to each other, and are perpendicular to the main faces 161A and 161B.

One electrode 163A is formed on one main face 161A of each of the plane-normal vibration arms 171A and 171B, and the other electrode 163B is formed on the other main face 161B (163B is not illustrated; see FIG. 47).In the plane-parallel vibration arm 172, the above-mentioned electrodes 155A and 155B are formed on one main face, and the opposite electrodes 155C and 155D are formed on the other main face (155C and 155D are not illustrated; see FIG. 48).

Gaps 160 are formed, respectively, between the vibration arms 171A and 172 and between the vibration arms 172 and 171B. In each of coordinate systems shown in FIGS. 51 to 53, the main face of the vibrator is directed to the Y-axis direction, and the side face is directed to the X-axis direction.

In FIG. 51, for example, the middle plane-parallel vibration arm 172 is excited as shown by arrow Q, and the vibration arms 171A and 171B at both sides are resonated, respectively, as shown by arrows P and R. When the vibrator 170 is turned around the Z axis as shown by arrow ω, the vibration arms 171A and 171B are vibrated in the Y-axis direction, respectively, as shown by arrows S and U. At the same time, the middle vibration arm 172 is vibrated in the Y-axis direction as shown by arrow T. According to the invention, these vibrations of the vibration arms 171A and 171B generate electromotive forces among the electrodes. A turning angular rate is detected by measuring this voltage.

A vibrator 173 shown in FIG. 52 is provided with plane-parallel vibration arms 172A and 172B at both sides and a plane-normal vibration arm 171 in the middle. The plane-parallel vibration arms at both sides are, respectively, driven in the X-axis direction as shown by arrows P and R, and the middle plane-normal vibration arm is resonated as shown by arrow Q. After this, the operation is the same as the case of FIG. 51.

And according to the invention, it is possible to drive the middle plane-normal vibration arm as shown by arrow T and resonate the plane-parallel vibration arms at both sides, respectively, as shown by arrows S and U. When the vibrator is turned around the Z axis as shown by ω in this state, the vibration arms 172A and 172B are vibrated in the X-axis direction as shown by arrows P and R. At the same time as this, the plane-normal vibration arm 171 is vibrated in the X-axis direction as shown by arrow Q. The plane-parallel vibrations of the vibration arms 172A and 172B generate electromotive forces between the electrodes 155A and 155B, and between the electrodes 155C and 155D. A turning angular rate is detected by measuring this voltage.

In a three-forked tuning-fork vibrator 174 of a vibratory gyroscope shown in FIG. 53, a plane-parallel vibration arm 172 is provided at one end part and a plane-normal vibration arm 171 is provide at the other end part. The plane-parallel vibration arm 172 is driven as shown by arrow N, and the plane-normal vibration arm 171 is resonated as shown by arrow V. When the vibrator 174 is turned around the Z axis as shown by arrow ω in this state, the vibration arms 172 and 171 are vibrated in the opposite directions as shown by arrows W and Ω. According to the invention, an electromotive force is generated between the electrodes by vibration of the vibration arm 171. A turning angular rate is detected by measuring this voltage. The middle arm 175 is not vibrated.

And according to the invention, it is possible to drive the plane-normal vibration arm 171 as shown by arrow W and resonate the plane-parallel vibration arm 172 as shown by arrow Ω. When the vibrator is turned around the Z axis as shown by ω in this state, the vibration arms 171 and 172 are vibrated in the X-axis direction as shown by arrows V and N. Hereupon, a turning angular rate is detected by measuring a voltage generated by vibration of the plane-parallel vibration arm 172.

Next, a preferred method for manufacturing a vibrator or a vibration arm of the invention is described. In a preferred embodiment of the invention, plural plate-shaped members each of which is composed of a piezoelectric single crystal are prepared. In this case, the respective plate-shaped members are made different from one another in direction of the axis of polarization. A base member provided with plural plate-shaped members which are different from one another in direction of the axis of polarization is manufactured by joining these plate-shaped members with one another. Then a vibrator is formed by cutting this base member.

The plural plate-shaped members can be adhered to one another by adhesives. And a laminated member is obtained by laminating the plural plate-shaped members and then the laminated member can be internally adhered by a heat treatment. It can be thought also to form plural domains which are different from one another in direction of the axis of polarization inside a single plate-shaped member by heat-treating the single plate-shaped member.

According to the above-mentioned manufacturing method, a vibrator capable of performing a bending vibration in directions crossing the main faces of the vibrator can be manufactured by forming electrodes on one main face and the other main face of the vibrator. That is to say, electrodes for making the vibrator perform a bending vibration do not have to be formed on the side faces of the vibrator, concretely, on the cut-off faces. Accordingly, it is possible to dispense with a process of forming the electrodes on the side faces of the vibrator, and thanks to this, the manufacturing cost can be remarkably reduced and variations in performance generated in production can be also reduced.

In the above-mentioned manufacturing method, it is particularly preferable to form electrodes having a specified plane shape on one main face and the other main face of a base member and then form a vibrator by cutting the base member. By doing so, electrodes for plural vibrators can be formed by one electrode forming process.

FIGS. 54(a), 54(b) and 54(c) are perspective views showing base members 185A, 185B and 185C, respectively. The base member 185A is composed of a joined member having two plate-shaped members 159A and 159B joined with each other. The direction of polarization of the plate-shaped member 159A (shown by arrow 165) and the direction of polarization of the plate-shaped member 159B (shown by arrow 166) are exactly opposite to each other, and are perpendicular to one main face and the other main face. A direction of the axis of polarization of the plate-shaped member 159A and a direction of the axis of polarization of the plate-shaped member 159B, respectively, are directed from the central plane 167 toward the main faces. Vibrators as shown in FIGS. 46, 51, 52 and 53 can be manufactured by cutting this base member.

The base member 185B is composed of a joined member having two plate-shaped members 169A and 169B joined with each other. A direction of polarization of the plate-shaped member 169A (shown by arrow 180) and a direction of polarization of the plate-shaped member 169B (shown by arrow 181) are exactly opposite to each other, and are perpendicular to one main face and the other main face. A direction of the axis of polarization of the plate-shaped members are directed from the respective main faces toward the central plane. A vibrator as shown in FIG. 49 can be manufactured by cutting this base member.

The base member 185C is composed of a joined member having two plate-shaped members 186A and 186B joined with each other. A direction of polarization of the plate-shaped member 186A (shown by arrow 182) and a direction of polarization of the plate-shaped member 186B (shown by arrow 183) are exactly opposite to each other, and are inclined at a specified slant angle to one main face and the other main face.

FIGS. 55 to 57 illustrate a vibrator and a vibratory gyroscope which are preferable in case that the axis of polarization of each of the plate-shaped members is oriented at a slant angle to the main faces as shown in FIG. 54(c). FIG. 55 is a perspective view showing a vibrator 187 and its electrodes of a vibratory gyroscope of this embodiment, FIG. 56 is a plan view showing a plane-normal vibration arm, and FIG. 57 is a plan view showing a plane-parallel vibration arm.

The vibrator 187 shown in FIG. 55 is provided with a fixing part 157 fixed on an external fixing member, and three tuning-fork vibration arms 188A, 189 and 188B. The whole vibrator is composed of a joined member having two plate-shaped members 186A and 186B joined with each other.

One electrode 190A is formed on one main face of each of the plane-normal vibration arms 188A and 188B, and the other electrode 190B is formed on the other main face. In the plane-parallel vibration arm 189, three electrodes 191A, 191B and 191C are formed on one main face, and the opposite electrodes 191D, 191E and 191F are formed on the other main face at positions, respectively, opposite to the electrodes 191A, 191B and 191C. Gaps 160 are provided, respectively, between the vibration arms 188A and 189, and between the vibration arms 189 and 188B.

For example, the middle plane-parallel vibration arm is driven as shown by arrow Q, and the vibration arms at both sides are resonated as shown by arrows P and R. In order to do so, for example, the electrodes 191A, 191C and 191E of the plane-parallel vibration arm are grounded, and the electrodes 191B, 191D and 191F opposite to them are connected to an alternating-current power source 192. In this state, electric fields are generated from the electrode 191B toward the electrodes 191A and 191C as shown by arrows 198 in one layered part 186A, and electric fields are generated from the electrodes 191D and 191F toward the electrode 191E as shown by arrows 197 in the other layered part 186B. That is to say, it is necessary to make electric fields generated in one layered part and electric fields generated in the other layered part reverse in direction to each other.

When the vibrator is turned around the Z axis as shown by ω in this state, the vibration arms 188A and 188B, respectively, are vibrated in the Y-axis direction as shown by arrows S and U. At the same time, the middle vibration arm is vibrated in the Y-axis direction as shown by arrow T. According to the invention, electromotive forces are generated among the electrodes by vibration of the plane-normal vibration arm. A turning angular rate is detected by measuring this voltage.

As shown in FIGS. 58 and 59, vibration arms 198A, 198B and 202 can be also manufactured by joining plate-shaped members 200A and 200B with each other. In this example, directions 194 and 199 of polarization of the plate-shaped members are inclined at a specified angle to the main faces, and the directions 194 and 199 are nearly equal to each other in plane-parallel direction component but are opposite to each other in plane-normal direction component. One electrode 190A is formed on one main face of each of the plane-normal vibration arms 198A and 198B, and the other electrode 190B is formed on the other main face. In the plane-parallel vibration arm 202, as shown in FIG. 59, three electrodes 191A, 191B and 191C are formed on one main face, and the opposite electrodes 191D, 191E and 191F are formed on the other main face at positions, respectively, opposite to the electrodes 191A, 191B and 191C.

For example, the middle plane-parallel vibration arm 202 is driven as shown by arrow Q, and the vibration arms 198A and 198B at both sides are resonated as shown by arrows P and R. In order to do so, for examle, the electrodes 191A, 191C, 191D and 191F of the plane-parallel vibration arm are grounded, and the electrodes 191B and 191E are connected to an alternating-current power source 192. In this state, for example, electric fields are generated from the electrodes 191A and 191C toward the electrode 191B as shown by arrows 201 in one layered part 200A, and electric fields are generated from the electrodes 191D and 191F toward the electrode 191E as shown by arrows 197 in the other layered part 200B. That is to say, the electric fields generated in one layered part and the electric fields generated in the other layered part are made reverse in direction to each other. In the same way after this, a turning angular rate is detected.

Concrete experiment results are described in the following. The above-mentioned vibratory gyroscopes as shown in FIGS. 46 to 48 were made. A Z plate of quartz crystal was used as each plate-shaped member. A two-layered electrode of Cr and Au was used as a material for an electrode. An alternating electric field of 1 volt and 7.5 Hz in frequency was applied between the electrodes 163A and 163B, and a vibrator was turned, and then a relation between a turning angular rate and an output voltage from the electrodes 155A, 155B, 155C and 155D was measured. The result is shown in Table 1. A good linearity was found between an output voltage and a turning angular rate.

TABLE 1

| Turning angular rate: (°/sec) | −40 | −30 | −20 | −10 | 0 |
|---|---|---|---|---|---|
| Output voltage: (mV) | −5.01 | −3.76 | −2.52 | −1.30 | 0.10 |
| Turning angular rate: (°/sec) | 10 | 20 | 30 | 40 | |
| Output voltage: (mV) | 1.26 | 2.51 | 3.74 | 5 | |

A sixth embodiment of the invention is described in the following.

FIG. 60 shows a construction of an example of a vibrator of a vibratory gyroscope of the invention, 60(*a*) is a side view, 60(*b*) is a front view, and 60(*c*) is a plan view. This example shows a vibratory gyroscope of a vertical-arrangement type in which a drive vibration and a detection vibration are vertical. In an example shown in FIGS. 60(*a*) to 60(*c*), a tuning-fork vibrator 205 forming the vibratory gyroscope is composed of three arms 206, 207 and 208 arranged nearly in parallel with one another, and a base part 209 joining these three arms. Among the three arms the arms 206 and 208 at both sides form detection arms, and the middle arm 207 forms a drive arm. As a material for the tuning-fork vibrator, it is preferable to use a piezoelectric material such as piezoceramic, quartz crystal, a single crystal of LiTaO$_3$, LiNbO$_3$ or the like, and particularly more preferable to use a single crystal of quartz, LiTaO$_3$, LiNbO$_3$ or the like.

The tuning-fork vibrator 205 operates in the same way as a vibrator known up to now. That is to say, the drive arm 207 is first vibrated in the X-Z plane by means of an unillustrated driving means provided on the drive arm. And the left and right detection arms 206 and 208 are resonated in the same X-Y plane. When the vibrator is turned around the axis of symmetry Z of the tuning fork at a turning angular rate ω in this state, a Coriolis force f acts on each of the detection arms. Since the detection arms are vibrating in the X-Z plane, vibration in the Y-Z plane is excited in the detection arms. A turning angular rate is measured by detecting this vibration by means of an unillustrated detecting means provided on each of the detection arms.

An important point in this invention is to fix a domain where movement of the vibrator is the least by supporting the tuning-fork vibrator at the small domain where there is locally a domain having the least detection vibration in case of supporting the above-mentioned tuning-fork vibrator to form a vibratory gyroscope. Thanks to this, a detection vibration can be effectively generated by a Coriolis force without damping, the Q value of the detection vibration can be made higher, and the sensitivity can be improved. Since the detection vibration generated by a Coriolis force is small in amplitude, this invention is particularly effective to improve the sensitivity. Concretely, in the example shown in FIGS. 60(*a*) to 60(*c*), the vibrator is supported at a domain 210 nearly in the middle part of the base part 209.

A method for supporting the vibrator is not limited in particular, and any method known up to now as a method for adhering a piezoelectric member may be used. As an example, as shown in FIGS. 61(*a*) and 61(*b*), a specified hole 213 is provided at the nearly middle domain 210 of the base part 209 in the direction of thickness, and the vibrator can be fixed on a base part 211 of the vibratory gyroscope by inserting an end part 214 projecting from an arm 212 and perpendicularly to the longitudinal direction of the arm 212 projecting from the base part 211 into the hole 213. Fixing the end part 214 and the hole 213 onto each other can be performed by applying metallization to the surface of the end part and/or the internal surface of the hole and then soldering or brazing, or by providing resin between the end part and the hole. Although the base part 209 is supported on one surface of it in the example shown in FIGS. 61(*a*) and 61(*b*), the base part can be also supported on both surfaces of it. And it is possible also to provide a through hole instead of the hole 213, pass a supporting arm through the through hole, and fix both end parts of the supporting arm onto the base part 211 of the vibratory gyroscope.

In the above-mentioned example, the reason why the nearly middle part 210 of the main face of the base part 209 is assumed to be a small domain where there is locally a domain having the smallest detection vibration is as follows. The inventors first applied a natural mode analysis by means of a finite element analysis method to a vibrator 205 having the above-mentioned shape in order to examine whether or not there is a small domain where there is locally a domain having the smallest detection vibration in relation to the vibrator 205. And the vibration amplitudes at each domain of the tuning-fork vibrator in the X-Z plane (where a drive vibration is generated) and in the Y-Z plane (where a detection vibration is generated by a Coriolis force) in case of assuming that the vibrator has been cut along the X-Z plane have been obtained as distribution of the ratio of the vibration amplitude at each domain to the vibration amplitude at the maximum vibration amplitude point. FIG. 62 shows the result in the X-Z plane where a drive vibration is generated, and FIG. 63 shows the result in the Y-Z plane where a detection vibration is generated by a Coriolis force.

In the example shown in FIGS. 62 and 63, the respective domains different in color from one another show domains each of whose colors represents the ratio of the vibration amplitude at a domain to the vibration amplitude at the maximum vibration amplitude point, and in this invention, an orange part is a small domain where there is locally a domain having the smallest vibration whose amplitude is less than one thousandth of the amplitude at the maximum vibration amplitude point. In this example, FIG. 62 shows the ratio in comparison with the maximum vibration amplitude point in a drive vibration (plane-parallel vibration), and FIG. 63 shows the ratio in comparison with the maximum vibration amplitude point in the detection vibration (plane-normal vibration), and from the result shown in FIG. 63, it has been confirmed that there is a small domain where there is locally a domain having the smallest detection vibration. And similarly to the example shown in FIG. 60, it has been founded that supporting the vibrator at the nearly middle domain 210 of the main faces at both sides of the base part 209 results in not only supporting the vibrator at a small domain where there is locally a domain having the smallest detection vibration known from FIG. 63 but also supporting the vibrator at a small domain where there is locally a domain having the smallest drive vibration known from FIG. 62, and therefore in this example, supporting the vibrator in this way results in supporting the tuning-fork vibrator at a domain where a small domain where there is locally a domain having the smallest detection vibration and a small domain where there is locally a domain having the smallest drive vibration coincide with each other.

Taking the above-mentioned result into account, a result shown in Table 2 can be obtained by measuring the Q value of a drive vibration in the X-Z plane, the Q value of a detection vibration in the Y-Z plane, and the sensitivity in relation to the example explained as a former example in FIG. 2 where the base part is fixed, the example where one axis is fixed, and the example where the vibrator is fixed as shown in FIG. 60 as the invention. From the result shown in Table 2, it has been found that both of the Q value of a drive vibration in the X-Z plane and the Q value of a detection vibration in the Y-Z plane are higher and the sensitivity also is higher in the examples of the invention in comparison with the former examples.

TABLE 2

|  | Q of drive vibration | Q of detection vibration | Sensitivity (at 1 degree/sec) |
| --- | --- | --- | --- |
| Base part fixed | 4000 | 3000 | 1.1 mV |
| One axis fixed | 7000 | 8000 | 3.4 mV |
| This embodiment | 30000 | 30000 | 10.8 mV |

Although the above-mentioned example shows an example of using three arms as a tuning-fork vibrator, it is a matter of course that the number of arms is not limited to three and the invention can be also applied to another number of arms such as four arms, five arms, or the like. Although the above-mentioned example shows an example of generating a drive vibration in the X-Z plane and a detection vibration in the Y-Z plane in FIG. 60, it is a matter of course that the invention can be also applied to a gyroscope in which the shape of a vibrator 1 is kept as it is and a relation between both vibrations is reverse, namely, a drive vibration is generated in the Y-Z plane and a detection vibration is generated in the X-Z plane.

Although the above-mentioned example explains an example of a vibratory gyroscope of a vertical-arrangement type in which a drive mode vibration and a detection mode vibration are vertical, the invention can be preferably applied to a vibratory gyroscope of a horizontal-arrangement type in which a drive mode vibration and a detection mode vibration are horizontal in the same plane. An example in which a finite element analysis was applied to a vibratory gyroscope of a horizontal-arrangement type in the same way as the above-mentioned example is described in the following.

FIG. 64 shows an example of the result of applying a natural mode analysis by means of a finite element analysis method to a detection mode vibration in a vibrator composed of a T-shaped arm and a base part. Since this vibrator was described in FIGS. 3 to 5, the description at that time is quoted. In FIG. 64 also, vibrations in the respective domains are classified by color according to the ratio of the amplitude of vibration at each domain to that at the maximum vibration amplitude point in the same way as FIGS. 62 and 63. In the example shown in FIG. 64 also, it has been confirmed that there is a small domain where there is locally a domain having the smallest detection vibration in the middle of the base part. Actually, a result shown in Table 3 can be obtained by measuring the Q value of a drive vibration, the Q value of a detection vibration in the same plane as the drive vibration, and the sensitivity in relation to the example explained in FIG. 2 where the base part is fixed and the example where the vibrator shown in FIG. 64 is supported at a small domain where there is locally a domain having the smallest detection vibration as the invention. From the result shown in Table 3, it has been found that the Q value of a drive vibration is made slightly higher and the Q value of a detection vibration is made extraordinarily higher and the sensitivity also is made higher in the example of the invention in comparison with the former examples.

TABLE 3

|  | Q of drive vibration | Q of detection vibration | Sensitivity (at 1 degree/sec) |
| --- | --- | --- | --- |
| Base part fixed | 3000 | 200 | 0.1 mV |
| Node fixed (this embodiment) | 5000 | 3000 | 1.1 mV |

FIG. 65 shows an example of the result of applying a natural mode analysis by means of a finite element analysis method to a detection mode vibration in a vibrator composed of a Y-shaped arm and a base part. Since this vibrator was described in FIGS. 24, 25 and 27, the description at that time is quoted. In FIG. 65 also, in the same way as the example shown in FIG. 64, it has been confirmed that there is a small domain where there is locally a domain having the smallest detection vibration in the middle of the base part. By actually measuring the Q value of a drive vibration, the Q value of a detection vibration in the same plane as the drive vibration, and the sensitivity in relation to the example explained in FIG. 2 where the base part is fixed and the vibrator shown in FIG. 6, in the same way as the vibrator shown in FIG. 64, it has been found that the Q value of a drive vibration is made slightly higher and the Q value of a detection vibration is made extraordinarily higher and furthermore the sensitivity also is made higher in the example of the invention in comparison with the former examples.

When a natural mode analysis by means of a finite element analysis method has been also applied to a drive mode vibration in a vibrator having a T-shaped arm shown in FIG. 64 and a vibrator having a Y-shaped arm shown in FIG. 65, it has been found that the small domain where there is locally a domain having the smallest detection mode vibration and the small domain where there is locally a domain having the smallest drive mode vibration do not coincide with each other.

FIGS. 66 and 67 show the result of applying a natural mode analysis by means of a finite element analysis method to a vibrator having the opposite Y-shaped arms joined with the joint of two base parts. Since this vibrator was described in FIGS. 28 and 29, the description at that time is quoted. An example shown in FIG. 66 is a result in relation to a drive mode vibration, and an example shown in FIG. 67 is a result in relation to a detection mode vibration. From the example shown in FIG. 66, in the same way as the examples shown in FIGS. 64 and 65, it has been confirmed that there is a small domain where there is locally a domain having the smallest detection vibration at the respective middle points of both base parts and an intersecting point of the opposite Y-shaped arms and the joint of the two base parts. From the example shown in FIG. 67, it has been confirmed that there is a small domain where there is locally a domain having the smallest drive vibration also in a drive mode vibration. In the example shown in FIG. 66, it has been founded that supporting the vibrator at the respective middle points of both base parts and an intersecting point of the opposite Y-shaped arms and the joint of the two base parts results in also supporting the vibrate or at the small domain where there is locally a domain having the smallest drive mode vibration as known from FIG. 67, and therefore in this example, it results in supporting the vibrator at the domain where the small domain where there is locally a domain having the smallest detection vibration and the small domain where there is locally a domain having the smallest drive vibration coincide with each other.

When the Q value of a drive vibration, the Q value of a detection vibration in the same plane as the drive vibration, and the sensitivity have been actually measured in relation to the example explained in FIG. 2 where the base part is fixed and the example where the vibrator is supported at the small domains at each of which there is locally a domain having the smallest detection vibration like the invention, namely, at the respective middle points of both base parts and an intersecting point of the opposite Y-shaped arms and the joint of the two base parts, the results shown in Tables 4 and 5 have been able to be obtained. Hereupon, the result of Table 3 shows an example of supporting the vibrator at the intersecting point of the opposite Y-shaped arms and the joint of the two base parts, and the result of Table 4 shows an example of supporting the vibrator at the respective two middle points of both base parts. From the results shown in Tables 4 and 5, it has been found that the Q value of a drive vibration is made slightly higher and the Q value of a detection vibration is made extraordinarily higher, and furthermore the sensitivity is made higher in any of the examples of the invention in comparison with the former examples.

TABLE 4

|  | Q of drive vibration | Q of detection vibration | Sensitivity (at 1 degree/sec) |
|---|---|---|---|
| Base part fixed | 4000 | 300 | 0.2 mV |
| Node fixed (this embodiment) | 5000 | 3000 | 1.3 mV |

TABLE 5

|  | Q of drive vibration | Q of detection vibration | Sensitivity (at 1 degree/sec) |
|---|---|---|---|
| Base part fixed | 4000 | 300 | 0.2 mV |
| Node fixed (this embodiment) | 5000 | 4000 | 1.5 mV |

Comparing Table 2 showing the result of a vibratory gyroscope of a vertical-arrangement type and Tables 3 to 5 each of which shows the result of a vibratory gyroscope of a horizontal-arrangement type with each other among the examples of the invention, it has been found that in any example of the invention the Q value of a detection mode vibration is made one digit or so higher and the invention is more effective to a vibratory gyroscope of a horizontal-arrangement type having naturally a small Q value of the detection mode vibration.

A seventh embodiment of the invention is described in the following.

FIG. 68 shows a construction of an example of a vibratory gyroscope 255 using a piezoelectric member already proposed by the applicants. In an example shown in FIG. 68, a vibratory gyroscope is provided with a tuning-fork vibrator 234 formed by joining a pair of vibration arms 232a and 232b with bending-vibration pieces in the X-Y plane, a base part 236 for fixing this tuning-fork vibrator on an external fixing member 235 in the X-Y plane, electrodes 237A, 237B, 237C and 237D which are provided on the tuning-fork vibration pieces 232a and 232b and are used for driving the tuning-fork vibration pieces, and electrodes 238A, 238B, 238C and 238D used for obtaining an angular speed from vibration of the base part 236.

In the vibratory gyroscope having the a construction shown in FIG. 68, the tuning-fork vibration pieces 232a and 232b are vibrated in the X-Y plane so as to be exactly reverse in phase to each other by means of the electrodes 237A to 237D in a turning system with the Z axis as the central axis. When a turning angular rate ω acts around the Z axis in this state, a Coriolis force makes forces F1 and F2 which are reverse in phase to each other act on the tuning-fork vibration pieces along the Y axis. As the result, moments M1 and M2 in the same direction act on both ends of the bending-vibration pieces of the tuning-fork vibrator 234. A turning angular rate ω can be measured by detecting deformation of the base part caused by the moments M1 and M2 by means of the electrodes 238A to 238D.

In the vibratory gyroscope 255 having the construction shown in FIG. 68 which acts in this way, for example, in case of using a single crystal of lithium tantalate ($LiTaO_3$) as a piezoelectric material and cutting it along the 130° Y crystal face, driving and detection are performed as described in the following. As seen from a sectional view of a part having the electrodes 237A to 237D of the tuning-fork vibration piece shown as an example in FIG. 69, the electrodes 237A to 237D are formed on end parts of both main faces of each of the tuning-fork vibration pieces so that each two of the electrodes can form a pair. And in FIG. 69, it is possible to contract the right side of each tuning-fork vibration piece and extend the left side by applying voltages reverse in phase to each other, respectively, to a pair of electrodes 237A and 237B and a pair of electrodes 237C and 237D. Thus, it is possible to give a drive vibration from left to right to the vibration pieces 232a and 232b in FIG. 69 by applying alternating voltages reverse in phase to each other to the pair of electrodes 237A and 237B and the pair of electrodes 237C and 237D. And a turning angular rate ω can be obtained by performing the above-mentioned operation in the reverse manner.

A former vibratory gyroscope 255 having the above-mentioned construction can act with no problem in an ordinary angular speed measurement. In case of performing an angular speed detection of high accuracy as demanded in recent years, however, as shown in FIG. 70, in each of the tuning-fork vibration pieces and the base part an electric field E1 is applied to each pair of the pair of electrodes 237A (238A) and 237B (238B) and the pair of electrodes 237C (238C) and 237D (238D), and additionally to this, there is a horizontal-leakage electric field E2, although it is very weak, and since unnecessary displacements are generated in the tuning-fork vibration pieces and the base part due to this leakage electric field, there is a problem that this leakage electric field causes noises. Therefore, it has been impossible to perform an angular speed detection of high accuracy.

FIG. 71 shows composition of an example of a vibratory gyroscope using a piezoelectric member of the invention. In an example shown in FIG. 71, a vibratory gyroscope 215 is provided with a tuning-fork 218 formed by joining a pair of tuning-fork vibration pieces 216a and 216b with bending-vibration pieces 256a and 256b in the X-Y plane, a base part 220 for fixing this tuning-fork vibrator 218 on an external fixing member 219 in the X-Y plane, electrodes 221A, 221B, 221C and 221D which are provided on the tuning-fork vibration pieces and are used for driving the tuning-fork vibration pieces, and electrodes 223A, 223B, 223C and 223D used for obtaining an angular speed from vibration of the base part 220. The tuning-fork vibration pieces, the bending-vibration pieces, the base part, and the fixing member which form the vibratory gyroscope are formed out of a piezoelectric material in one body, and concretely, are formed out of piezoceramic such as PZT or the like, or a piezoelectric single crystal of quartz, lithium tantalate or the like.

The composition of the vibratory gyroscope 215 is the same as that of the above-mentioned former vibratory gyroscope. An important point in the vibratory gyroscope of the invention shown in FIG. 71 is that through holes 222a, 222b and 224 passing through both main faces are provided, respectively, between a pair of electrodes 221A (223A) and 221B (223B) and between a pair of electrodes 221C (223C) and 221D (223D) in the tuning-fork vibration pieces 216a and 216b and the base part 220. Although the through holes 222a, 222b and 224 are not limited in size in particular, it is preferable to make each through hole equal to or longer than the longitudinal length of each electrode, provide each through hole in a range of ⅓ to ⅔ of the arm length from the arm base, and form the piezoelectric member out of a 130° Y plate of lithium tantalate (LiTaO$_3$).

The vibratory gyroscope of the invention shown in FIG. 71 also acts in the same way as the above-mentioned former example and vibrates the tuning-fork vibration pieces in the X-Y plane exactly reverse in phase to each other by means of the electrodes 221A to 221D in a turning system with the Z axis as the central axis. When a turning angular rate ω acts around the Z axis in this state, a Coriolis force makes forces F1 and F2 which are reverse in phase to each other along the Y axis act on the tuning-fork vibration pieces. As the result, moments M1 and M2 in the same direction act on both ends of the bending-vibration pieces of the tuning-fork vibrator 218. A turning angular rate ω can be measured by detecting deformation of the base part caused by the moments M1 and M2 by means of the electrodes 223A to 223D.

In an example of the invention, a sectional view of a part of the tuning-fork vibration piece 216a having the through hole 222a is shown in FIG. 72, and in case of making the tuning-fork vibration piece 216a drive-vibrate by applying alternating voltages reverse in phase to each other, respectively, to the pair of electrodes 221A and 221B and the pair of electrodes 221C and 221D, since even when there is a horizontal-leakage electric field directed from one pair of electrodes to the other pair of electrodes there is no piezoelectric member in the through hole 222a, no unnecessary displacement is generated in the tuning-fork vibration piece. And since a vibratory gyroscope of the invention comprising arms having through holes can reduce the arms in rigidity by forming the through holes in the arms, it can obtain a drive vibration and a detection vibration in high efficiency. As the result, the invention can perform a high-accuracy angular speed detection.

FIG. 73 shows a construction of another example of a vibratory gyroscope using a piezoelectric member of the invention. In an example shown in FIG. 73, the same symbols are given to the same members as those of FIG. 71, and description of them is omitted. Differently from the example shown in FIG. 71, the example shown in FIG. 73 uses a quartz crystal having the a axis of a triad axis of symmetry in a specified plane as a piezoelectric material. In the example shown in FIG. 73, therefore, as seen from a sectional view of a part of the tuning-fork vibration piece 216a having the through hole 222a as an example in FIG. 74, a pair of electrodes 221A and 221B and a pair of electrodes 221C and 221D are formed, respectively, on the outside faces and the inside faces facing the through hole 222a (222b) of each of the tuning-fork vibration pieces. In this example also, since there is no quartz crystal as a piezoelectric material in the through hole 222a (222b), unnecessary displacement can be removed.

Although in the above-mentioned example a vibratory gyroscope comprising a tuning-fork 218 formed by joining a pair of tuning-fork vibration pieces 216a and 216b with bending-vibration pieces 256a and 256b in the X-Y plane, a base part 220 for fixing this tuning-fork vibrator 218 on an external fixing member 219 in the X-Y plane, electrodes 221A to 221D which are provided on the tuning-fork vibration pieces and are used for driving the tuning-fork vibration pieces, and electrodes 223A to 223D used for obtaining an angular speed from vibration of the base part 220 has been described as an example, it is a matter of course that any vibratory gyroscope having another composition using an arm composed of a piezoelectric material as a vibrator can obtain an effect of the invention.

What is claimed is:

1. A vibratory gyroscope for detecting a turning angular rate about an axis of rotation, said vibratory gyroscope comprising:

a vibrator comprising (i) a fixing part arranged in a plane substantially perpendicular to said axis of rotation, (ii) a base part arranged in said plane and having a first end attached to said fixing part and a second end opposed thereto in the longitudinal direction of said base part, and (iii) at least one substantially straight bending vibration piece arranged in said plane and having a first end attached to a portion of said base part other than said first end of said base part, and a second end distal from said first end in a longitudinal direction of said bending vibration piece, the longitudinal direction of said bending vibration piece intersecting the longitudinal direction of said base part, wherein said bending vibration piece terminates at said second end thereof;

excitation means for exciting vibration of one of said base part and said bending vibration piece in said plane; and detecting means for detecting bending vibration of said vibrator generated by Coriolis force within said vibrator as a result of said vibrator being rotated around said axis of rotation;

wherein one of said excitation means and said detecting means is positioned on said bending vibration piece.

2. The vibratory gyroscope of claim 1, wherein said first end of said bending vibration piece is attached to said base part at said second end thereof.

3. The vibratory gyroscope of claim 2, wherein said bending vibration piece comprises a pair of pieces, the first end of each piece being attached to said base part at said second end thereof so that said bending vibration pieces are symmetrical about a longitudinal axis of said base part.

4. The vibratory gyroscope of claim 2, further comprising a projection piece arranged within said plane and extending from said second end of said base part in a direction substantially parallel with a longitudinal axis of said base part.

5. The vibratory gyroscope of claim 3, further comprising a projection piece arranged within said plane and extending from said second end of said base part in a direction substantially parallel with a longitudinal axis of said base part.

6. The vibratory gyroscope of claim 1, further comprising at least one pair of resonant arms arranged within said plane and extending from said fixing part, wherein said resonant arms resonate with vibration of said base part.

7. The vibratory gyroscope of claim 6, wherein said resonant arms extend substantially parallel to said base part.

8. The vibratory gyroscope of claim 7, wherein portions of said fixing part positioned between said base part and said resonant arms extend along said base part and said resonant arms a predetermined distance beyond a remaining portion of said fixing part.

9. The vibratory gyroscope of claim 8, wherein said predetermined distance ranges from 1.0 mm to 6.0 mm.

10. The vibratory gyroscope of claim 1, wherein said bending vibration piece has a through hole passing therethrough in a direction substantially perpendicular to said plane.

11. The vibratory gyroscope of claim 6, wherein each of said resonant arms has a through hole passing therethrough in a direction substantially perpendicular to said plane.

12. The vibratory gyroscope of claim 1, wherein said base part extends in a first direction away from said fixing part, and said vibrator further comprises a resonant arm arranged in said plane and extending in a second direction, diametrically opposed to said first direction, away from said fixing part.

13. The vibratory gyroscope of claim 2, wherein said base part extends in a first direction away from said fixing part, and said vibrator further comprises a resonant arm arranged in said plane and extending in a second direction, diametrically opposed to said first direction, away from said fixing part.

14. The vibratory gyroscope of claim 3, wherein said base part extends in a first direction away from said fixing part, and said vibrator further comprises a resonant arm arranged in said plane and extending in a second direction, diametrically opposed to said first direction, away from said fixing part.

15. The vibratory gyroscope of claim 12, further comprising a pair of resonant arms arranged in said plane and extending in said first direction.

16. The vibratory gyroscope of claim 13, further comprising a pair of resonant arms arranged in said plane and extending in said first direction.

17. The vibratory gyroscope of claim 14, further comprising a pair of resonant arms arranged in said plane and extending in said first direction.

18. The vibratory gyroscope of claim 1, wherein the longitudinal direction of said bending vibration piece intersects the longitudinal direction of said base part at an angle of 45° to 135°.

19. The vibratory gyroscope of claim 1, wherein the longitudinal direction of said bending vibration piece intersects the longitudinal direction of said base part at an angle of about 90°.

20. The vibratory gyroscope of claim 1, wherein said excitation means comprises at least one driving electrode positioned on said base part.

21. The vibratory gyroscope of claim 20, further comprising detecting electrodes positioned on said bending vibration piece.

22. The vibratory gyroscope of claim 1, wherein said excitation means comprises at least one driving electrode positioned on said bending vibration piece.

23. The vibratory gyroscope of claim 22, further comprising detecting electrodes positioned on said base part.

24. The vibratory gyroscope of claim 12, wherein said excitation means comprises at least one driving electrode positioned on said resonant arm.

25. The vibratory gyroscope of claim 24, further comprising detecting electrodes positioned on said bending vibration piece.

26. The vibratory gyroscope of claim 12, wherein said excitation means comprises at least one driving electrode positioned on said bending vibration piece.

27. The vibratory gyroscope of claim 26, further comprising detecting electrodes positioned on said resonant arm.

28. The vibratory gyroscope of claim 6, wherein said excitation means comprises driving electrodes positioned on said resonant arms.

29. The vibratory gyroscope of claim 28, further comprising detecting electrodes positioned on said bending vibration piece.

30. The vibratory gyroscope of claim 6, wherein said excitation means comprises at least one driving electrode positioned on said bending vibration piece.

31. The vibratory gyroscope of claim 30, further comprising detecting electrodes positioned on said resonant arms.

32. The vibratory gyroscope of claim 1, wherein said base part and said bending vibration piece are formed from a piezoelectric single crystal selected from the group consisting of quartz, $LiTaO_3$, $LiNbO_3$, and $Li(Nb,Ta)O_3$.

33. A vibratory gyroscope for detecting a turning angular rate about an axis of rotation, said vibratory gyroscope comprising:

a vibrator comprising (i) a fixing part arranged in a plane substantially perpendicular to said axis of rotation, (ii) a base part arranged in said plane and having a first end attached to said fixing part and a free second end opposed thereto in the longitudinal direction of said base part, and (iii) at least one substantially straight bending vibration piece arranged in said plane and having a first end attached to a portion of said base part other than said first end of said base part, and a second end distal from said first end in a longitudinal direction of said bending vibration piece, the longitudinal direction of said bending vibration piece intersecting the longitudinal direction of said base part at an angle of 45° to 135°, wherein said bending vibration piece terminates at said second end thereof, and said base part and said bending vibration piece both vibrate in a bending vibration mode substantially within said plane using said first ends thereof, respectively, as their fulcrum;

excitation means for exciting vibration of one of said base part and said bending vibration piece in said plane; and detecting means for detecting bending vibration of said vibrator generated by Coriolis force within said vibrator as a result of said vibrator being rotated around said axis of rotation;

wherein one of said excitation means and said detecting means is positioned on said bending vibration piece.

34. The vibratory gyroscope of claim 33, wherein said first end of said bending vibration piece is attached to said base part at said second end thereof.

35. The vibratory gyroscope of claim 34, wherein said bending vibration piece comprises a pair of pieces, the first end of each piece being attached to said base part at said second end thereof so that said bending vibration pieces are symmetrical about a longitudinal axis of said base part.

36. The vibratory gyroscope of claim 34, further comprising a projection piece arranged within said plane and extending from said second end of said base part in a direction substantially parallel with a longitudinal axis of said base part.

37. The vibratory gyroscope of claim 35, further comprising a projection piece arranged within said plane and extending from said second end of said base part in a direction substantially parallel with a longitudinal axis of said base part.

38. The vibratory gyroscope of claim 33, further comprising at least one pair of resonant arms arranged within said plane and extending from said fixing part, wherein said resonant arms resonate with vibration of said base part.

39. The vibratory gyroscope of claim 38, wherein said resonant arms extend substantially parallel to said base part.

40. The vibratory gyroscope of claim 39, wherein portions of said fixing part positioned between said base part and said resonant arms extend along said base part and said resonant arms a predetermined distance beyond a remaining portion of said fixing part.

41. The vibratory gyroscope of claim 40, wherein said predetermined distance ranges from 1.0 mm to 6.0 mm.

42. The vibratory gyroscope of claim 33, wherein said bending vibration piece has a through hole passing therethrough in a direction substantially perpendicular to said plane.

43. The vibratory gyroscope of claim 38, wherein each of said resonant arms has a through hole passing therethrough in a direction substantially perpendicular to said plane.

44. The vibratory gyroscope of claim 33, wherein said base part extends in a first direction away from said fixing part, and said vibrator further comprises a resonant arm arranged in said plane and extending in a second direction, diametrically opposed to said first direction, away from said fixing part.

45. The vibratory gyroscope of claim 34, wherein said base part extends in a first direction away from said fixing part, and said vibrator further comprises a resonant arm arranged in said plane and extending in a second direction, diametrically opposed to said first direction, away from said fixing part.

46. The vibratory gyroscope of claim 36, wherein said base part extends in a first direction away from said fixing part, and said vibrator further comprises a resonant arm arranged in said plane and extending in a second direction, diametrically opposed to said first direction, away from said fixing part.

47. The vibratory gyroscope of claim 44, further comprising a pair of resonant arms arranged in said plane and extending in said first direction.

48. The vibratory gyroscope of claim 45, further comprising a pair of resonant arms arranged in said plane and extending in said first direction.

49. The vibratory gyroscope of claim 46, further comprising a pair of resonant arms arranged in said plane and extending in said first direction.

50. The vibratory gyroscope of claim 33, wherein the longitudinal direction of said bending vibration piece intersects the longitudinal direction of said base part at an angle of about 90°.

51. The vibratory gyroscope of claim 33, wherein said excitation means comprises at least one driving electrode positioned on said base part.

52. The vibratory gyroscope of claim 51, further comprising detecting electrodes positioned on said bending vibration piece.

53. The vibratory gyroscope of claim 33, wherein said excitation means comprises at least one driving electrode positioned on said bending vibration piece.

54. The vibratory gyroscope of claim 53, further comprising detecting electrodes positioned on said base part.

55. The vibratory gyroscope of claim 44, wherein said excitation means comprises at least one driving electrode positioned on said resonant arm.

56. The vibratory gyroscope of claim 55, further comprising detecting electrodes positioned on said bending vibration piece.

57. The vibratory gyroscope of claim 44, wherein said excitation means comprises at least one driving electrode positioned on said bending vibration piece.

58. The vibratory gyroscope of claim 57, further comprising detecting electrodes positioned on said resonant arm.

59. The vibratory gyroscope of claim 38, wherein said excitation means comprises driving electrodes positioned on said resonant arms.

60. The vibratory gyroscope of claim 59, further comprising detecting electrodes positioned on said bending vibration piece.

61. The vibratory gyroscope of claim 38, wherein said excitation means comprises at least one driving electrode positioned on said bending vibration piece.

62. The vibratory gyroscope of claim 61, further comprising detecting electrodes positioned on said resonant arms.

63. The vibratory gyroscope of claim 33, wherein said base part and said bending vibration piece are formed from a piezoelectric single crystal selected from the group consisting of quartz, $LiTaO_3$, $LiNbO_3$, and $Li(Nb,Ta)O_3$.

64. A vibratory gyroscope for detecting a turning angular rate about an axis of rotation, said vibratory gyroscope comprising:

a vibrator comprising (i) a fixing part arranged in a plane substantially perpendicular to said axis of rotation, (ii) a base part arranged in said plane and having a first end attached to said fixing part and a second end opposed thereto in the longitudinal direction of said base part, and (iii) at least one substantially straight bending vibration piece arranged in said plane and having a first end attached to a portion of said base part other than said first end of said base part, and a free second end distal from said first end in a longitudinal direction of said bending vibration piece, the longitudinal direction of said bending vibration piece intersecting the longitudinal direction of said base part;

excitation means for exciting vibration of one of said base part and said bending vibration piece in said plane; and detecting means for detecting bending vibration of said vibrator generated by Coriolis force within said vibrator as a result of said vibrator being rotated around said axis of rotation;

wherein one of said excitation means and said detecting means is positioned on said bending vibration piece.

65. The vibratory gyroscope of claim 64, wherein said first end of said bending vibration piece is attached to said base part at said second end thereof.

66. The vibratory gyroscope of claim 65, wherein said bending vibration piece comprises a pair of pieces, the first end of each piece being attached to said base part at said second end thereof so that said bending vibration pieces are symmetrical about a longitudinal axis of said base part.

67. The vibratory gyroscope of claim 65, further comprising a projection piece arranged within said plane and extending from said second end of said base part in a direction substantially parallel with a longitudinal axis of said base part.

68. The vibratory gyroscope of claim 66, further comprising a projection piece arranged within said plane and extending from said second end of said base part in a direction substantially parallel with a longitudinal axis of said base part.

69. The vibratory gyroscope of claim 64, further comprising at least one pair of resonant arms arranged within said plane and extending from said fixing part, wherein said resonant arms resonate with vibration of said base part.

70. The vibratory gyroscope of claim 69, wherein said resonant arms extend substantially parallel to said base part.

71. The vibratory gyroscope of claim 70, wherein portions of said fixing part positioned between said base part and said resonant arms extend along said base part and said resonant arms a predetermined distance beyond a remaining portion of said fixing part.

72. The vibratory gyroscope of claim 71, wherein said predetermined distance ranges from 1.0 mm to 6.0 mm.

73. The vibratory gyroscope of claim 64, wherein said bending vibration piece has a through hole passing therethrough in a direction substantially perpendicular to said plane.

74. The vibratory gyroscope of claim 69, wherein each of said resonant arms has a through hole passing therethrough in a direction substantially perpendicular to said plane.

75. The vibratory gyroscope of claim 64, wherein said base part extends in a first direction away from said fixing part, and said vibrator further comprises a resonant arm arranged in said plane and extending in a second direction, diametrically opposed to said first direction, away from said fixing part.

76. The vibratory gyroscope of claim 65, wherein said base part extends in a first direction away from said fixing part, and said vibrator further comprises a resonant arm arranged in said plane and extending in a second direction, diametrically opposed to said first direction, away from said fixing part.

77. The vibratory gyroscope of claim 66, wherein said base part extends in a first direction away from said fixing part, and said vibrator further comprises a resonant arm arranged in said plane and extending in a second direction, diametrically opposed to said first direction, away from said fixing part.

78. The vibratory gyroscope of claim 75, further comprising a pair of resonant arms arranged in said plane and extending in said first direction.

79. The vibratory gyroscope of claim 76, further comprising a pair of resonant arms arranged in said plane and extending in said first direction.

80. The vibratory gyroscope of claim 77, further comprising a pair of resonant arms arranged in said plane and extending in said first direction.

81. The vibratory gyroscope of claim 64, wherein the longitudinal direction of said bending vibration piece intersects the longitudinal direction of said base part at an angle of 45° to 135°.

82. The vibratory gyroscope of claim 64, wherein the longitudinal direction of said bending vibration piece intersects the longitudinal direction of said base part at an angle of about 90°.

83. The vibratory gyroscope of claim 64, wherein said excitation means comprises at least one driving electrode positioned on said base part.

84. The vibratory gyroscope of claim 83, further comprising detecting electrodes positioned on said bending vibration piece.

85. The vibratory gyroscope of claim 64, wherein said excitation means comprises at least one driving electrode positioned on said bending vibration piece.

86. The vibratory gyroscope of claim 85, further comprising detecting electrodes positioned on said base part.

87. The vibratory gyroscope of claim 75, wherein said excitation means comprises at least one driving electrode positioned on said resonant arm.

88. The vibratory gyroscope of claim 87, further comprising detecting electrodes positioned on said bending vibration piece.

89. The vibratory gyroscope of claim 75, wherein said excitation means comprises at least one driving electrode positioned on said bending vibration piece.

90. The vibratory gyroscope of claim 89, further comprising detecting electrodes positioned on said resonant arm.

91. The vibratory gyroscope of claim 69, wherein said excitation means comprises driving electrodes positioned on said resonant arms.

92. The vibratory gyroscope of claim 91, further comprising detecting electrodes positioned on said bending vibration piece.

93. The vibratory gyroscope of claim 69, wherein said excitation means comprises at least one driving electrode positioned on said bending vibration piece.

94. The vibratory gyroscope of claim 93, further comprising detecting electrodes positioned on said resonant arms.

95. The vibratory gyroscope of claim 64, wherein said base part and said bending vibration piece are formed from a piezoelectric single crystal selected from the group consisting of quartz, $LiTaO_3$, $LiNbO_3$, and $Li(Nb,Ta)O_3$.

96. A vibratory gyroscope for detecting a turning angular rate about an axis of rotation, said vibratory gyroscope comprising:
a vibrator comprising (i) a fixing part arranged in a plane substantially perpendicular to said axis of rotation, (ii) a base part arranged in said plane and having a first end attached to said fixing part and a free second end opposed thereto in the longitudinal direction of said base part, and (iii) at least one substantially straight bending vibration piece arranged in said plane and having a first end attached to a portion of said base part other than said first end of said base part, and a free second end distal from said first end in a longitudinal direction of said bending vibration piece, the longitudinal direction of said bending vibration piece intersecting the longitudinal direction of said base part at an angle of 45° to 135°, wherein said base part and said bending vibration piece both vibrate in a bending vibration mode substantially within said plane using said first ends thereof, respectively, as their fulcrum;
excitation means for exciting vibration of one of said base part and said bending vibration piece in said plane; and
detecting means for detecting bending vibration of said vibrator generated by Coriolis force within said vibrator as a result of said vibrator being rotated around said axis of rotation;
wherein one of said excitation means and said detecting means is positioned on said bending vibration piece.

97. The vibratory gyroscope of claim 96, wherein said first end of said bending vibration piece is attached to said base part at said second end thereof.

98. The vibratory gyroscope of claim 97, wherein said bending vibration piece comprises a pair of pieces, the first end of each piece being attached to said base part at said second end thereof so that said bending vibration pieces are symmetrical about a longitudinal axis of said base part.

99. The vibratory gyroscope of claim 97, further comprising a projection piece arranged within said plane and extending from said second end of said base part in a direction substantially parallel with a longitudinal axis of said base part.

100. The vibratory gyroscope of claim 99, further comprising a projection piece arranged within said plane and extending from said second end of said base part in a direction substantially parallel with a longitudinal axis of said base part.

101. The vibratory gyroscope of claim 96, further comprising at least one pair of resonant arms arranged within said plane and extending from said fixing part, wherein said resonant arms resonate with vibration of said base part.

102. The vibratory gyroscope of claim 101, wherein said resonant arms extend substantially parallel to said base part.

103. The vibratory gyroscope of claim 102, wherein portions of said fixing part positioned between said base part and said resonant arms extend along said base part and said resonant arms a predetermined distance beyond a remaining portion of said fixing part.

104. The vibratory gyroscope of claim 103, wherein said predetermined distance ranges from 1.0 mm to 6.0 mm.

105. The vibratory gyroscope of claim 96, wherein said bending vibration piece has a through hole passing therethrough in a direction substantially perpendicular to said plane.

106. The vibratory gyroscope of claim 101, wherein each of said resonant arms has a through hole passing therethrough in a direction substantially perpendicular to said plane.

107. The vibratory gyroscope of claim 96, wherein said base part extends in a first direction away from said fixing part, and said vibrator further comprises a resonant arm arranged in said plane and extending in a second direction, diametrically opposed to said first direction, away from said fixing part.

108. The vibratory gyroscope of claim 97, wherein said base part extends in a first direction away from said fixing part, and said vibrator further comprises a resonant arm arranged in said plane and extending in a second direction, diametrically opposed to said first direction, away from said fixing part.

109. The vibratory gyroscope of claim 98, wherein said base part extends in a first direction away from said fixing part, and said vibrator further comprises a resonant arm arranged in said plane and extending in a second direction, diametrically opposed to said first direction, away from said fixing part.

110. The vibratory gyroscope of claim 107, further comprising a pair of resonant arms arranged in said plane and extending in said first direction.

111. The vibratory gyroscope of claim 108, further comprising a pair of resonant arms arranged in said plane and extending in said first direction.

112. The vibratory gyroscope of claim 109, further comprising a pair of resonant arms arranged in said plane and extending in said first direction.

113. The vibratory gyroscope of claim 96, wherein the longitudinal direction of said bending vibration piece intersects the longitudinal direction of said base part at an angle of about 90°.

114. The vibratory gyroscope of claim 96, wherein said excitation means comprises at least one driving electrode positioned on said base part.

115. The vibratory gyroscope of claim 114, further comprising detecting electrodes positioned on said bending vibration piece.

116. The vibratory gyroscope of claim 96, wherein said excitation means comprises at least one driving electrode positioned on said bending vibration piece.

117. The vibratory gyroscope of claim 116, further comprising detecting electrodes positioned on said base part.

118. The vibratory gyroscope of claim 107, wherein said excitation means comprises at least one driving electrode positioned on said resonant arm.

119. The vibratory gyroscope of claim 118, further comprising detecting electrodes positioned on said bending vibration piece.

120. The vibratory gyroscope of claim 107, wherein said excitation means comprises at least one driving electrode positioned on said bending vibration piece.

121. The vibratory gyroscope of claim 120, further comprising detecting electrodes positioned on said resonant arm.

122. The vibratory gyroscope of claim 101, wherein said excitation means comprises driving electrodes positioned on said resonant arms.

123. The vibratory gyroscope of claim 122, further comprising detecting electrodes positioned on said bending vibration piece.

124. The vibratory gyroscope of claim 101, wherein said excitation means comprises at least one driving electrode positioned on said bending vibration piece.

125. The vibratory gyroscope of claim 124, further comprising detecting electrodes positioned on said resonant arms.

126. The vibratory gyroscope of claim 96, wherein said base part and said bending vibration piece are formed from a piezoelectric single crystal selected from the group consisting of quartz, $LiTaO_3$, $LiNbO_3$, and $Li(Nb,Ta)O_3$.

127. A vibratory gyroscope for detecting a turning angular rate about an axis of rotation, said vibratory gyroscope comprising:

a vibrator comprising (i) a fixing part arranged in a plane substantially perpendicular to said axis of rotation, (ii) a base part arranged in said plane and having a first end attached to said fixing part and a second end opposed thereto in the longitudinal direction of said base part, (iii) at least one substantially straight bending vibration piece arranged in said plane and having a first end attached to a portion of said base part other than said first end of said base part, and a second end distal from said first end in a longitudinal direction of said bending vibration piece, the longitudinal direction of said bending vibration piece intersecting the longitudinal direction of said base part, and (iv) at least one pair of resonant arms arranged within said plane and extending from said fixing part, said resonant arms resonating with vibration of said base part;

excitation means for exciting vibration of one of said base part and said bending vibration piece in said plane; and detecting means for detecting bending vibration of said vibrator generated by Coriolis force within said vibrator as a result of said vibrator being rotated around said axis of rotation;

wherein one of said excitation means and said detecting means is positioned on said bending vibration piece.

128. The vibratory gyroscope of claim 127, wherein said resonant arms extend substantially parallel to said base part.

129. The vibratory gyroscope of claim 127, wherein said first end of said bending vibration piece is attached to said base part at said second end thereof.

130. The vibratory gyroscope of claim 129, wherein said bending vibration piece comprises a pair of pieces, the first end of each piece being attached to said base part at said second end thereof so that said bending vibration pieces are symmetrical about a longitudinal axis of said base part.

131. The vibratory gyroscope of claim 129, further comprising a projection piece arranged within said plane and extending from said second end of said base part in a direction substantially parallel with a longitudinal axis of said base part.

132. The vibratory gyroscope of claim 130, further comprising a projection piece arranged within said plane and extending from said second end of said base part in a direction substantially parallel with a longitudinal axis of said base part.

133. The vibratory gyroscope of claim 127, wherein said bending vibration piece has a through hole passing therethrough in a direction substantially perpendicular to said plane.

134. The vibratory gyroscope of claim 127, wherein said base part extends in a first direction away from said fixing part, and said vibrator further comprises a resonant arm arranged in said plane and extending in a second direction, diametrically opposed to said first direction, away from said fixing part.

135. The vibratory gyroscope of claim 129, wherein said base part extends in a first direction away from said fixing part, and said vibrator further comprises a resonant arm arranged in said plane and extending in a second direction, diametrically opposed to said first direction, away from said fixing part.

136. The vibratory gyroscope of claim 130, wherein said base part extends in a first direction away from said fixing part, and said vibrator further comprises a resonant arm arranged in said plane and extending in a second direction, diametrically opposed to said first direction, away from said fixing part.

137. The vibratory gyroscope of claim 129, wherein the longitudinal direction of said bending vibration piece intersects the longitudinal direction of said base part at an angle of 45° to 135°.

138. The vibratory gyroscope of claim 129, wherein the longitudinal direction of said bending vibration piece intersects the longitudinal direction of said base part at an angle of about 90°.

139. The vibratory gyroscope of claim 129, wherein said excitation means comprises at least one driving electrode positioned on said base part.

140. The vibratory gyroscope of claim 139, further comprising detecting electrodes positioned on said bending vibration piece.

141. The vibratory gyroscope of claim 129, wherein said excitation means comprises at least one driving electrode positioned on said bending vibration piece.

142. The vibratory gyroscope of claim 141, further comprising detecting electrodes positioned on said base part.

143. The vibratory gyroscope of claim 134, wherein said excitation means comprises at least one driving electrode positioned on said resonant arm.

144. The vibratory gyroscope of claim 143, further comprising detecting electrodes positioned on said bending vibration piece.

145. The vibratory gyroscope of claim 134, wherein said excitation means comprises at least one driving electrode positioned on said bending vibration piece.

146. The vibratory gyroscope of claim 145, further comprising detecting electrodes positioned on said resonant arm.

147. The vibratory gyroscope of claim 133, wherein said excitation means comprises driving electrodes positioned on said resonant arms.

148. The vibratory gyroscope of claim 147, further comprising detecting electrodes positioned on said bending vibration piece.

149. The vibratory gyroscope of claim 133, wherein said excitation means comprises at least one driving electrode positioned on said bending vibration piece.

150. The vibratory gyroscope of claim 149, further comprising detecting electrodes positioned on said resonant arms.

151. The vibratory gyroscope of claim 127, wherein said base part and said bending vibration piece are formed from a piezoelectric single crystal selected from the group consisting of quartz, $LiTaO_3$, $LiNbO_3$, and $Li(Nb,Ta)O_3$.

152. The vibratory gyroscope of claim 6, wherein said resonant arms extend in directions that intersect, within said fixing part, a longitudinal extension of said base part.

153. The vibratory gyroscope of claim 38, wherein said resonant arms extend in directions that intersect, within said fixing part, a longitudinal extension of said base part.

154. The vibratory gyroscope of claim 69, wherein said resonant arms extend in directions that intersect, within said fixing part, a longitudinal extension of said base part.

155. The vibratory gyroscope of claim 101, wherein said resonant arms extend in directions that intersect, within said fixing part, a longitudinal extension of said base part.

156. The vibratory gyroscope of claim 127, wherein said resonant arms extend in directions that intersect, within said fixing part, a longitudinal extension of said base part.

* * * * *

UNITED STATES PATENT AND TRADEMARK OFFICE
CERTIFICATE OF CORRECTION

PATENT NO. : 5,998,911
DATED : December 7, 1999
INVENTOR(S) : Takayuki Kikuchi, Shosaku Gouji, Yukihisa Osugi and Takao Soma It is certified that error appears in the above-identified patent and that said Letters Patent is hereby corrected as shown below:

On the title page, item

[30]  Foreign Application Priority

Please change "9-233426" to --9-223426--.

Signed and Sealed this

Fourteenth Day of November, 2000

Attest:

Q. TODD DICKINSON

*Attesting Officer*                    *Director of Patents and Trademarks*